(12) United States Patent
Smith

(10) Patent No.: US 10,631,557 B2
(45) Date of Patent: Apr. 28, 2020

(54) PRESERVATIVE SYSTEM FOR ACIDIC BEVERAGES BASED ON SEQUESTRANTS

(71) Applicant: PepsiCo, Inc., Purchase, NY (US)

(72) Inventor: Richard T. Smith, Ridgefield, CT (US)

(73) Assignee: PepsiCo, Inc., Purchase, NY (US)

(*) Notice: Subject to any disclaimer, the term of this patent is extended or adjusted under 35 U.S.C. 154(b) by 191 days.

(21) Appl. No.: 15/386,416

(22) Filed: Dec. 21, 2016

(65) Prior Publication Data
US 2017/0164642 A1 Jun. 15, 2017

Related U.S. Application Data

(62) Division of application No. 14/086,043, filed on Nov. 21, 2013, now Pat. No. 9,560,871, which is a division of application No. 12/640,142, filed on Dec. 17, 2009, now Pat. No. 8,628,812.

(60) Provisional application No. 61/141,481, filed on Dec. 30, 2008.

(51) Int. Cl.
| | |
|---|---|
| *A23L 2/44* | (2006.01) |
| *A23L 2/02* | (2006.01) |
| *A23L 2/54* | (2006.01) |
| *A23L 2/56* | (2006.01) |
| *A23L 2/58* | (2006.01) |

(52) U.S. Cl.
CPC ............. *A23L 2/44* (2013.01); *A23L 2/02* (2013.01); *A23L 2/54* (2013.01); *A23L 2/56* (2013.01); *A23L 2/58* (2013.01); *A23V 2002/00* (2013.01)

(58) Field of Classification Search
CPC ..................................................... A23L 2/44
USPC ........................................................ 426/335
See application file for complete search history.

(56) References Cited

U.S. PATENT DOCUMENTS

| | | | |
|---|---|---|---|
| 2,999,754 A | 9/1961 | Lauck et al. | |
| 2,999,774 A | 9/1961 | Schappel | |

(Continued)

FOREIGN PATENT DOCUMENTS

| | | | |
|---|---|---|---|
| CA | 2 228 945 A1 | 1/1997 | |
| EP | 0 845 217 A1 | 6/1998 | |

(Continued)

OTHER PUBLICATIONS

Hayes: Inhibiting undesirable taste in oral compositions; EP000845217A1; Pubn-Date: Jun. 3, 1998. (Year: 1998).*

(Continued)

*Primary Examiner* — Patricia A George
(74) *Attorney, Agent, or Firm* — Sterne, Kessler, Goldstein & Fox P.L.L.C.

(57) ABSTRACT

The present invention provides beverage preservative systems for use in high acid beverage products, and beverage products comprising the beverage preservative systems. The beverage preservative system prevents spoilage by microorganisms in a beverage within a sealed container for a period of at least 16 weeks. The present invention reduces or eliminates the use of conventional preservatives that pose health and/or environmental concerns. The components that make up the beverage preservative system of invention work together in a synergistic manner to reduce the amount of preservative required and so improve the inventive beverage's sensory impact over beverages having conventional preservatives.

14 Claims, 18 Drawing Sheets

(56) References Cited

U.S. PATENT DOCUMENTS

| | | | |
|---|---|---|---|
| 5,194,288 A * | 3/1993 | Peterson | A23G 3/2092 |
| | | | 426/271 |
| 5,336,510 A | 8/1994 | Chang | |
| 5,430,058 A | 7/1995 | Shanzer et al. | |
| 5,431,940 A | 7/1995 | Calderas et al. | |
| 5,494,573 A | 2/1996 | Schoenmeyr et al. | |
| 5,641,532 A | 6/1997 | Pflaumer et al. | |
| 5,792,502 A | 8/1998 | Montezinos | |
| 6,022,576 A * | 2/2000 | Cirigliano | A23F 3/163 |
| | | | 426/330.3 |
| 6,036,986 A | 3/2000 | Cirigliano et al. | |
| 6,042,861 A | 3/2000 | Anslow et al. | |
| 6,120,823 A | 9/2000 | Cirigliano et al. | |
| 6,126,980 A | 10/2000 | Smith et al. | |
| 6,268,003 B1 | 7/2001 | Calderas et al. | |
| 6,326,040 B1 | 12/2001 | Kearney et al. | |
| 6,440,482 B1 | 8/2002 | Henson et al. | |
| 6,572,908 B2 | 6/2003 | Kemp et al. | |
| 6,617,290 B2 | 9/2003 | Lopes | |
| 6,706,290 B1 | 3/2004 | Kajander et al. | |
| 6,716,825 B2 | 4/2004 | Hostetler et al. | |
| 6,761,919 B2 | 7/2004 | Blyth et al. | |
| 6,989,397 B1 | 1/2006 | Richardson et al. | |
| 8,628,812 B2 | 1/2014 | Smith | |
| 9,560,871 B2 | 2/2017 | Smith | |
| 2003/0134017 A1 | 7/2003 | Graumlich et al. | |
| 2004/0062785 A1 | 4/2004 | Parker | |
| 2004/0175434 A1 | 9/2004 | Schasteen et al. | |
| 2005/0250214 A1 | 11/2005 | Gee | |
| 2005/0260262 A1 | 11/2005 | Dansereau et al. | |
| 2006/0019018 A1 | 1/2006 | MacKay et al. | |
| 2006/0073249 A1 | 4/2006 | Haan et al. | |
| 2007/0020365 A1 | 1/2007 | Herdt et al. | |
| 2007/0160724 A1 | 7/2007 | Chan et al. | |
| 2007/0196502 A1 | 8/2007 | Mort, III et al. | |
| 2007/0269563 A1 | 11/2007 | Mixon et al. | |
| 2007/0275140 A1 | 11/2007 | Safko | |
| 2008/0069928 A1 | 3/2008 | Moder et al. | |
| 2010/0166917 A1 | 7/2010 | Smith | |
| 2014/0093616 A1 | 4/2014 | Smith | |

FOREIGN PATENT DOCUMENTS

| | | |
|---|---|---|
| GB | 2 333 772 A | 8/1999 |
| SU | 839475 B | 6/1981 |
| WO | WO 97/02010 A1 | 1/1997 |
| WO | WO 99/21431 A1 | 5/1999 |

OTHER PUBLICATIONS

Sunberg, R.J. (1986) A simple procedure to convert parts per million (PPM) to molarity (M). Journal of Chemical Education. 63(8), pp. 714. (Year: 1986).*

International Search Report and Written Opinion for International Application No. PCT/US2009/068624, European Patent Office, Netherlands, dated Apr. 26, 2010, 9 pages.

Epelde, L., et al., "Effects of chelates on plants and soil microbial community: Comparison of EDTA and EDDS for lead phytoextraction," *Science of the Total Environment* 401(1-3):21-28, Elsevier B.V., Netherlands (2008).

Office Action for Canadian Patent Application No. 2,748,532, dated Feb. 2, 2015, Canadian Intellectual Property Office, Canada, 3 pages.

Tandy, S., et al., "Determination of [S,S']-ethylenediaminedisuccinic acid by high-performance liquid chromatography," *Journal of Chromatographic Science* 44(2):82-85, Oxford University Press, England (2006).

Vocabulary.com, "sorbic acid," accessed at http://www.vocabulary.com/dictionary/sorbic%20acid, accessed on Jan. 5, 2015, 2 pages.

* cited by examiner

YEAST STRAIN CULTURE COLLECTION

| CODE | FORMAL CODE | SOURCE | 16S RIBOSOMAL DNA HOMOLOGY |
|---|---|---|---|
| Y1 | 28 | IN HOUSE | Z. BAILL I |
| Y2 | 834 | ATCC | S. CEREVISIA E |
| Y3 | 906 | IN HOUSE | Z. BAILL I |
| Y4 | 2333 | ATCC | Z. BAILL I |
| Y5 | 2602 | ATCC | Z. BAILL I |
| Y6 | 7001 | IN HOUSE | Z. BAILL I |
| Y7 | 8026 | IN HOUSE | S. CEREVISIA E |
| Y8 | 8099 | ATCC | Z. BAILL I |
| Y9 | 8766 | ATCC | Z. BAILL I |
| Y10 | 11486 | ATCC | Z. BAILL I |
| Y11 | 36946 | ATCC | Z. BAILL I |
| Y12 | 36847 | ATCC | Z. BAILL I |
| Y13 | 38923 | ATCC | Z. BAILL I |
| Y14 | 38924 | ATCC | Z. BAILL I |
| Y15 | 42476 | ATCC | Z. BAILL I |
| Y16 | 42477 | ATCC | Z. BAILL I |
| Y17 | 56074 | ATCC | Z. BAILL I |
| Y18 | 56075 | ATCC | Z. BAILL I |
| Y19 | 56535 | ATCC | Z. BAILL I |
| Y20 | 58445 | ATCC | CANDIDA OSOMENSIS |
| Y21 | 60483 | ATCC | Z. BAILL I |
| Y22 | 60484 | ATCC | Z. BAILLI |
| Y23 | 60486 | ATCC | CANDIDA OSEOMENSIS |
| Y24 | 60488 | ATCC | S. CEREVISIA E |
| Y25 | 60491 | ATCC | S. CEREVISIA E |
| Y26 | 66825 | ATCC | Z.BAILL I |
| Y27 | 66826 | ATCC | KLUYVEROMYCES DELPHENSIS |
| Y28 | 76714 | IN HOUSE | Z. BAILL I |
| Y29 | 800-108 | IN HOUSE | Z. BAILL I |
| Y30 | 800-71 | IN HOUSE | Z. BAILL I |
| Y31 | ALLSPORT | IN HOUSE | S. CEREVISIA E |
| Y32 | BRETT-16-02 | IN HOUSE | |
| Y33 | BRETT-DAN | IN HOUSE | DEKKERA INTERMEDIA |
| Y34 | CHERRY 7UP | IN HOUSE | LODDERMOMYCES ELONGISPORUS |
| Y35 | HP | IN HOUSE | Z. BAILL I |
| Y36 | MARION | IN HOUSE | Z. BAILL I |
| Y37 | MT. DEW | IN HOUSE | Z. BAILL I |
| Y38 | SPORE | IN HOUSE | S. CEREVISIA E |
| Y39 | VENTURA | IN HOUSE | Z. BAILL I |
| Y40 | DIET CRYSTAL | IN HOUSE | CANDIDA TROPICALIS |
| Y41 | GRAPE ALL SPORT | IN HOUSE | S. CEREVISIA E |
| Y67 | | IN HOUSE | S. CEREVISIA E |
| Y99 | 1162-18 | IN HOUSE | S. CEREVISIA E |
| Y101 | 2607 | ATCC | Z. BISPORUS |
| Y102 | 14779 | ATCC | Z. BISPORUS |
| Y103 | 22694 | ATCC | Z. BISPORUS |
| Y104 | 38993 | ATCC | Z. BISPORUS |
| Y105 | 52405 | ATCC | Z. BISPORUS |
| Y106 | 52406 | ATCC | Z. BISPORUS |
| Y107 | 52407 | ATCC | Z. BISPORUS |

FIG. 2A

| CINNAMIC ACID CONCENTRATIONS | | |
|---|---|---|
| 20PPM | 35PPM | 50PPM |
| 100PPM | 150PPM | 200PPM |

| [K+SORBATE] PPM | -C | Y3 | C-7UP | SPORE | Y22 | M1 | Y107 | M6 |
|---|---|---|---|---|---|---|---|---|
| 920 | Y | Y | Y | Y | Y | Y | Y | Y |
| 900 | Y | Y | Y | Y | Y | Y | Y | Y |
| 880 | Y | G | Y | Y | Y | Y | Y | Y |
| 860 | Y | Y | Y | Y | Y | Y | Y | Y |
| 840 | Y | Y | Y | Y | Y | Y | Y | Y |
| 820 | Y | Y | Y | Y | Y | Y | Y | Y |
| 800 | Y | Y | Y | Y | Y | Y | Y | Y |
| 780 | Y | Y | Y | Y | Y | Y | Y | Y |
| 760 | Y | Y | Y | Y | Y | Y | Y | Y |
| 740 | Y | Y | Y | Y | Y | Y | Y | Y |
| 720 | Y | Y | Y | Y | Y | Y | Y | Y |
| 700 | Y | Y | Y | Y | Y | Y | Y | Y |
| 680 | Y | G | Y | Y | Y | Y | Y | Y |
| 660 | Y | Y | Y | Y | Y | Y | Y | Y |
| 640 | Y | Y | Y | Y | Y | Y | Y | Y |
| 620 | Y | Y | Y | Y | Y | Y | Y | Y |
| 600 | Y | Y | Y | Y | Y | Y | Y | Y |
| 580 | Y | Y | Y | Y | Y | Y | Y | Y |
| 560 | Y | G | Y | Y | Y | Y | Y | Y |
| 540 | Y | G | Y | Y | Y | Y | Y | Y |
| 520 | Y | Y | Y | Y | Y | Y | Y | Y |
| 500 | Y | G | Y | Y | Y | Y | Y | Y |
| 480 | Y | G | Y | Y | Y | Y | Y | Y |
| 460 | Y | Y | Y | Y | Y | Y | Y | Y |
| 440 | Y | G | Y | Y | Y | Y | Y | Y |
| 420 | Y | G | Y | Y | Y | Y | Y | Y |
| 400 | Y | G | Y | Y | Y | Y | Y | Y |
| 380 | Y | Y | Y | Y | Y | Y | Y | Y |
| 360 | Y | G | Y | Y | Y | Y | Y | Y |
| 340 | Y | G | Y | Y | Y | Y | Y | Y |
| 320 | Y | G | Y | Y | Y | Y | Y | Y |
| 300 | Y | G | Y | Y | Y | Y | Y | Y |
| 280 | Y | G | Y | Y | Y | Y | Y | Y |
| 260 | Y | G | Y | Y | Y | Y | Y | Y |
| 240 | Y | G | Y | Y | Y | Y | Y | Y |
| 220 | Y | G | Y | Y | Y | Y | Y | Y |
| 200 | Y | G | Y | G | Y | Y | Y | Y |
| 180 | Y | G | Y | G | Y | Y | G | Y |
| 160 | Y | G | Y | G | Y | G | G | Y |
| 140 | Y | G | Y | G | Y | G | G | Y |
| 120 | Y | G | Y | G | Y | G | G | Y |
| 100 | Y | G | Y | G | G | G | G | Y |
| 80 | Y | G | Y | G | G | G | G | Y |
| 60 | Y | G | G | G | G | G | G | Y |
| 40 | Y | G | G | Y | Y | G | G | G |
| 20 | Y | G | G | G | G | G | G | Y |
| 10 | Y | G | G | G | G | G | G | G |
| 0 | Y | G | G | G | G | G | G | G |

FIG. 3A

K+SORBATE AND 30 PM EDTA

| [K+SORBATE] PPM | -C | Y3 | C-7UP | SPORE | Y22 | M1 | Y107 | M6 |
|---|---|---|---|---|---|---|---|---|
| 920 | ✓ | ✓ | ✓ | ✓ | ✓ | ✓ | ✓ | ✓ |
| 900 | ✓ | ✓ | ✓ | ✓ | ✓ | ✓ | ✓ | ✓ |
| 880 | ✓ | ✓ | ✓ | ✓ | ✓ | ✓ | ✓ | ✓ |
| 860 | ✓ | ✓ | ✓ | ✓ | ✓ | ✓ | ✓ | ✓ |
| 840 | ✓ | ✓ | ✓ | ✓ | ✓ | ✓ | ✓ | ✓ |
| 820 | ✓ | ✓ | ✓ | ✓ | ✓ | ✓ | ✓ | ✓ |
| 800 | ✓ | ✓ | ✓ | ✓ | ✓ | ✓ | ✓ | ✓ |
| 780 | ✓ | ✓ | ✓ | ✓ | ✓ | ✓ | ✓ | ✓ |
| 760 | ✓ | ✓ | ✓ | ✓ | ✓ | ✓ | ✓ | ✓ |
| 740 | ✓ | ✓ | ✓ | ✓ | ✓ | ✓ | ✓ | ✓ |
| 720 | ✓ | ✓ | ✓ | ✓ | ✓ | ✓ | ✓ | ✓ |
| 700 | ✓ | ✓ | ✓ | ✓ | ✓ | ✓ | ✓ | ✓ |
| 680 | ✓ | ✓ | ✓ | ✓ | ✓ | ✓ | ✓ | ✓ |
| 660 | ✓ | ✓ | ✓ | ✓ | ✓ | ✓ | ✓ | ✓ |
| 640 | ✓ | ✓ | ✓ | ✓ | ✓ | ✓ | ✓ | ✓ |
| 620 | ✓ | ✓ | ✓ | ✓ | ✓ | ✓ | ✓ | ✓ |
| 600 | ✓ | ✓ | ✓ | ✓ | ✓ | ✓ | ✓ | ✓ |
| 580 | ✓ | gb | ✓ | ✓ | ✓ | ✓ | ✓ | ✓ |
| 560 | ✓ | gb | ✓ | ✓ | ✓ | ✓ | ✓ | ✓ |
| 540 | ✓ | gb | ✓ | ✓ | ✓ | ✓ | ✓ | ✓ |
| 520 | ✓ | gb | ✓ | ✓ | ✓ | ✓ | ✓ | ✓ |
| 500 | ✓ | gb | ✓ | ✓ | ✓ | ✓ | ✓ | ✓ |
| 480 | ✓ | gb | ✓ | ✓ | ✓ | ✓ | ✓ | ✓ |
| 460 | ✓ | gb | ✓ | ✓ | ✓ | ✓ | ✓ | ✓ |
| 440 | ✓ | gb | ✓ | ✓ | ✓ | ✓ | ✓ | ✓ |
| 420 | ✓ | gb | ✓ | ✓ | ✓ | ✓ | ✓ | ✓ |
| 400 | ✓ | gb | ✓ | ✓ | ✓ | ✓ | ✓ | ✓ |
| 380 | ✓ | gb | ✓ | ✓ | ✓ | ✓ | ✓ | ✓ |
| 360 | ✓ | gb | ✓ | ✓ | ✓ | ✓ | ✓ | ✓ |
| 340 | ✓ | gb | ✓ | gb | ✓ | ✓ | ✓ | ✓ |
| 320 | ✓ | gb | ✓ | ✓ | ✓ | ✓ | ✓ | ✓ |
| 300 | ✓ | gb | ✓ | gb | ✓ | ✓ | ✓ | ✓ |
| 280 | ✓ | gb | ✓ | gb | ✓ | ✓ | ✓ | ✓ |
| 260 | ✓ | gb | ✓ | gb | ✓ | ✓ | ✓ | ✓ |
| 240 | ✓ | gb | ✓ | ✓ | ✓ | ✓ | ✓ | ✓ |
| 220 | ✓ | gb | ✓ | gb | ✓ | ✓ | ✓ | ✓ |
| 200 | ✓ | gb | ✓ | gb | ✓ | ✓ | ✓ | ✓ |
| 180 | ✓ | gb | ✓ | gb | ✓ | ✓ | ✓ | ✓ |
| 160 | ✓ | gb | ✓ | gb | ✓ | ✓ | gb | ✓ |
| 140 | ✓ | gb | ✓ | gb | ✓ | ✓ | gb | ✓ |
| 120 | ✓ | gb | ✓ | gb | ✓ | gb | gb | ✓ |
| 100 | ✓ | gb | ✓ | gb | gb | gb | gb | ✓ |
| 80 | ✓ | gb | ✓ | gb | gb | gb | gb | ✓ |
| 60 | ✓ | gb | gb | gb | gb | gb | gb | ✓ |
| 40 | ✓ | gb | gb | gb | gb | gb | gb | ✓ |
| 20 | ✓ | gb | gb | gb | gb | gb | gb | ✓ |
| 10 | ✓ | gb | gb | gb | gb | gb | gb | gb |
| 0 | ✓ | gb | gb | gb | gb | gb | gb | gb |

FIG. 4A

K+SORBATE AND 30 PM EDDS

| [K+SORBATE] PPM | -C | Y3 | C-7UP | SPORE | Y22 | M1 | Y107 | M6 |
|---|---|---|---|---|---|---|---|---|
| 920 | ✓ | ✓ | ✓ | ✓ | ✓ | ✓ | ✓ | ✓ |
| 900 | ✓ | ✓ | ✓ | ✓ | ✓ | ✓ | ✓ | ✓ |
| 880 | ✓ | ✓ | ✓ | ✓ | ✓ | ✓ | ✓ | ✓ |
| 860 | ✓ | ✓ | ✓ | ✓ | ✓ | ✓ | ✓ | ✓ |
| 840 | ✓ | ✓ | ✓ | ✓ | ✓ | ✓ | ✓ | ✓ |
| 820 | ✓ | ✓ | ✓ | ✓ | ✓ | ✓ | ✓ | ✓ |
| 800 | ✓ | ✓ | ✓ | ✓ | ✓ | ✓ | ✓ | ✓ |
| 780 | ✓ | ✓ | ✓ | ✓ | ✓ | ✓ | ✓ | ✓ |
| 760 | ✓ | ✓ | ✓ | ✓ | ✓ | ✓ | ✓ | ✓ |
| 740 | ✓ | ✓ | ✓ | ✓ | ✓ | ✓ | ✓ | ✓ |
| 720 | ✓ | ✓ | ✓ | ✓ | ✓ | ✓ | ✓ | ✓ |
| 700 | ✓ | G | ✓ | ✓ | ✓ | ✓ | ✓ | ✓ |
| 680 | ✓ | ✓ | ✓ | ✓ | ✓ | ✓ | ✓ | ✓ |
| 660 | ✓ | ✓ | ✓ | ✓ | ✓ | ✓ | ✓ | ✓ |
| 640 | ✓ | ✓ | ✓ | ✓ | ✓ | ✓ | ✓ | ✓ |
| 620 | ✓ | ✓ | ✓ | ✓ | ✓ | ✓ | ✓ | ✓ |
| 600 | ✓ | G | ✓ | ✓ | ✓ | ✓ | ✓ | ✓ |
| 580 | ✓ | ✓ | ✓ | ✓ | ✓ | ✓ | ✓ | ✓ |
| 560 | ✓ | ✓ | ✓ | ✓ | ✓ | ✓ | ✓ | ✓ |
| 540 | ✓ | G | ✓ | ✓ | ✓ | ✓ | ✓ | ✓ |
| 520 | ✓ | G | ✓ | ✓ | ✓ | ✓ | ✓ | ✓ |
| 500 | ✓ | G | ✓ | ✓ | ✓ | ✓ | ✓ | ✓ |
| 480 | ✓ | G | ✓ | ✓ | ✓ | ✓ | ✓ | ✓ |
| 460 | ✓ | G | ✓ | ✓ | ✓ | ✓ | ✓ | ✓ |
| 440 | ✓ | G | ✓ | ✓ | ✓ | ✓ | ✓ | ✓ |
| 420 | ✓ | G | ✓ | ✓ | ✓ | ✓ | ✓ | ✓ |
| 400 | ✓ | G | ✓ | ✓ | ✓ | ✓ | ✓ | ✓ |
| 380 | ✓ | G | ✓ | ✓ | ✓ | ✓ | ✓ | ✓ |
| 360 | ✓ | G | ✓ | ✓ | ✓ | ✓ | ✓ | ✓ |
| 340 | ✓ | G | ✓ | ✓ | ✓ | ✓ | ✓ | ✓ |
| 320 | ✓ | G | ✓ | G | ✓ | ✓ | ✓ | ✓ |
| 300 | ✓ | G | ✓ | ✓ | ✓ | ✓ | ✓ | ✓ |
| 280 | ✓ | G | ✓ | G | ✓ | ✓ | ✓ | ✓ |
| 260 | ✓ | G | ✓ | ✓ | ✓ | ✓ | ✓ | ✓ |
| 240 | ✓ | G | ✓ | G | ✓ | ✓ | ✓ | ✓ |
| 220 | ✓ | G | ✓ | G | ✓ | ✓ | ✓ | ✓ |
| 200 | ✓ | G | ✓ | ✓ | ✓ | ✓ | ✓ | ✓ |
| 180 | ✓ | G | ✓ | G | ✓ | ✓ | ✓ | ✓ |
| 160 | ✓ | G | G | ✓ | ✓ | ✓ | ✓ | ✓ |
| 140 | ✓ | G | ✓ | G | ✓ | ✓ | ✓ | ✓ |
| 120 | ✓ | G | ✓ | ✓ | ✓ | G | ✓ | ✓ |
| 100 | ✓ | G | ✓ | ✓ | ✓ | G | G | ✓ |
| 80 | ✓ | G | ✓ | G | ✓ | ✓ | G | ✓ |
| 60 | ✓ | G | ✓ | ✓ | ✓ | G | G | ✓ |
| 40 | ✓ | G | ✓ | ✓ | ✓ | ✓ | G | ✓ |
| 20 | ✓ | G | ✓ | ✓ | ✓ | ✓ | G | G |
| 10 | ✓ | G | ✓ | G | ✓ | ✓ | G | G |
| 0 | ✓ | G | G | G | G | G | G | G |

FIG. 4B

K+SORBATE AND 15 PM EDDS

| [K+SORBATE] PPM | -C | Y3 | C-7UP | SPORE | Y22 | M1 | Y107 | M6 |
|---|---|---|---|---|---|---|---|---|
| 920 | ✓ | ✓ | ✓ | ✓ | ✓ | ✓ | ✓ | ✓ |
| 900 | ✓ | ✓ | ✓ | ✓ | ✓ | ✓ | ✓ | ✓ |
| 880 | ✓ | ✓ | ✓ | ✓ | ✓ | ✓ | ✓ | ✓ |
| 860 | ✓ | ✓ | ✓ | ✓ | ✓ | ✓ | ✓ | ✓ |
| 840 | ✓ | ✓ | ✓ | ✓ | ✓ | ✓ | ✓ | ✓ |
| 820 | ✓ | ✓ | ✓ | ✓ | ✓ | ✓ | ✓ | ✓ |
| 800 | ✓ | ✓ | ✓ | ✓ | ✓ | ✓ | ✓ | ✓ |
| 780 | ✓ | ✓ | ✓ | ✓ | ✓ | ✓ | ✓ | ✓ |
| 760 | ✓ | ✓ | ✓ | ✓ | ✓ | ✓ | ✓ | ✓ |
| 740 | ✓ | ✓ | ✓ | ✓ | ✓ | ✓ | ✓ | ✓ |
| 720 | ✓ | ✓ | ✓ | ✓ | ✓ | ✓ | ✓ | ✓ |
| 700 | ✓ | ✓ | ✓ | ✓ | ✓ | ✓ | ✓ | ✓ |
| 680 | ✓ | ✓ | ✓ | ✓ | ✓ | ✓ | ✓ | ✓ |
| 660 | ✓ | ✓ | ✓ | ✓ | ✓ | ✓ | ✓ | ✓ |
| 640 | ✓ | ✓ | ✓ | ✓ | ✓ | ✓ | ✓ | ✓ |
| 620 | ✓ | ✓ | ✓ | ✓ | ✓ | ✓ | ✓ | ✓ |
| 600 | ✓ | ✓ | ✓ | ✓ | ✓ | ✓ | ✓ | ✓ |
| 580 | ✓ | ✓ | ✓ | ✓ | ✓ | ✓ | ✓ | ✓ |
| 560 | ✓ | SG | ✓ | ✓ | ✓ | ✓ | ✓ | ✓ |
| 540 | ✓ | ✓ | ✓ | ✓ | ✓ | ✓ | ✓ | ✓ |
| 520 | ✓ | SG | ✓ | ✓ | ✓ | ✓ | ✓ | ✓ |
| 500 | ✓ | SG | ✓ | ✓ | ✓ | ✓ | ✓ | ✓ |
| 480 | ✓ | SG | ✓ | ✓ | ✓ | ✓ | ✓ | ✓ |
| 460 | ✓ | SG | ✓ | ✓ | ✓ | ✓ | ✓ | ✓ |
| 440 | ✓ | SG | ✓ | ✓ | ✓ | ✓ | ✓ | ✓ |
| 420 | ✓ | SG | ✓ | ✓ | ✓ | ✓ | ✓ | ✓ |
| 400 | ✓ | SG | ✓ | ✓ | ✓ | ✓ | ✓ | ✓ |
| 380 | ✓ | SG | ✓ | ✓ | ✓ | ✓ | ✓ | ✓ |
| 360 | ✓ | SG | ✓ | ✓ | ✓ | ✓ | ✓ | ✓ |
| 340 | ✓ | SG | ✓ | ✓ | ✓ | ✓ | ✓ | ✓ |
| 320 | ✓ | SG | ✓ | ✓ | ✓ | ✓ | ✓ | ✓ |
| 300 | ✓ | SG | ✓ | ✓ | ✓ | ✓ | ✓ | ✓ |
| 280 | ✓ | SG | ✓ | ✓ | ✓ | ✓ | ✓ | ✓ |
| 260 | ✓ | SG | ✓ | SG | ✓ | ✓ | ✓ | ✓ |
| 240 | ✓ | SG | ✓ | SG | ✓ | ✓ | ✓ | ✓ |
| 220 | ✓ | SG | ✓ | SG | ✓ | ✓ | ✓ | ✓ |
| 200 | ✓ | SG | ✓ | SG | ✓ | ✓ | ✓ | ✓ |
| 180 | ✓ | SG | ✓ | SG | ✓ | SG | ✓ | ✓ |
| 160 | ✓ | SG | ✓ | SG | ✓ | SG | SG | ✓ |
| 140 | ✓ | SG | ✓ | SG | SG | SG | ✓ | ✓ |
| 120 | ✓ | SG | ✓ | SG | SG | SG | SG | ✓ |
| 100 | ✓ | SG | SG | SG | SG | SG | SG | ✓ |
| 80 | ✓ | SG | SG | SG | SG | SG | SG | ✓ |
| 60 | ✓ | SG | SG | SG | SG | SG | SG | SG |
| 40 | ✓ | SG | SG | SG | SG | SG | SG | ✓ |
| 20 | ✓ | SG | SG | SG | SG | SG | SG | ✓ |
| 10 | ✓ | SG | SG | SG | SG | SG | SG | ✓ |
| 0 | ✓ | SG | SG | SG | SG | SG | SG | ✓ |

FIG. 4C

REPLACEMENT
SHEET Sheet 2/2

| [CA] PPM | [SHMP] 750 PPM [EDDS] = 30PPM | | | | | | | |
|---|---|---|---|---|---|---|---|---|
| | -C | Y3 | C-7UP | SPORE | Y22 | B.NIEVA | Y107 | IVAN |
| 600 | ✓ | ✓ | ✓ | ✓ | ✓ | ✓ | ✓ | ✓ |
| 552 | ✓ | ✓ | ✓ | ✓ | ✓ | ✓ | ✓ | ✓ |
| 508 | ✓ | ✓ | ✓ | ✓ | ✓ | ✓ | ✓ | ✓ |
| 467 | ✓ | ✓ | ✓ | ✓ | ✓ | ✓ | ✓ | ✓ |
| 430 | ✓ | ✓ | ✓ | ✓ | ✓ | ✓ | ✓ | ✓ |
| 395 | ✓ | ✓ | ✓ | ✓ | ✓ | ✓ | ✓ | ✓ |
| 364 | ✓ | ✓ | ✓ | ✓ | ✓ | ✓ | ✓ | ✓ |
| 335 | ✓ | ✓ | ✓ | ✓ | ✓ | ✓ | ✓ | ✓ |
| 308 | ✓ | ✓ | ✓ | ✓ | ✓ | ✓ | ✓ | ✓ |
| 283 | ✓ | ✓ | ✓ | ✓ | ✓ | ✓ | ✓ | ✓ |
| 261 | ✓ | ✓ | ✓ | ✓ | ✓ | ✓ | ✓ | ✓ |
| 240 | ✓ | ✓ | ✓ | ✓ | ✓ | ✓ | ✓ | ✓ |
| 221 | ✓ | ✓ | ✓ | ✓ | ✓ | ✓ | ✓ | ✓ |
| 203 | ✓ | ✓ | ✓ | ✓ | ✓ | ✓ | ✓ | ✓ |
| 187 | ✓ | ✓ | ✓ | ✓ | ✓ | ✓ | ✓ | ✓ |
| 172 | ✓ | ✓ | ✓ | ✓ | ✓ | ✓ | ✓ | ✓ |
| 158 | ✓ | ✓ | ✓ | ✓ | ✓ | ✓ | ✓ | ✓ |
| 145 | ✓ | ✓ | ✓ | ✓ | ✓ | ✓ | ✓ | ✓ |
| 134 | ✓ | ✓ | ✓ | ✓ | ✓ | ✓ | ✓ | ✓ |
| 123 | ✓ | ✓ | ✓ | ✓ | ✓ | ✓ | ✓ | ✓ |
| 113 | ✓ | ✓ | ✓ | ✓ | ✓ | ✓ | ✓ | ✓ |
| 104 | ✓ | ✓ | ✓ | ✓ | ✓ | ✓ | ✓ | ✓ |
| 96 | ✓ | ✓ | ✓ | ✓ | ✓ | ✓ | ✓ | ✓ |
| 88 | ✓ | ✓ | ✓ | ✓ | ✓ | ✓ | ✓ | ✓ |
| 81 | ✓ | ✓ | ✓ | ✓ | ✓ | ✓ | ✓ | ✓ |
| 75 | ✓ | ✓ | ✓ | ✓ | ✓ | ✓ | ✓ | ✓ |
| 69 | ✓ | ✓ | ✓ | ✓ | ✓ | ✓ | ✓ | SB |
| 63 | ✓ | ✓ | ✓ | ✓ | ✓ | ✓ | ✓ | SB |
| 58 | ✓ | ✓ | ✓ | ✓ | ✓ | SB | ✓ | SB |
| 53 | ✓ | ✓ | ✓ | ✓ | ✓ | ✓ | ✓ | SB |
| 49 | ✓ | ✓ | ✓ | ✓ | ✓ | SB | ✓ | SB |
| 45 | ✓ | ✓ | ✓ | ✓ | ✓ | SB | ✓ | SB |
| 42 | ✓ | ✓ | ✓ | ✓ | ✓ | SB | ✓ | SB |
| 38 | ✓ | ✓ | ✓ | ✓ | ✓ | SB | ✓ | SB |
| 35 | ✓ | ✓ | ✓ | ✓ | ✓ | ✓ | ✓ | SB |
| 32 | ✓ | ✓ | ✓ | ✓ | ✓ | ✓ | ✓ | SB |
| 30 | ✓ | ✓ | ✓ | ✓ | ✓ | ✓ | ✓ | SB |
| 27 | ✓ | ✓ | ✓ | ✓ | ✓ | ✓ | ✓ | SB |
| 25 | ✓ | ✓ | ✓ | ✓ | ✓ | ✓ | ✓ | SB |
| 23 | ✓ | ✓ | ✓ | ✓ | ✓ | ✓ | ✓ | SB |
| 21 | ✓ | ✓ | ✓ | ✓ | ✓ | ✓ | ✓ | ✓ |
| 20 | ✓ | ✓ | ✓ | ✓ | ✓ | SB | ✓ | SB |
| 18 | ✓ | ✓ | ✓ | ✓ | ✓ | SB | ✓ | SB |
| 17 | ✓ | ✓ | ✓ | ✓ | ✓ | SB | ✓ | ✓ |
| 15 | ✓ | ✓ | ✓ | ✓ | ✓ | SB | ✓ | ✓ |
| 14 | ✓ | ✓ | ✓ | ✓ | ✓ | SB | ✓ | ✓ |
| 13 | ✓ | ✓ | ✓ | ✓ | ✓ | SB | ✓ | ✓ |
| 0 | SB | SB | SB | SB | SB | SB | SB | SB |

FIG. 5A

| [SHMP] 750 PPM [EDDS] = 30PPM | | | | | | | | |
|---|---|---|---|---|---|---|---|---|
| -C | Y3 | C-7UP | SPORE | Y22 | B.NIEVA | Y107 | IVAN | [CA] PPM |
| ✓ | ✓ | ✓ | ✓ | ✓ | ✓ | ✓ | ✓ | 600 |
| ✓ | ✓ | ✓ | ✓ | ✓ | ✓ | ✓ | ✓ | 552 |
| ✓ | ✓ | ✓ | ✓ | ✓ | ✓ | ✓ | ✓ | 508 |
| ✓ | ✓ | ✓ | ✓ | ✓ | ✓ | ✓ | ✓ | 467 |
| ✓ | ✓ | ✓ | ✓ | ✓ | ✓ | ✓ | ✓ | 430 |
| ✓ | ✓ | ✓ | ✓ | ✓ | ✓ | ✓ | ✓ | 395 |
| ✓ | ✓ | ✓ | ✓ | ✓ | ✓ | ✓ | ✓ | 364 |
| ✓ | ✓ | ✓ | ✓ | ✓ | ✓ | ✓ | ✓ | 335 |
| ✓ | ✓ | ✓ | ✓ | ✓ | ✓ | ✓ | ✓ | 308 |
| ✓ | ✓ | ✓ | ✓ | ✓ | ✓ | ✓ | ✓ | 283 |
| ✓ | ✓ | ✓ | ✓ | ✓ | ✓ | ✓ | ✓ | 261 |
| ✓ | ✓ | ✓ | ✓ | ✓ | ✓ | ✓ | ✓ | 240 |
| ✓ | ✓ | ✓ | ✓ | ✓ | ✓ | ✓ | ✓ | 221 |
| ✓ | ✓ | ✓ | ✓ | ✓ | ✓ | ✓ | ✓ | 203 |
| ✓ | ✓ | ✓ | ✓ | ✓ | ✓ | ✓ | ✓ | 187 |
| ✓ | ✓ | ✓ | ✓ | ✓ | ✓ | ✓ | ✓ | 172 |
| ✓ | ✓ | ✓ | ✓ | ✓ | ✓ | ✓ | ✓ | 158 |
| ✓ | ✓ | ✓ | ✓ | ✓ | ✓ | ✓ | ✓ | 145 |
| ✓ | ✓ | ✓ | ✓ | ✓ | ✓ | ✓ | ✓ | 134 |
| ✓ | ✓ | ✓ | ✓ | ✓ | ✓ | ✓ | ✓ | 123 |
| ✓ | ✓ | ✓ | ✓ | ✓ | ✓ | ✓ | ✓ | 113 |
| ✓ | ✓ | ✓ | ✓ | ✓ | ✓ | ✓ | ✓ | 104 |
| ✓ | ✓ | ✓ | ✓ | ✓ | ✓ | ✓ | ✓ | 96 |
| ✓ | ✓ | ✓ | ✓ | ✓ | ✓ | ✓ | ✓ | 88 |
| ✓ | ✓ | ✓ | ✓ | ✓ | ✓ | ✓ | ✓ | 81 |
| ✓ | ✓ | ✓ | ✓ | ✓ | ✓ | ✓ | ✓ | 75 |
| ✓ | ✓ | ✓ | ✓ | ✓ | ✓ | ✓ | ✓ | 69 |
| ✓ | ✓ | ✓ | ✓ | ✓ | ✓ | ✓ | ✓ | 63 |
| ✓ | ✓ | ✓ | ✓ | ✓ | ✓ | ✓ | ✓ | 58 |
| ✓ | ✓ | ✓ | ✓ | ✓ | ✓ | ✓ | ✓ | 53 |
| ✓ | ✓ | ✓ | ✓ | ✓ | ✓ | ✓ | ✓ | 49 |
| ✓ | ✓ | ✓ | ✓ | ✓ | ✓ | 𝒮 | ✓ | 45 |
| ✓ | ✓ | ✓ | ✓ | ✓ | ✓ | ✓ | ✓ | 42 |
| ✓ | ✓ | ✓ | ✓ | ✓ | ✓ | ✓ | ✓ | 38 |
| ✓ | ✓ | ✓ | ✓ | ✓ | ✓ | ✓ | ✓ | 35 |
| ✓ | ✓ | ✓ | ✓ | ✓ | ✓ | ✓ | ✓ | 32 |
| ✓ | ✓ | ✓ | ✓ | ✓ | ✓ | ✓ | ✓ | 30 |
| ✓ | ✓ | ✓ | ✓ | ✓ | ✓ | ✓ | ✓ | 27 |
| ✓ | ✓ | ✓ | ✓ | ✓ | ✓ | ✓ | ✓ | 25 |
| ✓ | ✓ | ✓ | ✓ | ✓ | ✓ | ✓ | ✓ | 23 |
| ✓ | ✓ | ✓ | ✓ | ✓ | ✓ | ✓ | ✓ | 21 |
| ✓ | ✓ | ✓ | ✓ | ✓ | 𝒮 | ✓ | ✓ | 20 |
| ✓ | ✓ | ✓ | ✓ | ✓ | 𝒮 | ✓ | ✓ | 18 |
| ✓ | ✓ | ✓ | ✓ | ✓ | 𝒮 | ✓ | ✓ | 17 |
| ✓ | ✓ | ✓ | ✓ | ✓ | 𝒮 | ✓ | ✓ | 15 |
| ✓ | ✓ | ✓ | ✓ | ✓ | 𝒮 | ✓ | ✓ | 14 |
| ✓ | ✓ | ✓ | ✓ | ✓ | 𝒮 | ✓ | ✓ | 13 |
| 𝒮 | 𝒮 | 𝒮 | 𝒮 | 𝒮 | 𝒮 | 𝒮 | 𝒮 | 0 |

FIG. 5B

EDDS + SHMP

| [SHMP] PPM | -C | Y3 | C-7UP | SPORE | Y22 | M1 | Y107 | M2 |
|---|---|---|---|---|---|---|---|---|
| 1500.0 | ✓ | ✓ | ✓ | ✓ | ✓ | ✓ | ✓ | ✓ |
| 1350.0 | ✓ | ✓ | ✓ | ✓ | ✓ | ✓ | ✓ | ✓ |
| 1215.0 | ✓ | ✓ | ✓ | ✓ | ✓ | ✓ | ✓ | ✓ |
| 1093.5 | ✓ | ✓ | ✓ | ✓ | ✓ | ✓ | ✓ | ✓ |
| 984.2 | ✓ | ✓ | ✓ | ✓ | ✓ | ✓ | ✓ | ✓ |
| 885.7 | ✓ | ✓ | ✓ | ✓ | ✓ | ✓ | ✓ | ✓ |
| 797.2 | ✓ | ✓ | ✓ | ✓ | ✓ | ✓ | ✓ | ✓ |
| 717.4 | ✓ | ✓ | ✓ | ✓ | ✓ | ✓ | ✓ | ✓ |
| 645.7 | ✓ | ✓ | ✓ | ✓ | ✓ | ✓ | ✓ | ✓ |
| 581.1 | ✓ | ✓ | ✓ | ✓ | ✓ | ✓ | ✓ | ✓ |
| 523.0 | ✓ | ✓ | ✓ | ✓ | ✓ | ✓ | ✓ | ✓ |
| 470.7 | ✓ | ✓ | ✓ | ✓ | ✓ | ✓ | ✓ | ✓ |
| 423.6 | ✓ | ✓ | ✓ | ✓ | ✓ | ✓ | ✓ | ✓ |
| 381.3 | ✓ | ✓ | ✓ | ✓ | ✓ | ✓ | ✓ | ✓ |
| 343.2 | ✓ | ✓ | ✓ | ✓ | ✓ | ✓ | ✓ | ✓ |
| 308.8 | ✓ | ✓ | ✓ | ✓ | ✓ | ✓ | ✓ | ✓ |
| 278.0 | ✓ | ✓ | ✓ | ✓ | ✓ | ✓ | ✓ | ✓ |
| 250.2 | ✓ | ✓ | ✓ | ✓ | ✓ | ✓ | ✓ | ✓ |
| 225.1 | ✓ | ✓ | ✓ | ✓ | ✓ | ⊘ | ✓ | ✓ |
| 202.6 | ✓ | ✓ | ✓ | ✓ | ✓ | ⊘ | ✓ | ✓ |
| 182.4 | ✓ | ✓ | ✓ | ✓ | ✓ | ⊘ | ⊘ | ✓ |
| 164.1 | ✓ | ✓ | ✓ | ✓ | ✓ | ⊘ | ⊘ | ✓ |
| 147.7 | ✓ | ✓ | ✓ | ⊘ | ✓ | ⊘ | ⊘ | ⊘ |
| 0.0 | ✓ | ⊘ | ⊘ | ⊘ | ⊘ | ⊘ | ⊘ | ⊘ |

FIG. 6A

EDTA + SHMP

| [SHMP] PPM | -C | Y3 | C-7UP | SPORE | Y22 | M1 | Y107 | M2 |
|---|---|---|---|---|---|---|---|---|
| 1500.0 | ✓ | ✓ | ✓ | ✓ | ✓ | ✓ | ✓ | ✓ |
| 1350.0 | ✓ | ✓ | ✓ | ✓ | ✓ | ✓ | ✓ | ✓ |
| 1215.0 | ✓ | ✓ | ✓ | ✓ | ✓ | ✓ | ✓ | ✓ |
| 1093.5 | ✓ | ✓ | ✓ | ✓ | ✓ | ✓ | ✓ | ✓ |
| 984.2 | ✓ | ✓ | ✓ | ✓ | ✓ | ✓ | ✓ | ✓ |
| 885.7 | ✓ | ✓ | ✓ | ✓ | ✓ | ✓ | ✓ | ✓ |
| 797.2 | ✓ | ✓ | ✓ | ✓ | ✓ | ✓ | ✓ | ✓ |
| 717.4 | ✓ | ✓ | ✓ | ✓ | ✓ | ✓ | ✓ | ✓ |
| 645.7 | ✓ | ✓ | ✓ | ✓ | ✓ | ✓ | ✓ | ✓ |
| 581.1 | ✓ | ✓ | ✓ | ✓ | ✓ | ✓ | ✓ | ✓ |
| 523.0 | ✓ | ✓ | ✓ | ✓ | ✓ | ✓ | ✓ | ✓ |
| 470.7 | ✓ | ✓ | ✓ | ✓ | ✓ | ✓ | ✓ | ✓ |
| 423.6 | ✓ | ✓ | ✓ | ✓ | ✓ | ✓ | ✓ | ✓ |
| 381.3 | ✓ | ✓ | ✓ | ✓ | ✓ | ✓ | ✓ | ✓ |
| 343.2 | ✓ | ✓ | ✓ | ✓ | ✓ | ✓ | ✓ | ✓ |
| 308.8 | ✓ | ✓ | ✓ | ✓ | ✓ | ✓ | ✓ | ✓ |
| 278.0 | ✓ | ✓ | ✓ | ✓ | ✓ | ✓ | ✓ | ✓ |
| 250.2 | ✓ | ✓ | ✓ | ✓ | ✓ | ✓ | spore | ✓ |
| 225.1 | ✓ | ✓ | ✓ | ✓ | ✓ | ✓ | spore | ✓ |
| 202.6 | ✓ | ✓ | ✓ | ✓ | ✓ | ✓ | spore | ✓ |
| 182.4 | ✓ | ✓ | ✓ | ✓ | spore | ✓ | spore | ✓ |
| 164.1 | ✓ | ✓ | ✓ | ✓ | spore | ✓ | spore | ✓ |
| 147.7 | ✓ | ✓ | ✓ | ✓ | spore | ✓ | spore | ✓ |
| 0.0 | ✓ | spore | spore | spore | spore | spore | spore | spore |

FIG. 6B

EDDS + ERIDONATE

| ERIDONATE PPM | -C | Y3 | C-7UP | SPORE | Y22 | M1 | Y107 | M2 |
|---|---|---|---|---|---|---|---|---|
| 1500.0 | ✓ | ✓ | ✓ | ✓ | ✓ | ✓ | ✓ | ✓ |
| 1350.0 | ✓ | ✓ | ✓ | ✓ | ✓ | ✓ | ✓ | ✓ |
| 1215.0 | ✓ | ✓ | ✓ | ✓ | ✓ | ✓ | ✓ | ✓ |
| 1093.5 | ✓ | ✓ | ✓ | ✓ | ✓ | ✓ | ✓ | ✓ |
| 984.2 | ✓ | ✓ | ✓ | ✓ | ✓ | ✓ | ✓ | ✓ |
| 885.7 | ✓ | ✓ | ✓ | ✓ | ✓ | ✓ | ✓ | ✓ |
| 797.2 | ✓ | ✓ | ✓ | ✓ | ✓ | ✓ | ✓ | ✓ |
| 717.4 | ✓ | ✓ | ✓ | ✓ | ✓ | ✓ | ✓ | ✓ |
| 645.7 | ✓ | ✓ | ✓ | ✓ | ✓ | ✓ | ✓ | ✓ |
| 581.1 | ✓ | ✓ | ✓ | ✓ | ✓ | ✓ | ✓ | ✓ |
| 523.0 | ✓ | ✓ | ✓ | ✓ | ✓ | ✓ | ✓ | ✓ |
| 470.7 | ✓ | ✓ | ✓ | ✓ | ✓ | ✓ | ✓ | ✓ |
| 423.6 | ✓ | ✓ | ✓ | ✓ | ✓ | ✓ | ✓ | ✓ |
| 381.3 | ✓ | ✓ | ✓ | ✓ | ✓ | ✓ | ∞ | ✓ |
| 343.2 | ✓ | ✓ | ✓ | ✓ | ✓ | ✓ | ∞ | ✓ |
| 308.8 | ✓ | ✓ | ✓ | ✓ | ✓ | ✓ | ∞ | ✓ |
| 278.0 | ✓ | ✓ | ✓ | ✓ | ✓ | ✓ | ∞ | ✓ |
| 250.2 | ✓ | ✓ | ✓ | ✓ | ✓ | ✓ | ∞ | ✓ |
| 225.1 | ✓ | ✓ | ✓ | ✓ | ✓ | ✓ | ∞ | ✓ |
| 202.6 | ✓ | ✓ | ✓ | ✓ | ✓ | ✓ | ∞ | ✓ |
| 182.4 | ✓ | ✓ | ✓ | ✓ | ✓ | ✓ | ∞ | ✓ |
| 164.1 | ✓ | ✓ | ✓ | ✓ | ✓ | ✓ | ∞ | ✓ |
| 147.7 | ✓ | ✓ | ✓ | ✓ | ✓ | ✓ | ∞ | ✓ |
| 0.0 | ✓ | ∞ | ∞ | ∞ | ∞ | ∞ | ∞ | ∞ |

FIG. 6C

EDTA + ERIDONATE

| ERIDONATE PPM | -C | Y3 | C-7UP | SPORE | Y22 | M1 | Y107 | M2 |
|---|---|---|---|---|---|---|---|---|
| 1500.0 | ✓ | ✓ | ✓ | ✓ | ✓ | ✓ | ✓ | ✓ |
| 1350.0 | ✓ | ✓ | ✓ | ✓ | ✓ | ✓ | ✓ | ✓ |
| 1215.0 | ✓ | ✓ | ✓ | ✓ | ✓ | ✓ | ✓ | ✓ |
| 1093.5 | ✓ | ✓ | ✓ | ✓ | ✓ | ✓ | ✓ | ✓ |
| 984.2 | ✓ | ✓ | ✓ | ✓ | ✓ | ✓ | ✓ | ✓ |
| 885.7 | ✓ | ✓ | ✓ | ✓ | ✓ | ✓ | ✓ | ✓ |
| 797.2 | ✓ | ✓ | ✓ | ✓ | ✓ | ✓ | ✓ | ✓ |
| 717.4 | ✓ | ✓ | ✓ | ✓ | ✓ | ✓ | ✓ | ✓ |
| 645.7 | ✓ | ✓ | ✓ | ✓ | ✓ | ✓ | ✓ | ✓ |
| 581.1 | ✓ | ✓ | ✓ | ✓ | ✓ | ✓ | ✓ | ✓ |
| 523.0 | ✓ | ✓ | ✓ | ✓ | ✓ | ✓ | ✓ | ✓ |
| 470.7 | ✓ | ✓ | ✓ | ✓ | ✓ | ✓ | ✓ | ✓ |
| 423.6 | ✓ | ✓ | ✓ | ✓ | ✓ | ✓ | ✓ | ✓ |
| 381.3 | ✓ | ✓ | ✓ | ✓ | ✓ | ✓ | ✓ | ✓ |
| 343.2 | ✓ | ✓ | ✓ | ✓ | ✓ | ✓ | ✓ | ✓ |
| 308.8 | ✓ | ✓ | ✓ | ✓ | ✓ | ✓ | ✓ | ✓ |
| 278.0 | ✓ | ✓ | ✓ | ✓ | ✓ | ✓ | ✓ | ✓ |
| 250.2 | ✓ | ✓ | ✓ | ✓ | ✓ | ✓ | ✓ | ✓ |
| 225.1 | ✓ | ✓ | ✓ | ✓ | ✓ | ✓ | ∞ | ✓ |
| 202.6 | ✓ | ✓ | ✓ | ✓ | ✓ | ✓ | ∞ | ✓ |
| 182.4 | ✓ | ✓ | ✓ | ✓ | ✓ | ✓ | ∞ | ✓ |
| 164.1 | ✓ | ✓ | ✓ | ✓ | ✓ | ✓ | ∞ | ✓ |
| 147.7 | ✓ | ✓ | ✓ | ✓ | ✓ | ✓ | ∞ | ✓ |
| 0.0 | ✓ | ∞ | ∞ | ∞ | ∞ | ∞ | ∞ | ∞ |

FIG. 6D

| STRAINS AND STRAIN CODES | | GROWTH (+) VERSUS NO GROWTH (-) IN CONTAINER AFTER PRODUCT FILL TO 3/4 OR BRIM PRODUCT PRE HEAT TO 71.1C COOL TO AMBIENT AFTER 2 MINUTES WITH AMBIENT TEMPERATURE WATER | | | |
|---|---|---|---|---|---|
| INOCULUM PER CONTAINER: 100 SPORES | | 3/4 | BRIM | 3/4 | BRIM |
| PAECILOMYCES VARIOTTI | IN-HOUSE COLLECTION D3 | + | + | + | + |
| B.NIEVA | ATCC 33271 | – | + | + | + |
| PENICILLIUM SP. | IN-HOUSE COLLECTION D1 | + | – | + | + |
| PAECILOMYCES VARIOTTI | ATCC 11971 | + | + | + | + |
| PAECILOMYCES VARIOTTI | IN-HOUSE COLLECTION L26 | + | + | + | + |
| PAECILOMYCES LILACINUS | ATCC 90461 | – | – | – | – |
| B.FULVA | ATCC 22474 | + | – | + | – |
| PENICILLIUM GALBRUM | ATCC 48441 | – | – | – | – |

PRESERVATIVE SYSTEM FOR ACIDIC BEVERAGES BASED ON SEQUESTRANTS

CROSS-REFERENCE TO RELATED APPLICATIONS

This application is a divisional of U.S. Ser. No. 14/086,043, filed Nov. 21, 2013, now U.S. Pat. No. 9,560,871, U.S. Ser. No. 14/086,043 is a divisional of U.S. Ser. No. 12/640,142, filed Dec. 17, 2009, now U.S. Pat. No. 8,628,812; wherein U.S. Ser. No. 12/640,142 claims benefit from provisional application Ser. No. 61/141,481, filed Dec. 30, 2008. All previously allowed cases are entitled Preservative System For Acidic Beverages Based On Sequestrants. The above mentioned applications are incorporated herein by reference in their entireties.

TECHNICAL FIELD

This invention relates to beverage preservative systems and beverage products comprising the preservative system. In particular, this invention relates to beverage preservative systems having formulations suitable to meet consumer demand for healthy and environmentally friendly ingredients.

BACKGROUND

Many food and beverage products include chemical preservatives to extend the shelf-life of the product by inhibiting the growth of spoilage microorganisms (e.g., mold, yeast, bacteria) in the product for an extended period of time. However, some preservatives currently in use have been found to have detrimental health and/or environmental effects, or are not sufficiently stable. Therefore, there is market demand for food and beverage products which do not include these detrimental preservatives, and yet still possess extended shelf-life. There is also consumer demand for natural ingredients in food and beverage products.

For example, benzoic acid and its salts are commonly used in beverage products as preservatives. However, benzoic acid and its salts can react with ascorbic acid (Vitamin C), to form benzene, which is a carcinogen. Heat and light increase the rate of this reaction, so production and storage of beverage products under hot or bright conditions speeds up formation of benzene. Intake of benzene in drinking water is a public health concern, and the World Health Organization (WHO) and several governing bodies including the United States and the European Union have set upper limits for benzene content in drinking water of 10 ppb, 5 ppb, and 1 ppb, respectively.

Ethylenediamine tetraacetic acid (EDTA) and its salts is another common beverage product preservative. EDTA is a metal ion chelator that sequesters metal ions and prevents their participation in catalytic oxidation reactions. EDTA at elevated concentrations is toxic to bacteria due to sequestration of necessary metals from the outer membrane of bacteria. However, EDTA is not bio-degradable, nor is it removed during conventional wastewater treatment. Recalcitrant chelating agents such as EDTA are an environmental concern predominantly because of their persistence and strong metal chelating properties. Widespread use of EDTA and its slow removal under many environmental conditions has led to its status as the most abundant anthropogenic compound in many European surface waters. River concentrations in Europe are reported in the range of 10-100 µg/L, and lake concentrations are in the range of 1-10 µg/L. EDTA concentrations in U.S. groundwater receiving wastewater effluent discharge have been reported in the range of 1-72 µg/L, and EDTA was found to be an effected tracer for effluent, with higher concentrations of EDTA corresponding to a greater percentage of reclaimed water in drinking water production wells.

The presence of chelating agents in high concentrations in wastewater and surface water has the potential to remobilize heavy metals from river sediments and treated sludge, although low and environmentally relevant concentrations seem to have only a very minor influence on metal solubility. Elevated concentrations of chelating agents enhance the transport of metals (e.g., Zn, Cd, Ni, Cr, Cu, Pb, and Fe) in soils and enhance the undesired transport of radioactive metals away from disposal sites. Low concentrations of chelating agents may either stimulate or decrease plankton or algae growth, while high concentrations always inhibit activity. Chelating agents are non-toxic to many forms of life upon acute exposure; the effects of long-term low-level exposure are unknown. EDTA ingestion at high concentrations by mammals changes excretion of metals and can affect cell membrane permeability.

Polyphosphates are another common beverage product preservative. However, polyphosphates are not stabile in aqueous solution and degrade rapidly at ambient temperature. Degradation of polyphosphates results in unsatisfactory sensory issues in the beverage product, such as change in acidity. Also, the shelf-life of the beverage product is compromised because of the reduced anti-microbial action from the reduced concentration of polyphosphate.

It is therefore an object of the present invention to provide new preservative systems for use in beverages as full or partial replacements for at least one currently used preservative that has detrimental health and/or environmental effects, or lack of sufficient stability. It is further an object of the invention to provide new beverage preservative systems with improved sensory impact. It is further an object of the invention to provide preservative systems without benzoic acid and/or reduced concentrations of sorbic acid. Some countries have regulatory restrictions on the use of sorbic acid in food and beverage products wherein the permitted concentration is less than the amount required to inhibit the growth of spoilage microorganisms by itself.

It is further an object of the invention to identify a sequestrant which is bio-degradable and can be substituted for EDTA. It is further an object of the invention to identify a sequestrant which is stable to heat in aqueous solution and can be substituted for polyphosphates. The invention is novel and unique in that only a very limited number of known compounds are able to complex metal ions so as to make the metal unavailable for use by spoilage microorganisms, but do not cause measurable concern to health and nutrition experts. The odds that any such compound will also fall within the constraints on sensory impact in a beverage is on the order of 1:1000 to 1:10,000.

SUMMARY

According to a first aspect of the present invention, beverage preservative systems are provided which comprise a sequestrant selected from the group consisting of a bio-degradable sequestrant, ethylenediamine tetraacetic acid (EDTA), a reverse sequestrant, a phosphonate, a polyphosphate, and mixtures of any of them; a weak acid selected from the group consisting of cinnamic acid, sorbic acid, their alkali metal salts (e.g., $Na^+$, $K^+$), and mixtures of any of them; and a pH of 5.8 or less; wherein the beverage preservative system prevents spoilage by microorganisms in a beverage within a sealed container for a period of at least 16 weeks.

In certain exemplary embodiments, the biodegradable sequestrant is selected from the group consisting of ethylenediamine-N,N'-disuccinic acid (EDDS), ethylenediamine-N,N'-dimalonic acid (EDDM), ethylenediamine-N,N'-diglutaric acid (EDDG), and mixtures of any of them. In this document, EDDS it is understood to be stereo isomer S,S EDDS as opposed to R,S or R,R In certain exemplary embodiments the phosphonate is selected from the group consisting of phosphonic acids, bis-phosphonic acids, N-bis-phosphonic acids, their alkali metal salts (e.g., $Na^+$, $K^+$), and mixtures of any of them. In certain exemplary embodiments, the polyphosphate is selected from the group consisting of sodium hexametaphosphate (SHMP), sodium acid metaphosphate (SAMP), and mixtures thereof.

According to another aspect of the present invention, beverages are provided which comprise a beverage component, the beverage preservative system as disclosed herein, and a pH of 5.8 or less, wherein the beverage when placed within a sealed container is substantially not spoiled by microorganisms for a period of at least 16 weeks.

These and other aspects, features, and advantages of the invention or of certain embodiments of the invention will be apparent to those skilled in the art from the following disclosure and description of exemplary embodiments.

BRIEF DESCRIPTION OF THE FIGURES

FIG. 2A depicts a yeast strain culture collection.

FIG. 3A depicts test results utilizing potassium sorbate.

FIGS. 4A-4C depict data for the combination of potassium sorbate with EDTA (30 ppm), EDDS (30 ppm), and EDDS (15 ppm), respectively.

FIGS. 5A-5B data demonstrate the combination SHMP and potassium cinnamate with EDTA and EDDS respectively.

FIGS. 6A-6D demonstrate the combination of EDDS & SHMP, EDTA & SHMP, EDDS & Eridonate, and EDTA and Eridonate, respectively.

FIGS. 7A, 7B, and 7C depict data collected from a hot-fill process.

DETAILED DESCRIPTION

Figure 1:
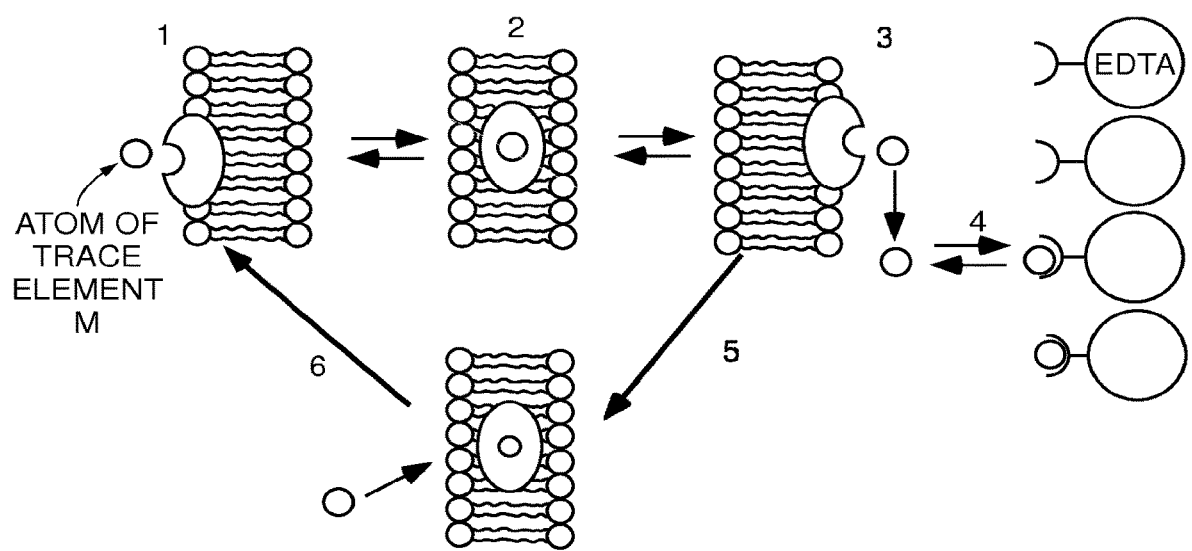
FIG. 1 depicts a sequence of events for binding and releasing a trace metal cation.

The present invention is directed to beverage preservative systems and beverage products comprising the preservative system. Among the components of the beverage preservative system or beverage product of invention, none are able to individually inhibit the growth of spoilage microorganisms when present at concentrations employed in the present invention. Only when the components are assembled together in the present invention do they yield a cascade of bio-physical interactions that serve to disrupt the metabolism of spoilage microorganisms so as to prevent their outgrowth. The components of the invention do not just provide an additive preservative effect, but work together in a synergistic manner to inhibit growth of spoilage microorganisms in a beverage within a sealed container for a period of at least 16 weeks. By virtue of the synergy between various components of the beverage preservative system of invention, a lower concentration of each component is needed than would be the case if using conventional preservatives. Thus, flavor impact of the preservative system in beverages can be reduced or minimized, and the beverage product of invention possesses surprisingly superior sensory impact, including superior flavor, aroma, and quality, compared to beverages using conventional preservatives.

Specifically, in certain exemplary embodiments, the biodegradable sequestrant or EDTA or the reverse sequestrant binds and sequesters at least copper, nickel, chromium, and aluminum cations. The phosphonate binds and sequesters at least ferrous iron, calcium and magnesium cations. When bound to a sequestrant, these metal cations are unavailable to participate in the cellular metabolism of microorganisms, thus starving the microorganism of essential minerals. Further, there is increasing evidence that the sequestrants serve to disrupt or compromise the barrier properties of microbial cell membranes, thus allowing increased permeability of membrane-soluble anti-microbial compounds. Membrane soluble anti-microbial compounds disrupt cellular physiology, such as the electron transfer system, and prevent the microorganism from growing and reproducing. Many protonated weak acids and most mono-terpenes are lipophilic and are able to disrupt cellular physiology. The preservative properties of these substances are enhanced further by reducing the availability of potassium cation. Potassium cation is required for active transport of one or more lipophilic anti-microbials out of the cell, so the microorganism is not able to expel lipophilic weak acids and mono-terpenes, which build up and damage or kill the microorganism.

In certain exemplary embodiments, the beverage preservative system or the beverage may further comprise a polyphosphate selected from the group consisting of sodium hexametaphosphate (SHMP), sodium acid metaphosphate (SAMP), and a mixture thereof. Within the pH range of 2.5 to 5.8, SAMP and SHMP can be substituted for one for the other in a ratio of 1:1 without compromising their anti-microbial effect. Substitution of one for the other is often an issue of sensory perception, particularly "mouthfeel". Certain exemplary embodiments include a polyphosphate at a concentration of about 1800 ppm or less (e.g., about 900 ppm or less, about 600 ppm or less).

The beverage preservative systems of invention are for use in high acid beverages having a pH of about 5.8 or less. In certain exemplary embodiments, the pH of the beverage preservative system or a beverage product comprising the preservative system is e.g., about pH 5.5 or less, about pH 4.6 or less, about pH 4.4 or less, about pH 2.9 to about 4.4, about pH 2.5 to about 4.5, about pH 2.6 to about 3.8.

In general, the beverage preservative system or beverage product of invention should have a total concentration of chromium, aluminum, nickel, zinc, copper, manganese, cobalt, calcium, magnesium, and iron cations in the range of about 1.0 mM or less, e.g., about 0.5 mM to 0.75 mM, about 0.54 mM or less. The present invention may optionally include added water that has been treated to remove metal cations. As opposed to the teachings of U.S. Pat. No. 6,268,003, the preferred method of treatment is via physical processes such as reverse osmosis and or electro-deionization. Treatment by chemical means, as taught in U.S. Pat. No. 6,268,003 is acceptable, but is not preferred. The use of chemical means to reduce water hardness often results in an increase in the concentration of specific mono-valent cations, e.g., potassium cations, that serve to compromise the invention described herein. In certain exemplary embodiments, the added water has been treated by reverse osmosis, electro-deionization or both to decrease the total concentration of metal cations of chromium, aluminum, nickel, zinc, copper, manganese, cobalt, calcium, magnesium, and iron to about 1.0 mM or less.

As commonly understood in the art, the definitions of the terms preserve, preservative, and preservation do not provide a standard time period for which the thing to be preserved is kept from spoilage, decomposition, or discoloration. The time period for "preservation" can vary greatly depending on the subject matter. Without a stated time period, it can be difficult or impossible to infer the time period required for a composition to act as a "preservative."

Minimal inhibitory concentration (MIC) is another term for which no standard time period is included in the definition. Typically, MIC describes the concentration of a substance which measurably inhibits the growth of a single type of microorganism as compared to a positive control without the substance. Any given MIC does not imply a specific time period over which inhibition need occur. A substance may exhibit an observable MIC during the first 24 hours of an experiment, but exhibit no measurable MIC relative to the positive control after 48 hours.

As used herein, the terms preserve, preservative, and preservation refer to a food or beverage product protected against or a composition able to inhibit the growth of spoilage microorganisms for a period of at least 16 weeks. Typically, the product is preserved under ambient conditions, which include the full range of temperatures experienced during storage, transport, and display (e.g., 0° C. to 40° C., 10° C. to 30° C., 20° C. to 25° C.) without limitation to the length of exposure to any given temperature.

At least one biodegradable sequestrant (e.g., ethylenediamine-N,N'-disuccinic acid (EDDS), ethylenediamine-N,N'-dimalonic acid (EDDM), ethylenediamine-N,N'-diglutaric acid (EDDG), or a combination of any of these), is present in certain exemplary embodiments of the beverage preservative system or beverage product comprising the preservative system disclosed here. Each binds to a number of transition metal cations with binding affinity following the Irving-Williams series: $Mn^{+2}<Fe^{+2}<Co^{+2}<Ni^{+2}<Cu^{+2}>Zn^{+2}$. Sufficient biodegradable sequestrant is included to bind cations of cobalt, chromium, copper, and nickel so as to lower the concentration of these metal cations enough to minimize binding interactions with phosphonates. Certain exemplary embodiments of the present invention include biodegradable sequestrant at a concentration in the range of about 15 ppm to about 500 ppm (e.g., about 30 ppm to about 500 ppm, about 60 ppm to about 120 ppm, about 10 ppm to about 120 ppm, about 10 ppm to about 75 ppm, about 10 ppm to about 45 ppm, about 30 ppm to about 60 ppm, about 10 ppm to about 30 ppm). The chemical structures of EDDS, EDDM, and EDDG are as follows:

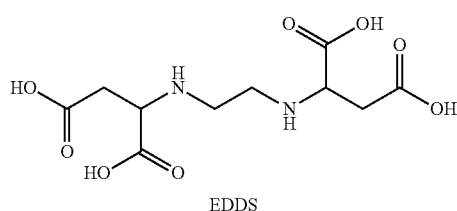

EDDS

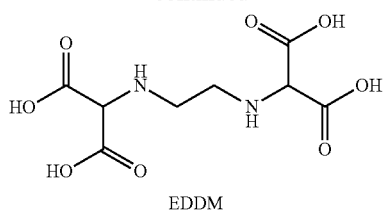

EDDM

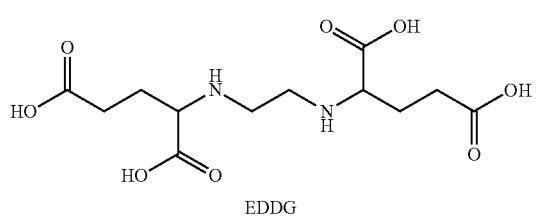

EDDG

Certain exemplary embodiments of the beverage preservative system or the beverage product of invention include a sequestrant which binds cations of chromium, aluminum, nickel, zinc, copper, manganese, and cobalt in preference to calcium or magnesium cations. A non-exclusive example of such a sequestrant is ethylenediamine tetraacetic acid (EDTA). Specifically, the various de-protonated species of the sequestrant which can bind metal cations must be present in a sufficient quantity (as a fraction of the total sequestrant) to allow binding interaction with each of the following metal cations: $Co^{+2}$, $Cr^{+3}$, $Al^{+3}$, $Fe^{+3}/Fe^{+2}$, $Cu^{+2}$, $Ni^{+2}$, $Zn^{+2}$, and $Mn^{+2}$. The pH of the solution dictates the proportions of each sequestrant species relative to the total concentration of the sequestrant. Each species of a sequestrant behaves similarly with regard to order of preference for the binding of metal cations, but different species of a sequestrant will typical differ with regard to the amount of each metal that is bound at any particular pH. The maximum amount of EDTA permitted in food and beverage products by the U.S. Food and Drug Administration is 30 ppm. In certain exemplary embodiments, the concentration of EDTA in finished beverage is about 75 ppm or less (e.g., about 45 ppm or less, about 30 ppm or less). Concentrates may contain higher concentrations, as long as the concentration in finished beverage does not exceed legal limits. In certain exemplary embodiments, the beverage preservative system or the beverage product may comprise EDTA in order to stabilize certain chemical ingredients. When EDTA is included for this purpose, it may also secondarily act as an unintended antimicrobial preservative. To stabilize chemical ingredients, EDTA is included in an amount no greater than 30 ppm. The chemical structure of EDTA is as follows:

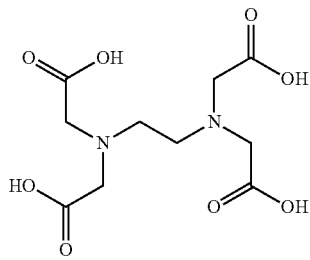 [SMILES: O=C(O)CN(CCN(CC(=O)O)CC(=O)O)CC(=O)O]

In certain exemplary embodiments, the beverage preservative system or beverage product of invention includes one or more chemicals known collectively as "reverse sequestrants." At least one class of reverse sequestrants under consideration is natural in origin. Reverse sequestrants differ from other sequestrants because of their ability to traverse lipid bi-layers such as found in the cell membrane of spoilage microorganisms. Reverse sequestrants chelate metal ions but have an overall hydrophobic structure so that they tend to partition into the non-aqueous phase of a water and oil mixture. For example, reverse sequestrants tend to dissolve into the lipid membranes of microbes and transport metal ions across the membrane. As a consequence, reverse sequestrants are able compete with nuclear and cytoplasmic structures for the trace metal cations that have been absorbed by the spoilage microorganisms. A metal cation bound to reverse sequestrant will be unavailable for metabolic reactions, and this serves to reduce the microorganism's ability to grow or to respond to damage by other types of antimicrobial substances. Furthermore, a reverse sequestrant may also transport the trace metal cation to the cell exterior (by diffusion or active expulsion) causing the metal cation to be lost to the microorganism. Certain exemplary embodiments of the beverage preservative systems or beverage products disclosed herein include at least one reverse sequestrant at a concentration of about 150 ppm or less (e.g., about 100 ppm or less, about 75 ppm or less, about 60 ppm or less, about 30 ppm to about 100 ppm).

The antimicrobial effect of reverse sequestrants is increased by inclusion of a hydrophilic sequestrant in the beverage preservative system or beverage product. Non-exclusive examples are EDTA, EDDS, EDDM, EDDG, and mixtures of any of them. Such hydrophilic sequestrants are membrane impermeable and so remain on the outside of microorganisms. However, these compounds are among the strongest sequestrants and will generally out-compete other types of sequestrants for any trace metal cations that are present. A reverse sequestrant binding a metal cation at the exterior surface of the cell membrane will be inclined to release the metal cation to the hydrophilic sequestrant. The extent and rate of transfer of a trace metal cation from a reverse sequestrant (RS) to a hydrophilic sequestrant such as EDTA can be facilitated by employing an "effective" concentration of EDTA that is greater than that of the reverse sequestrant.

The cornerstone of this embodiment of the invention can be described by the following process: (1) a reverse sequestrant binds to a trace metal cation on the cytosol side of the cell membrane of a microorganism, (2) the reverse sequestrant bound to the trace metal cation makes its way across the membrane to the cell exterior, (3) the trace metal cation is released by the reverse sequestrant at the exterior side of the cell membrane and (4) becomes bound to a hydrophilic sequestrant such as EDTA, (5) the reverse sequestrant works its way back to the cytosol side of the membrane and (6) initiates another round of metal cation transport. This sequence of events is shown schematically in FIG. 1

The preservative effect of the reverse sequestrant and the hydrophilic sequestrant may be sufficient to prevent the outgrowth of spoilage microorganisms. At a minimum, they will make spoilage microorganisms significantly more sensitive to other types of antimicrobials. It may be preferable to incorporate into the beverage preservative system a membrane soluble antimicrobial agent such as a monoterpene or a weak acid having an octanol/water partition coefficient Log P in the range of 1.1 to 5.0. To the degree that the use of reverse sequestrants permit the use of lowered concentrations of other preservative substances, the sensory impact of the beverage product is enhanced.

Various reverse sequestrants are contemplated for use in the present invention, some of which are natural compounds. Non-exclusive examples are shown below and include: 1,2-bis(o-aminophenoxy)ethane-N,N,N',N'-tetraacetic acid (BAPTA), 1,2-bis(o-aminophenoxy)ethane-N,N,N',N'-tetraacetic acid tetraacetoxymethyl ester (MAPTAM), N,N,N', N'-tetrakis-(2-pyridylmethyl)ethylenediamine (TPEN), exochelin, pyridoxal isonicotinoyl hydrazone (PIH), 2-pyridylcarboxaldehyde isonicotinoyl hydrazone (PCIH), di-2-pyridylketone isonicotinoyl hydrazone (PKIH), 2-quinolinecarboxaldehyde isonicotinoyl hydrazone (QCIH), 2-pyridylcarboxaldehyde 2-thiophenecarboxyl hydrazone (PCTH), di-2-pyridylketone 2-thiophenecarboxyl hydrazone (PKTH), 2-quinolinecarboxaldehyde 2-thiophenecarboxyl hydrazone (QCTH), 2-pyridylcarboxaldehyde m-bromobenzoyl hydrazone (PCBBH), 2-pyridylcarboxaldehyde benzoyl hydrazone (PCBH), di-2-pyridylketone benzoyl hydrazone (PKBH), 2-quinolinecarboxaldehyde benzoyl hydrazone (QCBH), 2-pyridylcarboxaldehyde p-aminobenzoyl hydrazone (PCAH), di-2-pyridylketone p-aminobenzoyl hydrazone (PKAH), 2-quinolinecarboxaldehyde p-aminobenzoyl hydrazone (QCAH), 2-pyridylcarboxaldehyde p-hydroxylbenzoyl hydrazone (PCHH), di-2-pyridylketone p-hydroxylbenzoyl hydrazone (PKHH), 2-quinolinecarboxaldehyde p-hydroxylbenzoyl hydrazone (QCHH), 2-furoylcarboxaldehyde isonicotinoyl hydrazone (FIH), and mixtures of any of them.

Reverse Sequestrants

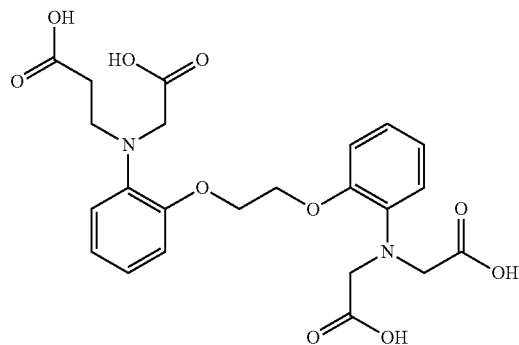

1,2-bis(o-aminophenoxy)ethane-N,N,N',N'-tetraacetic acid)
(BAPTA)

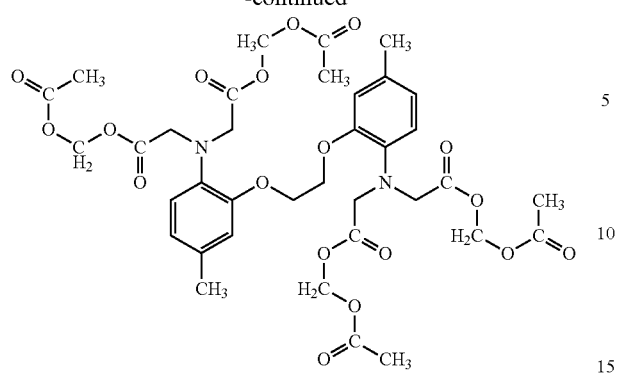

1,2-bis(o-Amino-5'-methylphenoxy)ethane-N,N,N'N'-
tetraacetic Acid Tetraacetoxymethyl Ester)
(MAPTAM)

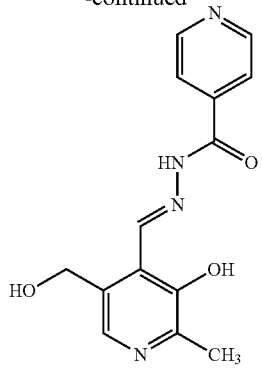

Pyridoxal isonicotinoyl hydrazone
(PIH)

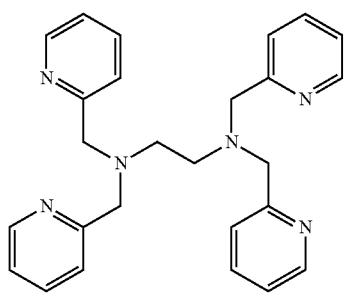

N,N,N'N'-tetrakis-(2-Pyridylmethyl)ethylenediamine
(TPEN)

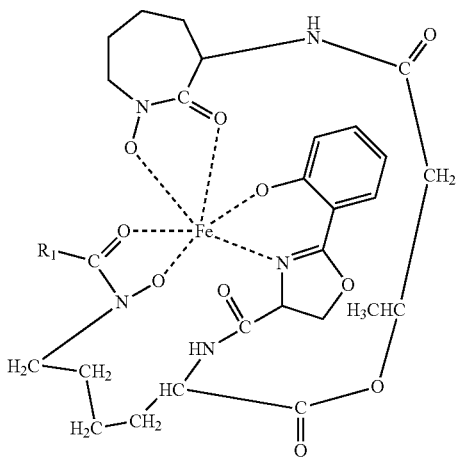

Exochelin

| | | |
|---|---|---|
| PCIH | PKIH | QCIH |
| (2-pyridylcarboxaldehyde isonicotinoyl hydrazone) | di 2-pyridylketone isonicotinoyl hydrazone | 2-quinolinecarboxaldehyde isonicotinoyl hydrazone |
| PCTH | PKTH | QCTH |
| (2-pyridylcarboxaldehyde thiophene hydrazone) | di 2-pyridylketone thiophene hydrazone | 2-quinolinecarboxaldehyde thiphene hydrazone |
| PCBH | PKBH | QCBH |
| (2-pyridylcarboxaldehyde benzoyl hydrazone) | di 2-pyridylketone benzoyl hydrazone | 2-quinolinecarboxaldehyde benzoyl hydrazone |
| PCAH | PKAH | QCAH |
| (2-pyridylcarboxaldehyde amino benzoyl hydrazone) | di 2-pyridylketone amino benzoyl hydrazone | 2-quinolinecarboxaldehyde amino benzoyl hydrazone |
| PCHH | PKHH | QCHH |
| (2-pyridylcarboxaldehyde hydroxy benzoyl hydrazone) | di 2-pyridylketone hydroxy benzoyl hydrazone | 2-quinolinecarboxaldehyde hydroxy benzoyl hydrazone |

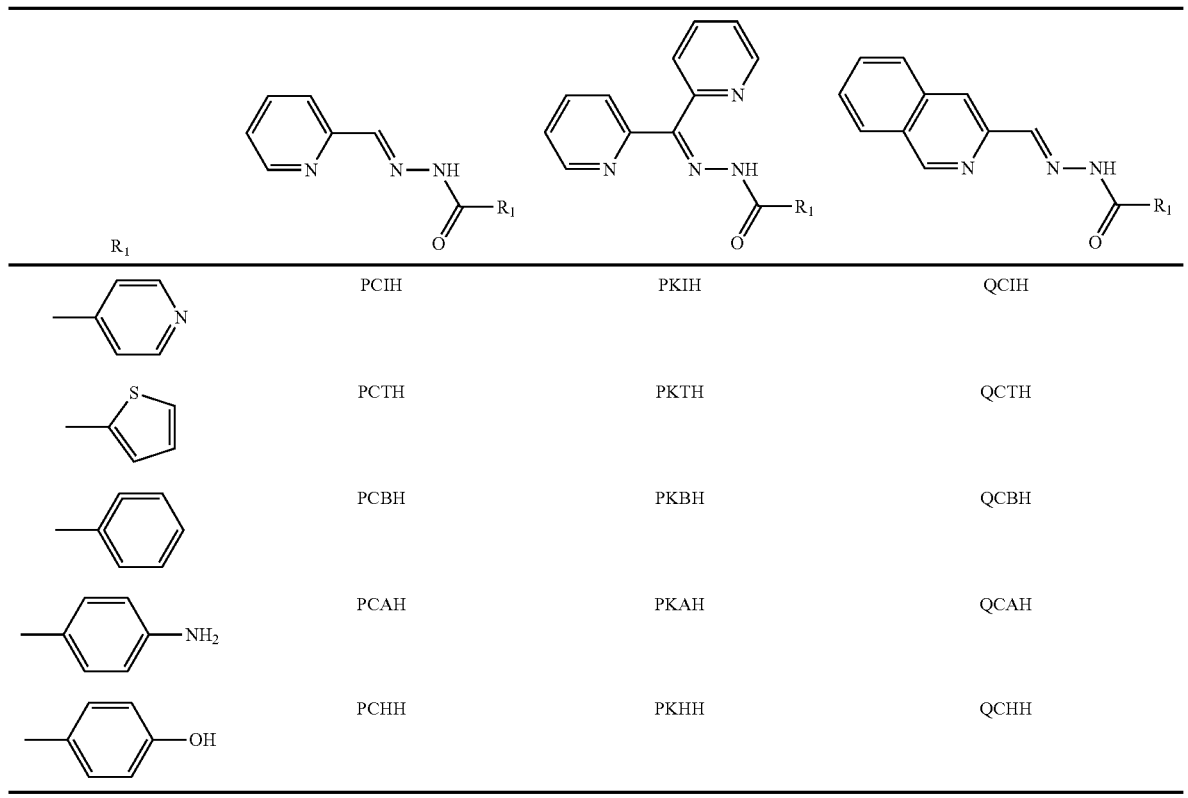

Certain exemplary embodiments of the beverage preservative system or the beverage product of invention include at least one phosphonate which tend to bind and sequester calcium and magnesium cations. Phosphonates are organic compounds having at least one C—PO(OH)$_2$ group or C—PO(OR)$_2$ group (with R= alky, aryl). Phosphonates differ markedly from phosphates in that phosphonates have a C—P bond whereas phosphates have only O—P bonds. Phosphonates include phosphonic acids, their esters, and their salts, preferably their alkali metal salts. Bis-phosphonic acids (also known as di-phosphonic acids) and their salts, preferably their alkali metal salts, are a class of phosphonate having a P—C—P bond, as exemplified below:

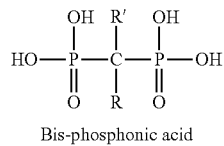

Bis-phosphonic acid

Simple phosphonates (having a C—P bond) and bis-phosphonates (having a P—C—P bond) can be further categorized by the presence of nitrogen in the molecule. For example, N-bis-phosphonates are metabolized differently than non-nitrogenous bis-phosphonates.

The term N-bis-phosphonate includes primary to quaternary amines, and also does not restrict the relative location of the nitrogen to the P—C—P bond within the molecule. A simple phosphonate containing a nitrogen is referred to as an amino-phosphonate, and similarly includes primary to quaternary amines and is not restricted to the relative location of the nitrogen to the C—P bond.

Phosphonates are not typically used as preservatives in food and beverage products, and there is no known regulatory limit on the amount of phosphonate allowed in food and beverage products at the time of this writing. However, unlike polyphosphates, phosphonates are stable at ambient and elevated temperatures in aqueous solution, and so can be used in thermally processed beverage products. Certain exemplary embodiments of the beverage preservative system or beverage product comprising the preservative system of invention include at least one phosphonate, preferably at a sufficient concentration to sequester and minimize the concentration of calcium and magnesium cations present in the composition. Certain exemplary embodiments of the present invention include phosphonate at two to three times the combined molar concentration of the calcium and magnesium cations present. For example, phosphonate may be included at a concentration in the range of 1.06 mM to 1.59 mM, about 600 ppm to about 1000 ppm, or about 220 ppm to about 540 ppm. To a degree, the ability of phosphonates to bind calcium and magnesium cations is reduced in the presence of free copper or nickel cations, and so either minimization of copper and nickel cations or the addition of another sequestrant to bind copper and nickel cations is important to the beverage preservation system.

Various phosphonates are contemplated for use in certain exemplary embodiments of the present invention. In certain exemplary embodiments, phosphonates are included at a concentration of about 2100 ppm or less (e.g., about 1800 ppm or less, about 1500 ppm or less, about 1200 ppm or less, about 950 ppm or less, about 600 ppm or less, about 150 ppm or less). Non-exclusive examples of phosphonates are shown below and include: 2-hydroxyphosphonoacetic acid (HPAA), amino tri(methylene phosphonic acid), amino trimethylene pentasodium phosphonic acid, phenylphosphonic acid (PPA), methylphosphonic acid (MPA), 2-hydroxy phosphonoacetic acid (HPAA), 2-phosphonobutane-1,2,4-tricarboxylic acid, bis(hexamethylene triamine penta(methylenephosphonic acid)), ethylenediamine tetra(methylenephosphonic acid) (EDTMP), di ethylenetriamine penta (methylenephosphonic acid), N-(phosphonoacetyl)-L-aspartate (PALA), N-cyclohexylimino di(methylenephosphonic acid), N-iso-pentylimino di(methylenephosphonic acid), N-ethylimino di(methylenephosphonic acid), N-methylimino di(methylenephosphonic acid), N-3-benzylimino di(methylenephosphonic acid), N-iso-pentylimino di(methylenephosphonic acid), N-3-picolylimino di(methylenephosphonic acid), N-2-methyltetrahydrofurylimino di(methylenephosphonic acid), and mixtures of any of them.

Phosphonate (Phosphonic Acids)

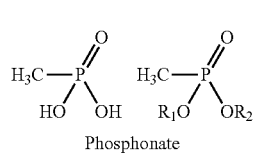

Phosphonate

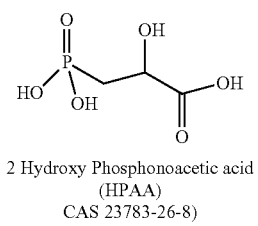

2 Hydroxy Phosphonoacetic acid (HPAA)
CAS 23783-26-8)

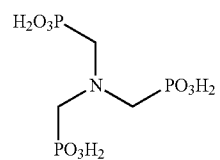

Amino tri (methylene phosphonic acid) CAS 6419-19-8

Amino tri methylene penta sodium phosphonic acid CAS 2235-43-0

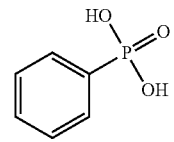

Phenylphosphonic acid (PPA)

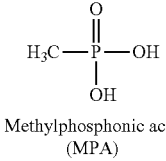

Methylphosphonic acid (MPA)

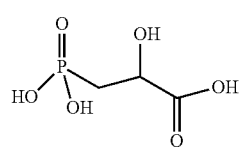

2 Hydroxy Phosphonoacetic acid (HPAA)
CAS 23783-26-8)

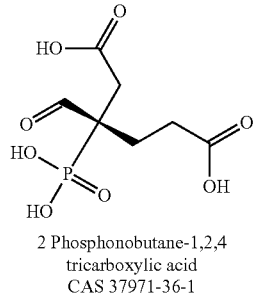

2 Phosphonobutane-1,2,4 tricarboxylic acid
CAS 37971-36-1

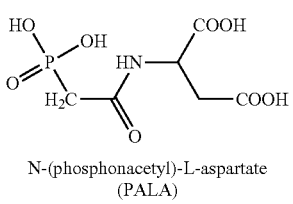

N-(phosphonacetyl)-L-aspartate (PALA)

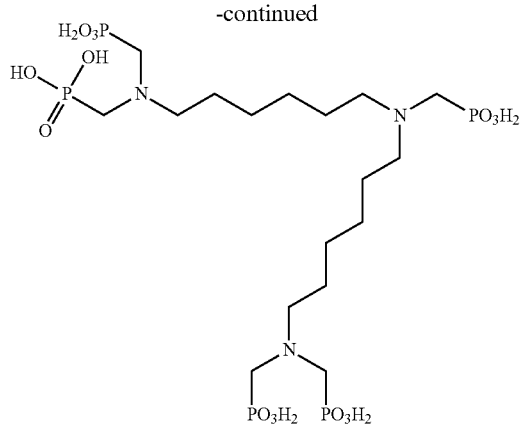

bis(hexamethylene triamine penta(methylenephosphonic acid

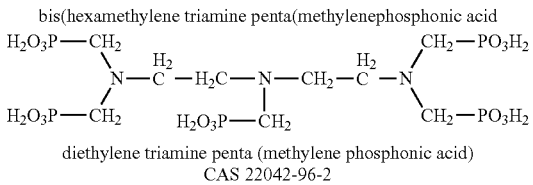

diethylene triamine penta (methylene phosphonic acid)
CAS 22042-96-2

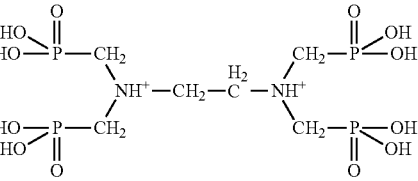

ethylene diamine tetramethylene phosphonic acid

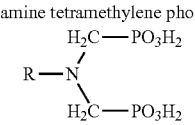

R =

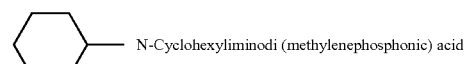 N-Cyclohexyliminodi (methylenephosphonic) acid (CH$_3$)$_2$CH(CH$_2$)$_2^-$ N-iso-pentylimindi (methylenephosphonic acid)

CH$_3$CH$_2^-$ N-methyliminodi (methylenephosphonic acid)

CH$_3$— N-methyliminodi (methylenephosphonic acid)

(C$_6$H$_5$)CH$_2^-$ N-3-benzyliminodi (methylenephosphonic acid)

(CH$_3$)$_2$CH(CH$_2$)$_2^-$ N-iso-pentyliminodi(methylenephosphonic acid)

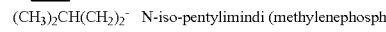 N-3-picolyliminodi(methylenephosphonic acid)

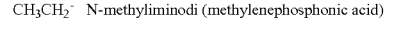 N-2-methyltetrahydrofuryliminodi(methylenephosphonic acid)

Various bis-phosphonates are contemplated for use in certain exemplary embodiments of the present invention. In certain exemplary embodiments, bis-phosphonates are included at a concentration of about 1800 ppm or less (e.g., about 1500 ppm or less, about 1200 ppm or less, about 800 ppm or less, about 500 ppm or less, about 125 ppm or less, about 600 ppm to about 1000 ppm, about 220 ppm to about 540 ppm). Non-exclusive examples of bis-phosphonates are shown below and include:

etidronate ((1-hydroxyethylidene)bis-phosphonate), clodronate, methylene diphosphonic acid (MDPA), tiludronate ([(4-chlorophenyl)thio]-methylene bis-phosphonate), tetraethyl 2-(3,5-di-tert-butyl-4-hydroxyphenyl) ethenyl-1,1-bis-phosphonate, 1-hydroxyethane-1,1-diphosphonic acid (HEDP), vinylidene-1,1-diphosphonic acid (VDP), 2-sulfonatoethylidene-1,1-diphosphonic acid (SEDP), and mixtures of any of them.

Bis-Phosphonic Acids/Bis-Phosphonates

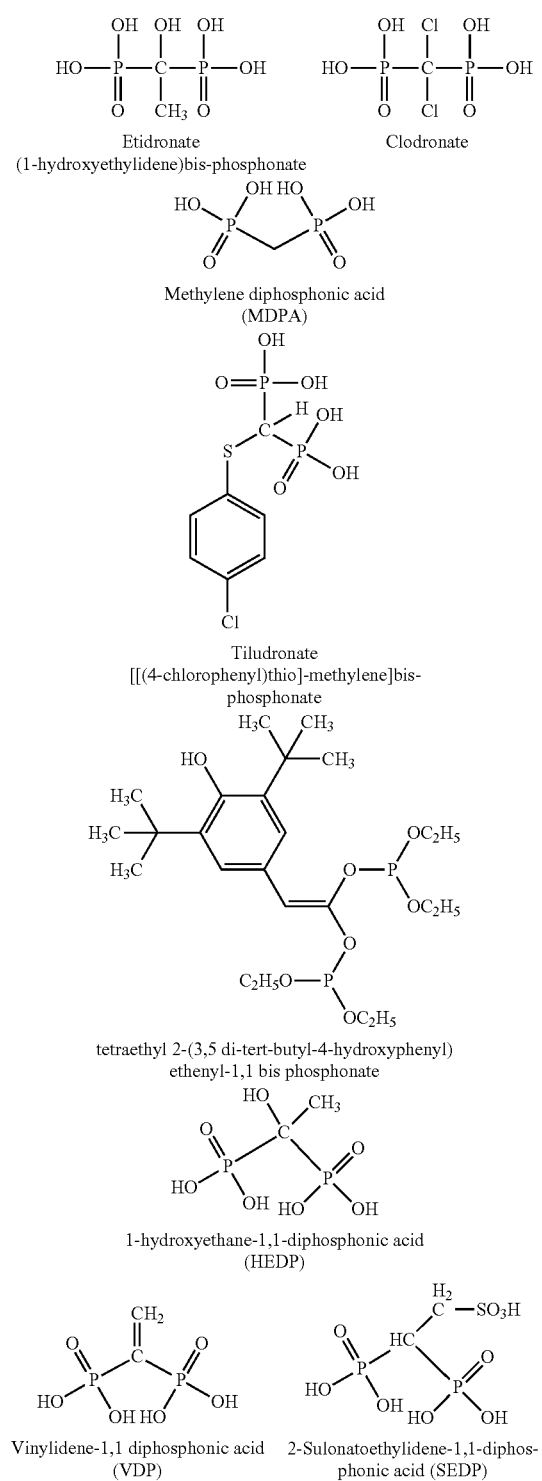

Various N-bis-phosphonic acids are contemplated for use in certain exemplary embodiments of the present invention. In certain exemplary embodiments, N-bis-phosphonic acids are included at a concentration of about 1800 ppm or less (e.g., about 1500 ppm or less, about 1200 ppm or less, about 800 ppm or less, about 500 ppm or less, about 125 ppm or less). Non-exclusive examples of N-bis-phosphonic acids are shown below and include: pamidronate, neridronate, olpadronate, risedronate, alendronate, zoledronate, ibandronate, incadronate, minodronate, piperidin-1-yl-methane-1,1-diphosphonic acid and derivatives thereof having at least one methyl or ethyl substituent on the piperidinyl ring, and mixtures of any of them.

N—Bis-Phosphonic Acids

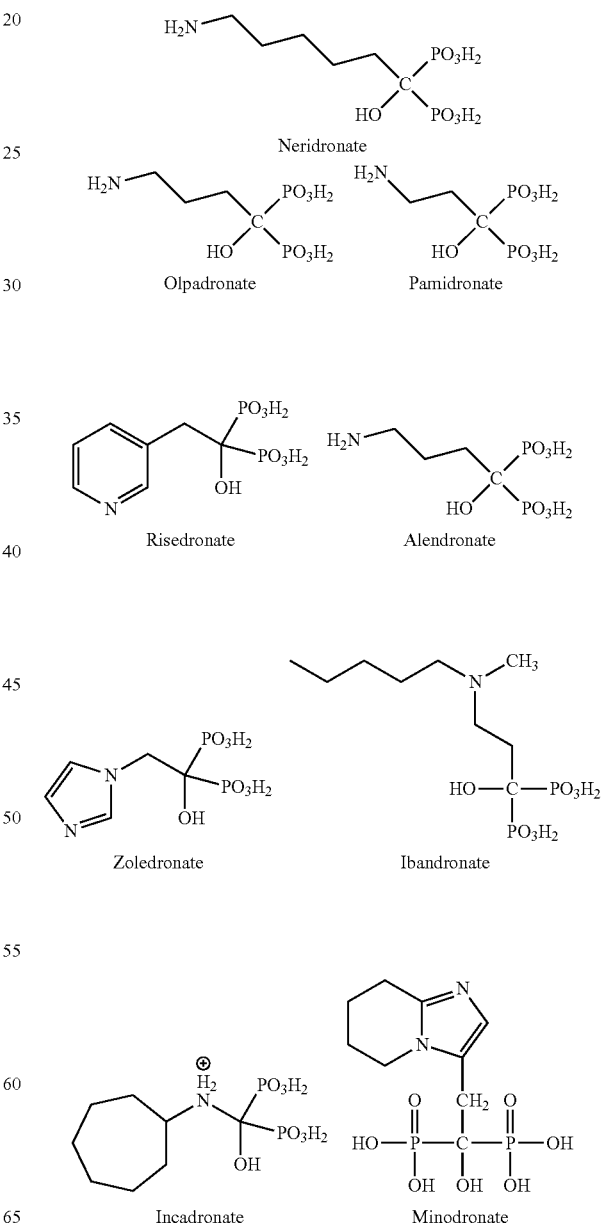

Piperyd-1-yl-methane-1,1 diphosphonic Acid Derivatives

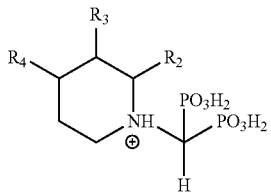

1- $R_2 = R_3 = R_4 = H$
2- $R_4 = CH_3, R_2 = R_3 = H$
3  $R_3 = CH_3, R_2 = R_4 = H$
4  $R_2 = CH_3, R_3 = R_4 = H$
5  $R_2 = CH_2CH_3, R_3 = R_4 = H$

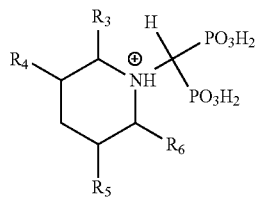

6- $R_3 = R_5 = CH_4, R_2 = R_6 = H$
7- $R_2 = R_6 = CH_4, R_3 = R_5 = H$

1

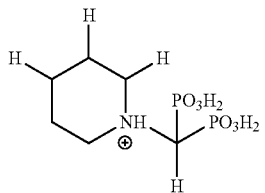

2

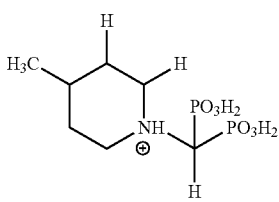

3

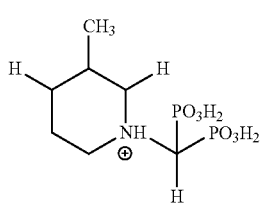

4

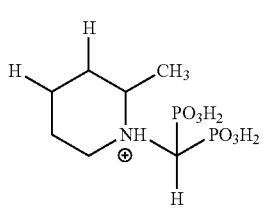

5

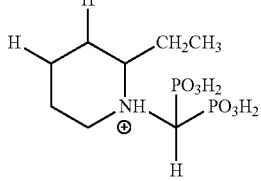

6

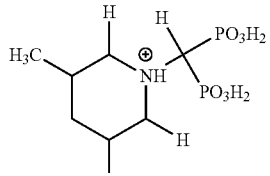

7

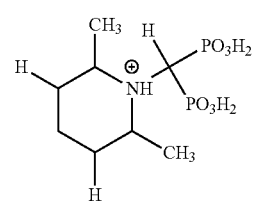

Certain exemplary embodiments of the present invention include a mono-terpene and/or a weak acid, each having an octanol/water partition coefficient Log P in the range of 1.1 to 5.0, which has been found to disrupt cellular function as assayed by methods such as flow cytometry. The weak acid should predominantly exist in its protonated form at pH below 4. Non-limiting examples of such weak acids are cinnamic acid (e.g., trans-cinnamic acid) and sorbic acid. Additionally, esters of hydroxybenzoic acid may be included. When included with sequestrants in the beverage preservative systems and beverage products of invention, lower than expected concentrations of mono-terpene and/or weak acid are required for a preservative effect. It is believed that metal cations which are bound by sequestrants are then unavailable to degrade the mono-terpenes and/or weak acids, and render the cell membranes of microorganisms more permeable to these anti-microbial compounds. Certain exemplary embodiments of the present invention include the mono-terpene, the weak acid, or a mixture thereof at a concentration in the range of about 500 ppm or less, e.g., about 150 ppm or less, about 25 ppm to about 200 ppm. Certain exemplary embodiments of the present invention include trans-cinnamic acid at a concentration in the range of about 50 ppm to about 150 ppm. Certain exemplary embodiments of the present invention include sorbic acid at a concentration in the range of about 500 ppm to about 800 ppm. Certain exemplary embodiments include a weak acid at a concentration in the range of about 10 ppm to about 850 ppm (e.g., about 10 ppm to about 650 ppm, about 100 ppm to about 500 ppm, about 500 ppm to about 800 ppm, about 250 ppm to about 500 pm, about 100 ppm to about 250 ppm, about 10 ppm to about 50 ppm).

Certain exemplary embodiments of the beverage preservative system or beverage product of invention include a surfactant such as lauric arginate. The surfactant compromises the outer protective barrier of the spoilage microorganism, thus rendering its cell membrane more permeable to the above preservative compounds. In certain exemplary embodiments, lauric arginate is included at a concentration in the range of about 2.5 ppm to about 25 ppm. The chemical structure of lauric arginate is as follows:

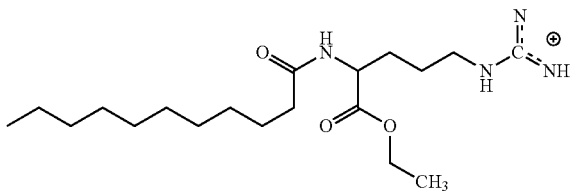

Certain exemplary embodiments of the beverage preservative system or beverage product of invention have minimal levels of potassium cation. A lack of potassium cations prevents microorganisms from actively expelling preservatives such as mono-terpenes, weak acids, and esters of hydroxybenzoic acid, thus enhancing the anti-microbial effect of these preservatives. This factor is one of the reasons why it is preferred that treatment of added water should not include chemical methods such as ion-exchange that can lead to increased concentration of potassium ion. In certain exemplary embodiments, the concentration of potassium ion is about 150 mM or less, e.g. about 75 ppm or less, about 15 mM or less, about 15 ppm or less.

Beverage products according to the present invention include both still and carbonated beverages wherein the beverage pH is in the range of 5.8 or below (e.g., about pH 5.5 or less, about pH 4.6 or less, about pH 4.4 or less, about pH 2.9 to about 4.4, about pH 2.5 to about 4.5, about pH 2.6 to about 3.8). Herein, the term carbonated beverage is inclusive of any combination of water, juice, flavor and sweetener that is meant to be consumed as an alcohol free liquid and which also is made to possess a carbon dioxide concentration of 0.2 volumes of $CO_2$ or greater. The term "volume of $CO_2$" is understood to mean a quantity of carbon dioxide absorbed into the liquid wherein one volume $CO_2$ is equal to 1.96 grams of carbon dioxide ($CO_2$) per liter of product (0.0455M) at 25° C. Non-inclusive examples of carbonated beverages include flavored seltzer waters, juices, cola, lemon-lime, ginger ale, and root beer beverages which are carbonated in the manner of soft drinks, as well as beverages that provide health or wellness benefits from the presence of metabolically active substances, such as vitamins, amino acids, proteins, carbohydrates, lipids, or polymers thereof. Such products may also be formulated to contain milk, coffee, or tea or other botanical solids. It is also possible to formulate such beverages to contain one or more nutraceuticals. Herein, a nutraceutical is a substance that has been shown to possess, minimally, either a general or specific health benefit or sense of wellness as documented in refereed professional journals or texts. Nutraceuticals do not necessarily act to either cure or prevent specific types of medical conditions.

Herein, the term "still beverage" is any combination of water and ingredient which is meant to be consumed in the manner of an alcohol free liquid beverage and which possess no greater than 0.2 volumes carbon dioxide. Non-inclusive examples of still beverages include flavored waters, tea, coffee, nectars, mineral drinks, sports beverages, vitamin waters, juice-containing beverages, punches or the concentrated forms of these beverages, as well as beverage concentrates which contain at least about 45% by weight of juice. Such beverages may be supplemented with vitamins, amino acids, protein-based, carbohydrate-based or lipid-based substances. As noted, the invention includes juice containing products, whether carbonated or still. "Juice containing beverages" or "Juice beverages", regardless of whether still or carbonated, are products containing some or all the components of a fruit, vegetable or nuts or mixture thereof that can either be suspended or made soluble in the natural liquid fraction of the fruit.

The term vegetable, when used herein, is inclusive both fruiting and the non-fruit but edible portion of plants such as tubers, leaves, rinds, and also, if not otherwise indicated, any grains, nuts, beans, and sprouts which are provided as juices or beverage flavorings. Unless dictated by local, national regional regulatory agencies the selective removal of certain substances (pulp, pectins, etc) does not constitute an adulteration of a juice.

By way of example, juice products and juice drinks can be obtained from the fruit of apple, cranberry, pear, peach, plum, apricot, nectarine, grape, cherry, currant, raspberry, goose-berry, blackberry, blueberry, strawberry, lemon, orange, grapefruit, passionfruit, mandarin, mirabelle, tomato, lettuce, celery, spinach, cabbage, watercress, dandelion, rhubarb, carrot, beet, cucumber, pineapple, custard-apple, coconut, pomegranate, guava, kiwi, mango, papaya, watermelon, lo han guo, cantaloupe, pineapple, banana or banana puree, lemon, tomato, mango, papaya, lime, tangerine, cherry, raspberry, carrot and mixtures thereof. Preferred juices are the citrus juices, and most preferred are the non-citrus juices, apple, pear, cranberry, strawberry, grape, papaya, mango and cherry.

Not all ranges of juice concentration can be employed. The invention could be used to preserve a formulation that is essentially 100% juice if then the presence of specific metal cation species are not exceeded. Another possibility would be to treat the juice in such a manner as to lower the concentration of specific metal cation species. Similar issues arise for juice beverages, which typically contain at least 95% juice. Formulations containing juice concentrations as high as 10% may be preserved by this invention and certainly. A beverage containing less than 10% juice would be very likely preserved by this invention a beverage containing no more than 5% juice would be preserved by this invention. Any juice can be used to make the beverage of this invention. If a beverage concentrate is desired, the fruit juice is concentrated by conventional means to from about 20° Brix to about 80° Brix. Beverage concentrates are usually 40° Brix or higher (about 40% to about 75% sugar solids).

Typically, beverages will possess a specified range of acidity. Acidity of a beverage is largely determined by the type of acidulant, its concentration, and the propensity of protons associated with the acid to dissociate away from the acid when the acid is entered into solution. Any solution with a measurable pH between 0-14 possesses some measure of acidity. However, those solutions with pH below 7 are generally understood to be acidic and those above pH 7 are understood to be basic. The acidulant can be organic or inorganic. Non-exclusive examples of organic acids are citric, malic, ascorbic, tartaric, lactic, gluconic, and succinic acids. Non-exclusive examples of inorganic acids are the phosphoric acid compounds and the mono- and di-potassium salts of these acids. (Mono- and di-potassium salts of phosphoric acid possess at least one proton that can contribute to acidity).

The various acids can be combined with salts of the same or different acids in order to manage pH or the buffer capacity of the beverage to a specified pH or range of pH. The invention can function at a pH as low as 2.6, but the invention will function best as the pH is increased from 2.6 up to pH 3.8. The invention is not limited by the type of acidulant employed in acidifying the product as long as the final pH of the product does not exceed pH 5.8, preferably not exceeding pH 4.5. Virtually any organic acid salt can be used so long as it is edible and does not provide an off-flavor. The choice of salt or salt mixture will be determined by the solubility and the taste. Citrate, malate and ascorbate yield ingestible complexes whose flavors are judged to be quite acceptable, particularly in fruit juice beverages. Tartaric acid is acceptable, particularly in grape juice beverages, as is lactic acid. Longer-chain fatty acids may be used but can affect flavor and water solubility. For essentially all purposes, the malate, gluconate, citrate and ascorbate moieties suffice.

Certain exemplary embodiments of the beverage product of invention include sports (electrolyte balancing) beverages (carbonated or non-carbonated). Typical sport beverages contain water, sucrose syrup, glucose-fructose syrup, and natural or artificial flavors. These beverages can also contain sodium chloride, citric acid, sodium citrate, mono-potassium phosphate, as well as other natural or artificial substances which serve to replenish the balance of electrolytes lost during perspiration.

In certain exemplary embodiments, the present invention is also includes beverage formulations supplemented with fat soluble vitamins. Non-exclusive examples of vitamins include fat-soluble vitamin E or its esters, vitamin A or its esters, vitamin K, and vitamin D3, especially vitamin E and vitamin E acetate. The form of the supplement can be powder, gel or liquid or combination thereof. Fat-soluble vitamins may be added in a restorative amount, i.e. enough to replace vitamin naturally present in a beverage such as juice or milk, which may have been lost or inactivated during processing. Fat-soluble vitamins may also be added in a nutritionally supplemental amount, i.e. an amount of vitamin considered advisable for a child or adult to consume based on RDAs and other such standards, preferably from about one to three times the RDA (Recommended Daily Amount). Other vitamins which can be added to the beverages include vitamin B niacin, pantothenic acid, folic acid, vitamin D, vitamin E, vitamin B and thiamine. These vitamins be added at levels of from 10% to 300% RDA. It need be recognized that a potential exists for some types of guest molecules or complexes to become entrapped into certain types of micelles, liposomes, or fat globules but this can only be characterized on a case by case basis.

Supplements: The invention can be compromised by the presence of certain types of supplements but it is not an absolute and it will vary from beverage formulation to beverage formulation. The degree to which the invention is compromised will depend on the nature of the supplement and the resulting concentration of specific metal cations in the beverage as a consequence of the presence of the supplement. For example, calcium supplements can compromise the invention, but not to the same degree as chromium supplements. Calcium supplements may be added to the degree that a critical value total calcium concentration is not exceeded (e.g., ⅓ to ½ the molar concentration of diphosphonic acid in the beverage). Calcium sources that are compatible with the invention include calcium organic acid complexes. Among the preferred calcium sources is "calcium citrate-malate", as described in U.S. Pat. Nos. 4,786,510 and 4,786,518 issued to Nakel et al. (1988) and U.S. Pat. No. 4,722,847 issued to Heckert (1988). Other calcium sources compatible with the invention include calcium acetate, calcium tartrate, calcium lactate, calcium malate, calcium citrate, calcium phosphate, calcium orotate, and mixtures thereof. Calcium chloride and calcium sulfate can also be included; however at higher levels they taste astringent.

Flavor Component: Beverage products according to the present invention can contain flavors of any type. The flavor component of the present invention contains flavors selected from artificial, natural flavors, botanical flavors fruit flavors and mixtures thereof. The term "botanical flavor" refers to flavors derived from parts of a plant other than the fruit; i.e. derived from bean, nuts, bark, roots and leaves. Also included within the term "botanical flavor" are synthetically prepared flavors made to simulate botanical flavors derived from natural sources. Examples of such flavors include cocoa, chocolate, vanilla, coffee, kola, tea, and the like. Botanical flavors can be derived from natural sources such as essential oils and extracts, or can be synthetically prepared. The term "fruit flavors" refers to those flavors derived from the edible reproductive part of a seed plant, especially one having a sweet pulp associated with the seed. Also included within the term "fruit flavor" are synthetically prepared flavors made to simulate fruit flavors derived from natural sources.

Artificial flavors can also be employed. Non-exclusive examples of artificial flavors include chocolate, strawberry, vanilla, cola, or artificial flavors that mimic a natural flavor can be used to formulate a still or carbonated beverage flavored to taste like fruit. The particular amount of the flavor component effective for imparting flavor characteristics to the beverage mixes of the present invention ("flavor enhancing") can depend upon the flavor(s) selected, the flavor impression desired, and the form of the flavor component. The flavor component can comprise at least 0.005% by weight of the beverage composition.

On a case by case basis, the beverage preservative system according to the present invention is compatible with beverages formulated to contain aqueous essence. As used herein, the term "aqueous essence" refers to the water soluble aroma and flavor materials which are derived from, fruit juices. Aqueous essences can be fractionated, concentrated or folded essences, or enriched with added components. As used herein, the term "essence oil" refers to the oil or water insoluble fraction of the aroma and flavor volatiles obtained from juices. Orange essence oil is the oily fraction which separates from the aqueous essence obtained by evaporation of orange juice. Essence oil can be fractionated, concentrated or enriched. As used herein, the term "peel oil" refers to the aroma and flavor derived from oranges and other citrus fruit is largely composed of terpene hydrocarbons, e.g. aliphatic aldehydes and ketones, oxygenated terpenes and sesquiterpenes. From about 0.002% to about 1.0% of aqueous essence and essence oil are used in citrus flavored juices.

Sweetener Component: The present invention is not affected by the type or concentration of sweeteners, wherein in sweetener is among those commonly employed for use in beverages. The sweetener can include a monosaccharide or a disaccharide. A certain degree of purity from contamination by metal cations will be expected. Peptides possessing sweet taste are also permitted. The most commonly employed saccharides include sucrose, fructose, dextrose, maltose and lactose and invert sugar. Mixtures of these sugars can be used. Other natural carbohydrates can be used if less or more sweetness is desired. Other types of natural sweeteners structured from carbon, hydrogen and oxygen, e.g., rebaudioside A, stevioside, Lo Han Guo, mogroside V, monatin, can also be used. The present invention is also compatible with artificial sweeteners. By way of example, artificial sweeteners include saccharin, cyclamates, acetosulfam, mogroside, Laspartyl-L-phenylalanine lower alkyl ester sweeteners (e.g. aspartame), L-aspartyl-D-alanine amides as disclosed in U.S. Pat. No. 4,411,925 to Brennan et al. (1983), L-aspartyl-D-serine amides as disclosed in U.S. Pat. No. 4,399,163 to Brennan et al., (1983), L-aspartyl-L-lhydroxymethyl alkaneamide sweeteners as disclosed in U.S. Pat. No. 4,338,346 to Brand, issued Dec. 21, 1982, L-aspartyl-1-hydroxy ethylakaneamide sweeteners as disclosed in U.S. Pat. No. 4,423,029 to Rizzi, (1983), L-aspartyl-D-phenylglycine ester and amide sweeteners as disclosed in European Patent Application 168,112 to J. M. Janusz, published Jan. 15, 1986, and the like. A particularly preferred sweetener is aspartame. The amount of the sweetener effective in the beverage mixes of the invention depends upon the particular sweetener used and the sweetness intensity desired.

Head space atmosphere: The presence of either air in the headspace of the beverage product will have no measurable impact on the composition of the invention. The presence of carbon dioxide gas or other gases that cause the exclusion of oxygen from the beverage (nitrogen, nitrous oxide, etc) may permit the use of reduced concentrations of chemical preservatives employed along with the sequestrants. The concentration of sequestrants required will be dictated only by the type and amount of metal cations that are present in the beverage product.

In some instances, EDTA may need to be present where the purpose is to stabilize chemical ingredients. When it is added for this purpose, it will fulfill the un-intended second role should it participate as an un-intended antimicrobial preservative. To fulfill the role of stabilization of chemical ingredients, EDTA need not be present in an amount greater than 30 ppm.

Assuming compliance to upper limit constraints for the concentration of Copper, Cobalt, Iron, Zinc, Aluminum, Chromium, and Nickel, the amount of preservatives listed in Example 1 that are required to stabilize a beverage are found to be dictated by the combined effect of two factors; the concentration of Calcium and the concentration of Assimilable Nitrogen. Assimilable Nitrogen is principally an estimate of the reduced form of nitrogen (NH and $NH_2$) available in solution and serves as a estimate for the availability of those forms of nitrogen (ammonia, urea, amino acids and peptides) that can be employed as nutrients by the spoilage microorganism. A measure of total nitrogen would include all forms of nitrogen, some (Nitrate and Nitrite) which are not assimilable by fungi and many types of spoilage bacteria. Exemplary ranges for the concentration of biodegradable sequestrant and weak acid for Ex. 1 are shown below.

| Formulation Requirements Example 1 | [Ca++] < 0.26 mM | 0.26 mM < [Ca++] < 0.43 mM | 0.43 mM < [Ca++] < 0.764M |
|---|---|---|---|
| AN < 3 ppm | 10 ppm < [WA] < 50 ppm 10 ppm < [BDS] < 30 ppm | 1 ppm < [WA] < 50 ppm 30 ppm < [BDS] < 60 ppm | 1 ppm < [WA] < 50 ppm 60 ppm < [BDS] < 120 ppm |
| 3 ppm < AN < 10 ppm | 50 ppm < [WA] < 50 ppm 10 ppm < [BDS] < 30 ppm | 100 ppm < [WA] < 250 ppm 30 ppm < [BDS] < 60 ppm | 250 ppm < [WA] < 500 ppm 60 ppm < [BDS] < 120 ppm |
| 10 ppm < AN < 20 ppm | 100 ppm < [WA] < 250 ppm 10 ppm < [BDS] < 30 ppm | 250 ppm < [WA] < 500 ppm 30 ppm < [BDS] < 60 ppm | 500 ppm < [WA] < 800 ppm 60 ppm < [BDS] < 120 ppm |

WA = weak acid
BDS = bio degradable sequestrant
AN = Assimilable Nitrogen

The following example is a specific embodiment of the present invention, but is not intended to limit it. Any patent document referenced herein is incorporated in its entirety for all purposes.

Example 1

According to one embodiment of the invention, a beverage preservative system is provided which comprises:
a. sorbic acid, cinnamic acid, alkali metal salts thereof (e.g., $K^+$, $Na^+$), or mixtures of any of them that result in specific concentrations of cinnamic or sorbic acid as determined by final beverage pH;
b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and
c. a pH of 5.8 or less;
d. wherein the beverage preservative system prevents spoilage by microorganisms in a beverage within a sealed container for a period of at least 16 weeks.

In the following examples, in some instances, EDTA may need to be present where the purpose is to stabilize chemical ingredients. When it is added for this purpose, it will fulfill the un-intended second role should it participate as an un-intended antimicrobial preservative. To fulfill the role of stabilization of chemical ingredients, EDTA need not be present in an amount greater than 30 ppm.

In the following examples which utilize SAMP and SHMP, within the pH range of 2.5 to 5.8, SAMP and SHMP can substitute for one another in a ratio of 1:1 without compromising the anti-microbial effect. Substitution of one for other is often an issue of sensory perception, particularly "mouthfeel".

In the following examples which utilize phosphonic acids or phosphonates, phosphonic acids disclosed above can substitute for one another in a ratio of 1:1 without compromise to anti-microbial effect. Substitution of one for other is often an issue of sensory perception, particularly "mouth feel". It is anticipated that any currently known monomer phosphonate will function similar to those disclosed above.

In the following examples which utilize bis-phosphonates, the basic structure and description of bis-phosphonates are disclosed above. Structures above can substitute for one another in a ratio of 1:1 without compromise to anti-microbial effect. Substitution of one for other is often an issue of sensory perception, particularly "mouth feel". It is anticipated that any currently known monomer bis-phosphonate will function similar to those found above with regard to antimicrobial effect.

In the following examples which utilize N-bis-phosphonates, the basic structure and description of N-bis-phosphonate is disclosed above. Structures above can substitute for one another in a ratio of 1:1 without compromise to anti-microbial effect. Substitution of one for other is often an issue of sensory perception, particularly "mouth feel". It is anticipated that any currently known monomer bis-phosphonate will function similar to those found above with regard to antimicrobial effect.

In the following examples that utilize reverse sequestrants, the basic structure and description of reverse sequestrants is disclosed above. Structures above can substitute for one another in a ratio of 1:1 without compromise to anti-microbial effect. Substitution of one for other is often an issue of sensory perception, particularly "mouth feel". It is anticipated that any currently known reverse sequestrant will function similar to those found above with regard to anti-microbial effect. Reverse sequestrants possess demonstrated hydrophobic structure and a tendency to partition in the non-aqueous phase of a water and oil mixture.

Example 2

According to another embodiment of the invention, a beverage preservative system is provided which comprises:
  a. sorbic acid, cinnamic acid, alkali metal salts thereof (e.g., $K^+$, $Na^+$), or mixtures of any of them that result in specific concentrations of cinnamic or sorbic acid as determined by final beverage pH;
  b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and
  c. a pH of 5.8 or less;
  d. wherein the beverage preservative system prevents spoilage by microorganisms in a beverage within a sealed container for a period of at least 16 weeks.

EDTA may need to be present where the purpose is to stabilize chemical ingredients.

The beverage preservative system also comprises Sodium Hexametaphosphate (SHMP), Sodium Acid Metaphosphate (SAMP), or mixture of SHMP and SAMP to a prescribed total amount.

Example 3

According to another embodiment of the invention, a beverage preservative system is provided which comprises:
  a. sorbic acid, cinnamic acid, alkali metal salts thereof (e.g., $K^+$, $Na^+$), or mixtures of any of them that result in specific concentrations of cinnamic or sorbic acid as determined by final beverage pH;
  b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and
  c. a pH of 5.8 or less;
  d. wherein the beverage preservative system prevents spoilage by microorganisms in a beverage within a sealed container for a period of at least 16 weeks.

EDTA may need to be present where the purpose is to stabilize chemical ingredients.

The beverage preservative system also comprises a phosphonate or phosphonic acid to a prescribed total amount wherein the composition contains any number of types of phosphonate structures such that a total amount of phosphonate is achieved.

Example 4

According to another embodiment of the invention, a beverage preservative system is provided which comprises:
  a. sorbic acid, cinnamic acid, alkali metal salts thereof (e.g., $K^+$, $Na^+$), or mixtures of any of them that result in specific concentrations of cinnamic or sorbic acid as determined by final beverage pH;
  b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and
  c. a pH of 5.8 or less;
  d. wherein the beverage preservative system prevents spoilage by microorganisms in a beverage within a sealed container for a period of at least 16 weeks.

EDTA may need to be present where the purpose is to stabilize chemical ingredients.

The beverage preservative system also comprises a phosphonate or phosphonic acid to a prescribed total amount wherein the composition contains any number of types of phosphonate structures such that a total amount of phosphonate is achieved.

The beverage preservative system also comprises Sodium Hexametaphosphate (SHMP) Sodium Acid Metaphosphate (SAMP), or mixture of SHMP and SAMP to a prescribed total amount.

Example 5

According to another embodiment of the invention, a beverage preservative system is provided which comprises:
  a. sorbic acid, cinnamic acid, alkali metal salts thereof (e.g., $K^+$, $Na^+$), or mixtures of any of them that result in specific concentrations of cinnamic or sorbic acid as determined by final beverage pH;
  b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and
  c. a pH of 5.8 or less;
  d. wherein the beverage preservative system prevents spoilage by microorganisms in a beverage within a sealed container for a period of at least 16 weeks.

EDTA may need to be present where the purpose is to stabilize chemical ingredients.

The beverage preservative system also comprises a phosphonate or phosphonic acid to a prescribed total amount wherein the composition contains any number of types of phosphonate structures such that a total amount of phosphonate is achieved.

The beverage preservative system also comprises Sodium Hexametaphosphate (SHMP) Sodium Acid Metaphosphate (SAMP), or mixture of SHMP and SAMP to a prescribed total amount.

Example 6

According to another embodiment of the invention, a beverage preservative system is provided which comprises:
a. sorbic acid, cinnamic acid, alkali metal salts thereof (e.g., $K^+$, $Na^+$), or mixtures of any of them that result in specific concentrations of cinnamic or sorbic acid as determined by final beverage pH;
b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and
c. a pH of 5.8 or less;
d. wherein the beverage preservative system prevents spoilage by microorganisms in a beverage within a sealed container for a period of at least 16 weeks.

The beverage preservative system also comprises a bis-phosphonate to a prescribed total amount wherein the composition contains any number of types of bis-phosphonate structures such that a total amount of bis-phosphonate is achieved.

The beverage preservative system also comprises a phosphonate or phosphonic acid to a prescribed total amount wherein the composition contains any number of types of phosphonate structures such that a total amount of phosphonate is achieved.

Example 7

According to another embodiment of the invention, a beverage preservative system is provided which comprises:
a. sorbic acid, cinnamic acid, alkali metal salts thereof (e.g., $K^+$, $Na^+$), or mixtures of any of them that result in specific concentrations of cinnamic or sorbic acid as determined by final beverage pH;
b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and
c. a pH of 5.8 or less;
d. wherein the beverage preservative system prevents spoilage by microorganisms in a beverage within a sealed container for a period of at least 16 weeks.

EDTA may need to be present where the purpose is to stabilize chemical ingredients.

The beverage preservative system also comprises a bis-phosphonate to a prescribed total amount wherein the composition contains any number of types of bis-phosphonate structures such that a total amount of bis-phosphonate is achieved.

The beverage preservative system also comprises a phosphonate or phosphonic acid to a prescribed total amount wherein the composition contains any number of types of phosphonate structures such that a total amount of phosphonate is achieved.

The beverage preservative system also comprises Sodium Hexametaphosphate (SHMP) Sodium Acid Metaphosphate (SAMP), or mixture of SHMP and SAMP to a prescribed total amount.

Example 8

According to another embodiment of the invention, a beverage preservative system is provided which comprises:
a. sorbic acid, cinnamic acid, alkali metal salts thereof (e.g., $K^+$, $Na^+$), or mixtures of any of them that result in specific concentrations of cinnamic or sorbic acid as determined by final beverage pH;
b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and
c. a pH of 5.8 or less;
d. wherein the beverage preservative system prevents spoilage by microorganisms in a beverage within a sealed container for a period of at least 16 weeks.

The beverage preservative system also comprises a bis-phosphonate to a prescribed total amount wherein the composition contains any number of types of bis-phosphonate structures such that a total amount of bis-phosphonate is achieved.

The beverage preservative system also comprises a phosphonate or phosphonic acid to a prescribed total amount wherein the composition contains any number of types of phosphonate structures such that a total amount of phosphonate is achieved.

The beverage preservative system also comprises Sodium Hexametaphosphate (SHMP) Sodium Acid Metaphosphate (SAMP), or mixture of SHMP and SAMP to a prescribed total amount.

Example 9

According to another embodiment of the invention, a beverage preservative system is provided which comprises:
a. sorbic acid, cinnamic acid, alkali metal salts thereof (e.g., $K^+$, $Na^+$), or mixtures of any of them that result in specific concentrations of cinnamic or sorbic acid as determined by final beverage pH;
b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and
c. a pH of 5.8 or less;
d. wherein the beverage preservative system prevents spoilage by microorganisms in a beverage within a sealed container for a period of at least 16 weeks.

EDTA may need to be present where the purpose is to stabilize chemical ingredients.

The beverage preservative system also comprises an N-bis-phosphonate to a prescribed total amount wherein the composition contains any number of types of N-bis-phosphonate structures such that a total amount of bis-phosphonate is achieved.

Example 10

According to another embodiment of the invention, a beverage preservative system is provided which comprises:
a. sorbic acid, cinnamic acid, alkali metal salts thereof (e.g., $K^+$, $Na^+$), or mixtures of any of them that result in specific concentrations of cinnamic or sorbic acid as determined by final beverage pH;
b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and c. a pH of 5.8 or less;

d. wherein the beverage preservative system prevents spoilage by microorganisms in a beverage within a sealed container for a period of at least 16 weeks.

EDTA may need to be present where the purpose is to stabilize chemical ingredients.

The beverage preservative system also comprises an N-bis-phosphonate to a prescribed total amount wherein the composition contains any number of types of N-bis-phosphonate structures such that a total amount of bis-phosphonate is achieved.

The beverage preservative system also comprises a bis-phosphonate to a prescribed total amount wherein the composition contains any number of types of bis-phosphonate structures such that a total amount of bis-phosphonate is achieved.

Example 11

According to another embodiment of the invention, a beverage preservative system is provided which comprises:

a. sorbic acid, cinnamic acid, alkali metal salts thereof (e.g., $K^+$, $Na^+$), or mixtures of any of them that result in specific concentrations of cinnamic or sorbic acid as determined by final beverage pH;

b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and c. a pH of 5.8 or less;

d. wherein the beverage preservative system prevents spoilage by microorganisms in a beverage within a sealed container for a period of at least 16 weeks.

EDTA may need to be present where the purpose is to stabilize chemical ingredients.

The beverage preservative system also comprises an N-bis-phosphonate to a prescribed total amount wherein the composition contains any number of types of N-bis-phosphonate structures such that a total amount of bis-phosphonate is achieved.

The beverage preservative system also comprises a phosphonate or a phosphonic acid to a prescribed total amount wherein the composition contains any number of types of phosphonate structures such that a total amount of phosphonate is achieved.

Example 12

According to another embodiment of the invention, a beverage preservative system is provided which comprises:

a. sorbic acid, cinnamic acid, alkali metal salts thereof (e.g., $K^+$, $Na^+$), or mixtures of any of them that result in specific concentrations of cinnamic or sorbic acid as determined by final beverage pH;

b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and c. a pH of 5.8 or less;

d. wherein the beverage preservative system prevents spoilage by microorganisms in a beverage within a sealed container for a period of at least 16 weeks.

EDTA may need to be present where the purpose is to stabilize chemical ingredients.

The beverage preservative system also comprises an N-bis-phosphonate to a prescribed total amount wherein the composition contains any number of types of N-bis-phosphonate structures such that a total amount of bis-phosphonate is achieved.

The beverage preservative system also comprises a phosphonate or a phosphonic acid to a prescribed total amount wherein the composition contains any number of types of phosphonate structures such that a total amount of phosphonate is achieved.

The beverage preservative system also comprises Sodium Hexametaphosphate (SHMP) Sodium Acid Metaphosphate (SAMP), or mixture of SHMP and SAMP to a prescribed total amount.

Example 13

According to another embodiment of the invention, a beverage preservative system is provided which comprises:

a. sorbic acid, cinnamic acid, alkali metal salts thereof (e.g., $K^+$, $Na^+$), or mixtures of any of them that result in specific concentrations of cinnamic or sorbic acid as determined by final beverage pH;

b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and c. a pH of 5.8 or less;

d. wherein the beverage preservative system prevents spoilage by microorganisms in a beverage within a sealed container for a period of at least 16 weeks.

EDTA may need to be present where the purpose is to stabilize chemical ingredients.

The beverage preservative system also comprises a reverse sequestrant to a prescribed total amount wherein the composition contains any number of types of reverse sequestrant structures such that a total amount of reverse sequestrant is achieved.

Example 14

According to another embodiment of the invention, a beverage preservative system is provided which comprises:

a. sorbic acid, cinnamic acid, alkali metal salts thereof (e.g., $K^+$, $Na^+$), or mixtures of any of them that result in specific concentrations of cinnamic or sorbic acid as determined by final beverage pH;

b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and c. a pH of 5.8 or less;

d. wherein the beverage preservative system prevents spoilage by microorganisms in a beverage within a sealed container for a period of at least 16 weeks.

The beverage preservative system also comprises a reverse sequestrant to a prescribed total amount wherein the composition contains any number of types of reverse sequestrant structures such that a total amount of reverse sequestrant is achieved.

The beverage preservative system also comprises an N-bis-phosphonate to a prescribed total amount wherein the composition contains any number of types of N-bis-phosphonate structures such that a total amount of bis-phosphonate is achieved.

Example 15

According to another embodiment of the invention, a beverage preservative system is provided which comprises:
a. sorbic acid, cinnamic acid, alkali metal salts thereof (e.g., $K^+$, $Na^+$), or mixtures of any of them that result in specific concentrations of cinnamic or sorbic acid as determined by final beverage pH;
b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and
c. a pH of 5.8 or less;
d. wherein the beverage preservative system prevents spoilage by microorganisms in a beverage within a sealed container for a period of at least 16 weeks.

EDTA may need to be present where the purpose is to stabilize chemical ingredients.

The beverage preservative system also comprises a reverse sequestrant to a prescribed total amount wherein the composition contains any number of types of reverse sequestrant structures such that a total amount of reverse sequestrant is achieved.

The beverage preservative system also comprises a bis-phosphonate to a prescribed total amount wherein the composition contains any number of types of bis-phosphonate structures such that a total amount of bis-phosphonate is achieved.

Example 16

According to another embodiment of the invention, a beverage preservative system is provided which comprises:
a. sorbic acid, cinnamic acid, alkali metal salts thereof (e.g., $K^+$, $Na^+$), or mixtures of any of them that result in specific concentrations of cinnamic or sorbic acid as determined by final beverage pH;
b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and
c. a pH of 5.8 or less;
d. wherein the beverage preservative system prevents spoilage by microorganisms in a beverage within a sealed container for a period of at least 16 weeks.

EDTA may need to be present where the purpose is to stabilize chemical ingredients.

The beverage preservative system also comprises a reverse sequestrant to a prescribed total amount wherein the composition contains any number of types of reverse sequestrant structures such that a total amount of reverse sequestrant is achieved.

The beverage preservative system also comprises a phosphonate or phosphonic acid to a prescribed total amount wherein the composition contains any number of types of phosphonate structures such that a total amount of phosphonate is achieved.

Example 17

According to another embodiment of the invention, a beverage preservative system is provided which comprises:
a. sorbic acid, cinnamic acid, alkali metal salts thereof (e.g., $K^+$, $Na^+$), or mixtures of any of them that result in specific concentrations of cinnamic or sorbic acid as determined by final beverage pH;
b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and
c. a pH of 5.8 or less;
d. wherein the beverage preservative system prevents spoilage by microorganisms in a beverage within a sealed container for a period of at least 16 weeks.

EDTA may need to be present where the purpose is to stabilize chemical ingredients.

The beverage preservative system also comprises a reverse sequestrant to a prescribed total amount wherein the composition contains any number of types of reverse sequestrant structures such that a total amount of reverse sequestrant is achieved.

The beverage preservative system also comprises Sodium Hexametaphosphate (SHMP), Sodium Acid Metaphosphate (SAMP), or mixture of SHMP and SAMP to a prescribed total amount.

Example 18

According to another embodiment of the invention, a beverage preservative system is provided which comprises:
a. sorbic acid, cinnamic acid, alkali metal salts thereof (e.g., $K^+$, $Na^+$), or mixtures of any of them that result in specific concentrations of cinnamic or sorbic acid as determined by final beverage pH;
b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and
c. a pH of 5.8 or less;
d. wherein the beverage preservative system prevents spoilage by microorganisms in a beverage within a sealed container for a period of at least 16 weeks.

EDTA may need to be present where the purpose is to stabilize chemical ingredients.

The beverage preservative system also comprises a reverse sequestrant to a prescribed total amount wherein the composition contains any number of types of reverse sequestrant structures such that a total amount of reverse sequestrant is achieved.

The beverage preservative system also comprises an N-bis-phosphonate to a prescribed total amount wherein the composition contains any number of types of N-bis-phosphonate structures such that a total amount of bis-phosphonate is achieved.

The beverage preservative system also comprises a bis-phosphonate to a prescribed total amount wherein the composition contains any number of types of bis-phosphonate structures such that a total amount of bis-phosphonate is achieved.

Example 19

According to another embodiment of the invention, a beverage preservative system is provided which comprises:
a. sorbic acid, cinnamic acid, alkali metal salts thereof (e.g., $K^+$, $Na^+$), or mixtures of any of them that result in specific concentrations of cinnamic or sorbic acid as determined by final beverage pH;
b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and
c. a pH of 5.8 or less;
d. wherein the beverage preservative system prevents spoilage by microorganisms in a beverage within a sealed container for a period of at least 16 weeks.

EDTA may need to be present where the purpose is to stabilize chemical ingredients.

The beverage preservative system also comprises a reverse sequestrant to a prescribed total amount wherein the composition contains any number of types of reverse sequestrant structures such that a total amount of reverse sequestrant is achieved.

The beverage preservative system also comprises an N-bis-phosphonate to a prescribed total amount wherein the composition contains any number of types of N-bis-phosphonate structures such that a total amount of bis-phosphonate is achieved.

The beverage preservative system also comprises a phosphonate or phosphonic acid to a prescribed total amount wherein the composition contains any number of types of phosphonate structures such that a total amount of phosphonate is achieved.

Example 20

According to another embodiment of the invention, a beverage preservative system is provided which comprises:
a. sorbic acid, cinnamic acid, alkali metal salts thereof (e.g., $K^+$, $Na^+$), or mixtures of any of them that result in specific concentrations of cinnamic or sorbic acid as determined by final beverage pH;
b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and
c. a pH of 5.8 or less;
d. wherein the beverage preservative system prevents spoilage by microorganisms in a beverage within a sealed container for a period of at least 16 weeks.

EDTA may need to be present where the purpose is to stabilize chemical ingredients.

The beverage preservative system also comprises a reverse sequestrant to a prescribed total amount wherein the composition contains any number of types of reverse sequestrant structures such that a total amount of reverse sequestrant is achieved.

The beverage preservative system also comprises an N-bis-phosphonate to a prescribed total amount wherein the composition contains any number of types of N-bis-phosphonate structures such that a total amount of bis-phosphonate is achieved.

The beverage preservative system also comprises Sodium Hexametaphosphate (SHMP), Sodium Acid Metaphosphate (SAMP), or mixture of SHMP and SAMP to a prescribed total amount.

Example 21

According to another embodiment of the invention, a beverage preservative system is provided which comprises:
a. sorbic acid, cinnamic acid, alkali metal salts thereof (e.g., $K^+$, $Na^+$), or mixtures of any of them that result in specific concentrations of cinnamic or sorbic acid as determined by final beverage pH;
b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and
c. a pH of 5.8 or less;
d. wherein the beverage preservative system prevents spoilage by microorganisms in a beverage within a sealed container for a period of at least 16 weeks.

EDTA may need to be present where the purpose is to stabilize chemical ingredients.

The beverage preservative system also comprises a reverse sequestrant to a prescribed total amount wherein the composition contains any number of types of reverse sequestrant structures such that a total amount of reverse sequestrant is achieved.

The beverage preservative system also comprises a bis-phosphonate to a prescribed total amount wherein the composition contains any number of types of bis-phosphonate structures such that a total amount of bis-phosphonate is achieved.

The beverage preservative system also comprises Sodium Hexametaphosphate (SHMP), Sodium Acid Metaphosphate (SAMP), or mixture of SHMP and SAMP to a prescribed total amount.

Example 22

According to another embodiment of the invention, a beverage preservative system is provided which comprises:
a. sorbic acid, cinnamic acid, alkali metal salts thereof (e.g., $K^+$, $Na^+$), or mixtures of any of them that result in specific concentrations of cinnamic or sorbic acid as determined by final beverage pH;
b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and
c. a pH of 5.8 or less;
d. wherein the beverage preservative system prevents spoilage by microorganisms in a beverage within a sealed container for a period of at least 16 weeks.

The beverage preservative system also comprises a reverse sequestrant to a prescribed total amount wherein the composition contains any number of types of reverse sequestrant structures such that a total amount of reverse sequestrant is achieved.

The beverage preservative system also comprises an N-bis-phosphonate to a prescribed total amount wherein the composition contains any number of types of N-bis-phosphonate structures such that a total amount of bis-phosphonate is achieved.

The beverage preservative system also comprises a bis-phosphonate to a prescribed total amount wherein the composition contains any number of types of bis-phosphonate structures such that a total amount of bis-phosphonate is achieved.

The beverage preservative system also comprises a phosphonate or phosphonic acid to a prescribed total amount wherein the composition contains any number of types of phosphonate structures such that a total amount of phosphonate is achieved.

Example 23

According to another embodiment of the invention, a beverage preservative system is provided which comprises:
a. sorbic acid, cinnamic acid, alkali metal salts thereof (e.g., $K^+$, $Na^+$), or mixtures of any of them that result in specific concentrations of cinnamic or sorbic acid as determined by final beverage pH;
b. a bio-degradable sequestrant selected from the group consisting of ethylenediamine-N,N'-disuccinic acid (EDDS), ethylenediamine-N,N'-dimalonic acid (EDDM), ethylenediamine-N,N'-diglutaric acid (EDDG), or mixtures of any of them, and
c. a pH of 5.8 or less;
d. wherein the beverage preservative system prevents spoilage by microorganisms in a beverage within a sealed container for a period of at least 16 weeks.

The beverage preservative system also comprises a reverse sequestrant to a prescribed total amount wherein the composition contains any number of types of reverse sequestrant structures such that a total amount of reverse sequestrant is achieved.

The beverage preservative system also comprises an N-bis-phosphonate to a prescribed total amount wherein the composition contains any number of types of N-bis-phosphonate structures such that a total amount of bis-phosphonate is achieved.

The beverage preservative system also comprises a bis-phosphonate to a prescribed total amount wherein the composition contains any number of types of bis-phosphonate structures such that a total amount of bis-phosphonate is achieved.

The beverage preservative system also comprises a phosphonate or phosphonic acid to a prescribed total amount wherein the composition contains any number of types of phosphonate structures such that a total amount of phosphonate is achieved.

The beverage preservative system also comprises Sodium Hexametaphosphate (SHMP), Sodium Acid Metaphosphate (SAMP), or mixture of SHMP and SAMP to a prescribed total amount.

Example 24

Assuming compliance to upper limit constraints for the concentration of Copper, Cobalt, Iron, Zinc, Aluminum, Chromium, and Nickel, the amount of preservatives disclosed herein that are required to stabilize a beverage are found to be dictated by the combined effect of two factors; the concentration of Calcium and the concentration of Assimilable Nitrogen. Assimilable Nitrogen is principally an estimate of the reduced form of nitrogen (NH and $NH_2$) available in solution and serves as a estimate for the availability of those forms of nitrogen (ammonia, urea, amino acids and peptides) that can be employed as nutrients by the spoilage microorganism. A measure of total nitrogen would include all forms of nitrogen, some (Nitrate and Nitrite) which are not assimilable by fungi and many types of spoilage bacteria. The Table below discloses exemplary concentration ranges for the various components in the exemplary beverage preservative systems described herein.

| Formulation Requirements | [Ca++] < 0.26 mM | 0.26 mM < [Ca++] < 0.43 mM | 0.43 mM < [Ca++] < 0.764M | TOTAL RANGE |
|---|---|---|---|---|
| AN ≤ 3 ppm | 10 ppm ≤ [WA] ≤ 50 ppm<br>0 ≤ [EDTA] ≤ 45<br>10 ppm < [BDS] ≤ 30 ppm<br>0 ≤ [Phos] ≤ 150<br>0 ≤ [Bis phos] ≤ 125<br>≤ [N- bis phos] ≤ 125<br>0 ≤ [R] ≤ 60<br>0 ≤ [SHMP] ≤ 600 | 10 ppm < [WA] ≤ 50 ppm<br>0 ≤ [EDTA] ≤ 45<br>10 ppm < [BDS] ≤ 3 0 ppm<br>0 ≤ [Phos] ≤ 600<br>0 ≤ [Bis phos] ≤ 500<br>0 ≤ [N- bis phos] ≤ 500<br>0 ≤ [R] ≤ 100<br>0 ≤ [SHMP] ≤ 900 | 10 ppm < [WA] ≤ 50 ppm<br>0 ≤ [EDTA] ≤ 45<br>10 ppm < [BDS] ≤ 45 ppm<br>0 ≤ [Phos] ≤ 1200<br>0 ≤ [Bis phos] ≤ 750<br>0 ≤ [N- bis phos] ≤ 750<br>0 ≤ [R] ≤ 150<br>0 ≤ [SHMP] ≤ 1800 | 10 ppm < [WA] ≤ 50 ppm<br>0 [EDTA] ≤ 45<br>10 pm < [BDS] ≤ 45 ppm<br>0 ≤ [Phos] ≤ 1200<br>0 ≤ [Bis phos] ≤ 750<br>0 ≤ [N- bis phos] ≤ 750<br>0 < [R] ≤ 150<br>0 ≤ [SHMP] ≤ 1800 |
| 3 ppm < AN ≤ 10 ppm | 10 ppm < [WA] < 650 ppm<br>0 ≤ [EDTA] < 45<br>10 ppm < [BDS] < 45 ppm<br>0 ≤ [Phos] < 650<br>0 ≤ [Bis phos] < 750<br>[N- bis phos] < 750<br>0 ≤ [R] < 60<br>0 ≤ [SHMP] < 1800 | 10 ppm < [WA] < 650 ppm<br>0 ≤ [EDTA] < 45<br>10 ppm < [BDS] < 45 ppm<br>0 ≤ [Phos] < 950<br>0 ≤ [Bis phos] < 750<br>0 ≤ [N- bis phos] < 750<br>0 ≤ [R] < 60<br>0 ≤ [SHMP] < 1800 | 10 ppm < [WA] < 650 ppm<br>0 [EDTA] < 45<br>10 ppm < [BDS] < 45 ppm<br>0 < [Phos] < 1800<br>0 < [Bis phos] < 750<br>[N- bis phos] < 750<br>0 < [R] < 60<br>0 ≤ [SHMP] < 1800 | 10 ppm ≤ [WA] ≤ 650 ppm<br>0 ≤ [EDTA] ≤ 45<br>10 ppm < [BDS] ≤ 45 ppm<br>0 ≤ [Phos] ≤ 1250<br>0 ≤ [Bis phos] ≤ 1500<br>0 ≤ [N- bis phos] ≤ 1500<br>0 ≤ [R] ≤ 60<br>0 ≤ [SHMP] ≤ 1800 |
| 10 ppm < AN ≤ 50 ppm | 10 ppm < [WA] ≤ 850 ppm<br>0 [EDTA] ≤ 75<br>10 ppm < [BDS] ≤ 75 ppm<br>0 ≤ [Phos] ≤ 1200<br>0 ≤ [Bis phos] ≤ 800<br>≤ [N- bis phos] ≤ 800<br>0 ≤ [R] ≤ 75<br>0 ≤ [SHMP] < 1800 | 10 ppm < [WA] ≤ 850 ppm<br>0 [EDTA] ≤ 75<br>10 ppm < [BDS] ≤ 75 ppm<br>0 ≤ [Phos] ≤ 1500<br>0 ≤ [Bis phos] < 1200<br>≤ [N- bis phos] ≤ 1200<br>0 ≤ [R] ≤ 75<br>0 ≤ [SHMP] < 1800 | 10 ppm ≤ [WA] ≤ 850 ppm<br>0 ≤ [EDTA] ≤ 75<br>10 ppm ≤ [BDS] ≤ 75 ppm<br>0 ≤ [Phos] ≤ 2100<br>0 ≤ [Bis phos] < 1800<br>≤ [N- bis phos] ≤ 1800<br>0 ≤ [R] ≤ 100<br>0 ≤ [SHMP] < 1800 | 10 ppm ≤ [WA] ≤ 850 ppm<br>0 ≤ [EDTA] ≤ 75<br>10 ppm ≤ [BDS] ≤ 75 ppm<br>0 ≤ [Phos] ≤ 1800<br>0 ≤ [Bis phos] < 1800<br>800 ≤ [N- bis phos] ≤ 1800<br>0 ≤ [R] ≤ 100<br>0 ≤ [SHMP] < 1800 |

AN = Assimilable Nitrogen
WA = weak acid
EDTA = ethylene diamine tetraacetic acid
BDS = bio degradable sequestrant
Phos = phosphonate
Bis-phos = Bis phosphonate
N-bis Phos = N-bis phosphonate
R = Reverse sequestrant
SHMP = Sodium hexametaphosphate OR Sodium acid metaphosphate (SAMP) -- interchangeable In the following examples, the added water had/has a hardness less than 50 ppm and alkalinity less than 50 ppm. Copper, less than 1 microgram per liter Zinc less than 1 microgram per liter, Nickel, less than 1 microgram per liter and Iron less than 0.1 microgram per liter. The water hardness was/is adjusted to 50 ppm through addition of mixture of $CaCl_2$ and $MgCl_2$.

The spoilage organisms for the following examples are identified as follows: Y3, *Zygosaccharomyces bailii* isolate of Pepsi (Strain 906); C-7UP, *Brettanomyces* isolate of Pepsi, (Cherry 7-UP); Spore, ascospore preparation of *Saccharomyces cerevisiae* isolate of Pepsi (strain "spore"). Y22, ATCC 60484 *Zygosacharomyces bailii*; M1, *Paecilomyces* isolate of Pepsi; Y107 ATCC 52407; M2 ATCC 36614 *Byssochlamys nieva*. An inoculum of approximately 40 per milliliter was/is employed for each organism. All test samples were/are incubated 16 weeks at 25 C.

Example 25

The following example provides an illustration of the hurdles associated with the preservation of beverages through the use of weak organic acids. A 2 fold concentrate of beverage was prepared and was then mixed with an equal volume of 15% molten agar. Before solidification of the agar, the single strength beverage formulation containing 7.5% molten agar, was then divided into aliquots and to each separate aliquot was added, with the exception of one, sodium benzoate, potassium sorbate or cinnamic acid. The aliquot not receiving either potassium sorbate or cinnamic acid served as a positive control. While the agar was still molten, the agar-beverage aliquots (containing a single weak acid at a specified concentration) were poured into separate Petri plates. In Two agar plates. sodium benzoate was present at either 700 ppm or 1000 ppm) Two agar plates contained potassium sorbate (500 or 800 ppm). Six agar plates contained cinnamic acid ranging in concentrations of 25-200 ppm. Agar solidification essentially provides single strength beverage formulation in a semi-solid state.

The 2 fold concentrate of single strength beverage and the agar supplemented single strength beverage is prepared as follows:

| | |
|---|---|
| Sucrose | 64 g |
| Glucose | 52 g |
| Fructose | 2 g |
| Apple Juice: Single Strength | 20 ml |
| Malic acid | 0.67 g |
| Na + Malate (Sodium Malate) | 0.268 g |
| Water | Bring volume to 500 ml |
| 15% molten agar | Mix 1:1 with beverage formulation |
| Potassium Sorbate | 0.07 or 0.10% (700 & 1000 ppm) if Benzoate or Cinnamic acid not present |
| Sodium Benzoate | 0.05 and 0.08% (500 & 800 ppm) if Potassium sorbate or Cinnamic acid not present |
| Cinnamic acid | 0.0025-0.02% (25, 35, 50, 100, 150, and 200 ppm) if Potassium Sorbate and Sodium Benzoate not present |

Figure 2B:
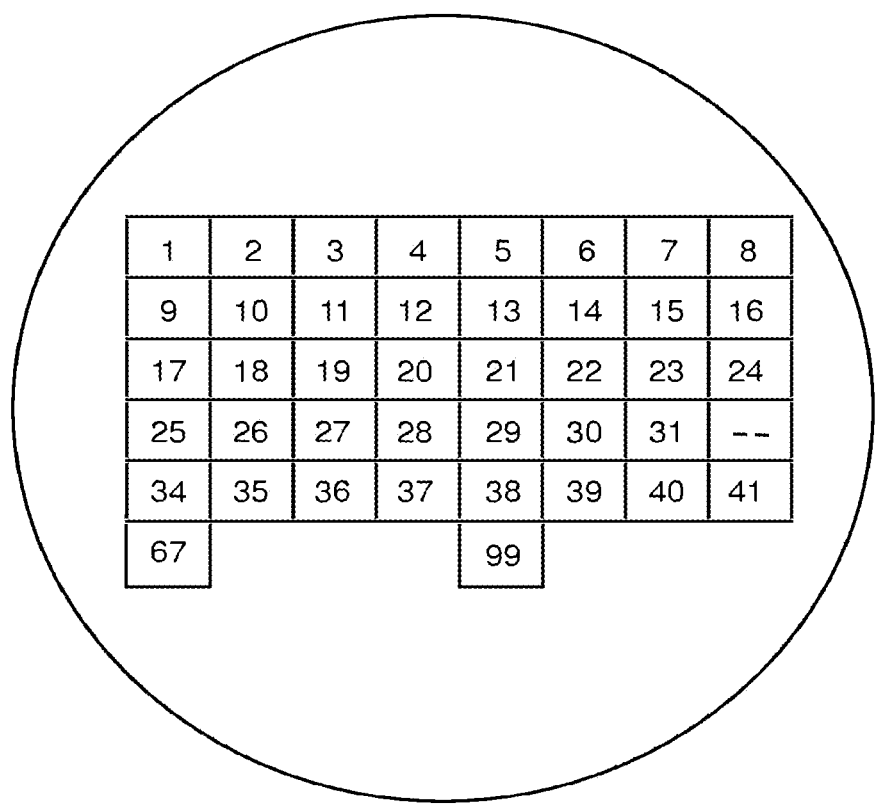
FIG. 2B depicts the pattern of spotting to gel-surface of plates.
Figure 2C:
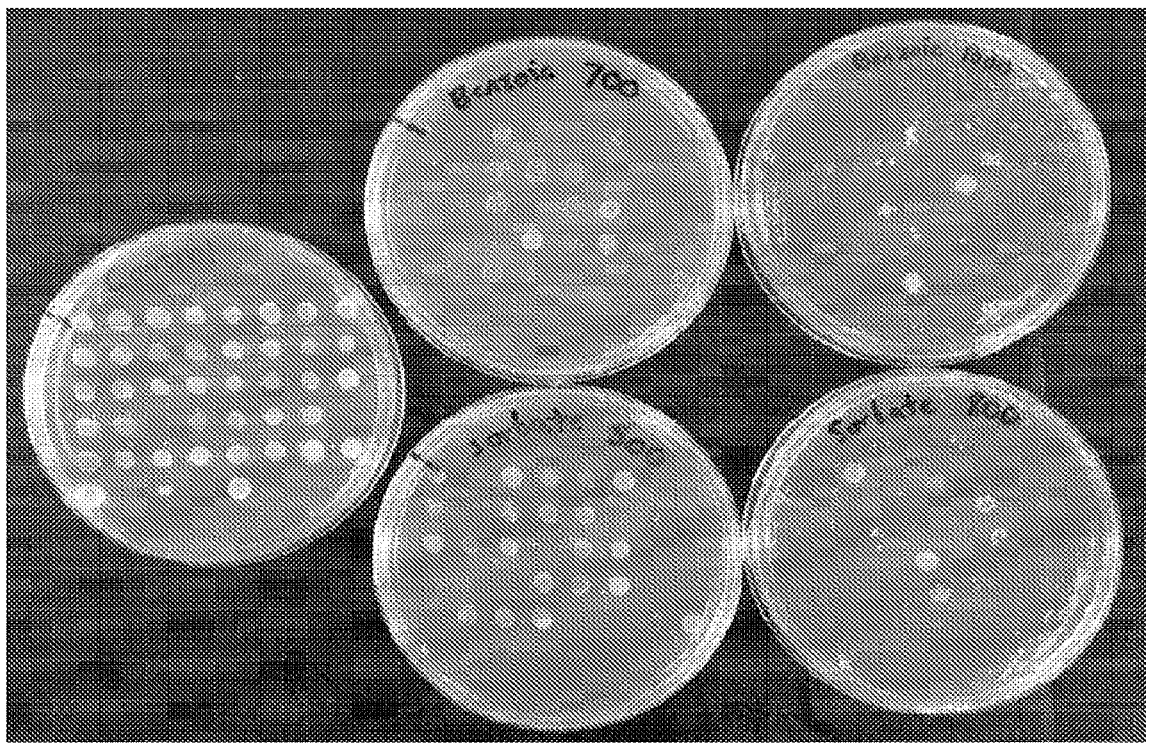
FIG. 2C depicts a control plate and plates with organic acid preservative
Figure 2D:
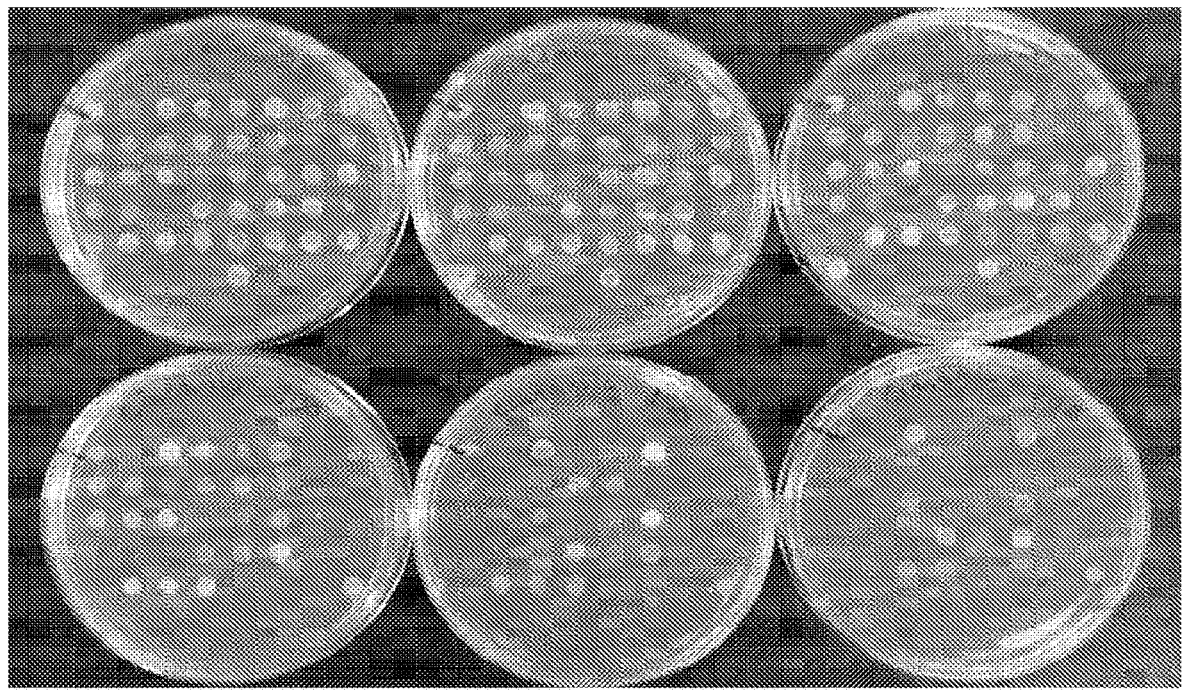
FIG. 2D depicts plates with cinnamic acid.

After solidification of juice-agar mixture, various yeast strains (FIG. 2A) were spotted to the gel-surface of each type of mixture employing an identical pattern in each test (FIG. 2B) such that it was possible to identify the outgrowth of specific individual strains. The control plate, which did not contain any organic acid preservative (FIG. 2C), showed that most strains grew reasonably well. FIG. 2C also demonstrates that the different yeast strains are not all equally tolerant to organic acid preservatives. Strain Y3 (formal id strain 906 in-house collection) proved to be among strains demonstrating tolerance to both benzoic acid and sorbic acid. Y3 is a *Zygossacharomyces bailii* strain (DNA homology) isolated from spoiled beverage. Strain Y3 also proved to be among the most tolerant strains to Cinnamic acid (FIG. 2D).

Example 26

A preparation of beverage was divided into multiple small volume aliquots, each aliquot containing a different concentration of potassium sorbate. The range of concentration of potassium sorbate is 0-0.094% (0-940 ppm). Preparations (aliquots) of beverage containing potassium sorbate at each test concentration (48 different values) are inoculated separately with one of 7 different spoilage organisms (bio-indicator) for a total of 336 test samples.

The 2% fruit juice based non-carbonated beverage of pH 3.4 and about 12 Brix was generated by combining the following ingredients.

| | |
|---|---|
| Added Water | Approximately 84% water |
| Apple Juice Concentrate | About 0.372% to provide single strength concentration of about 2% |
| Sucrose | 6.8% |
| Glucose | 5.2% |
| Fructose | 0.2% |
| Potassium Sorbate | 0-0.094% |
| Malic acid | 0.0674% |
| Sodium Malate | 0.013% (approximately, adjusting pH to 3.4) |
| Ethylene diamine tetraacetic acid (EDTA) | 30 ppm in test sample (adjusted for M++ present in salt) |
| Ethylene diamine disuccinic acid (EDDS) | 15 or 30 ppm in test sample (adjusted for M++ present in salt) |

Figure 3B:
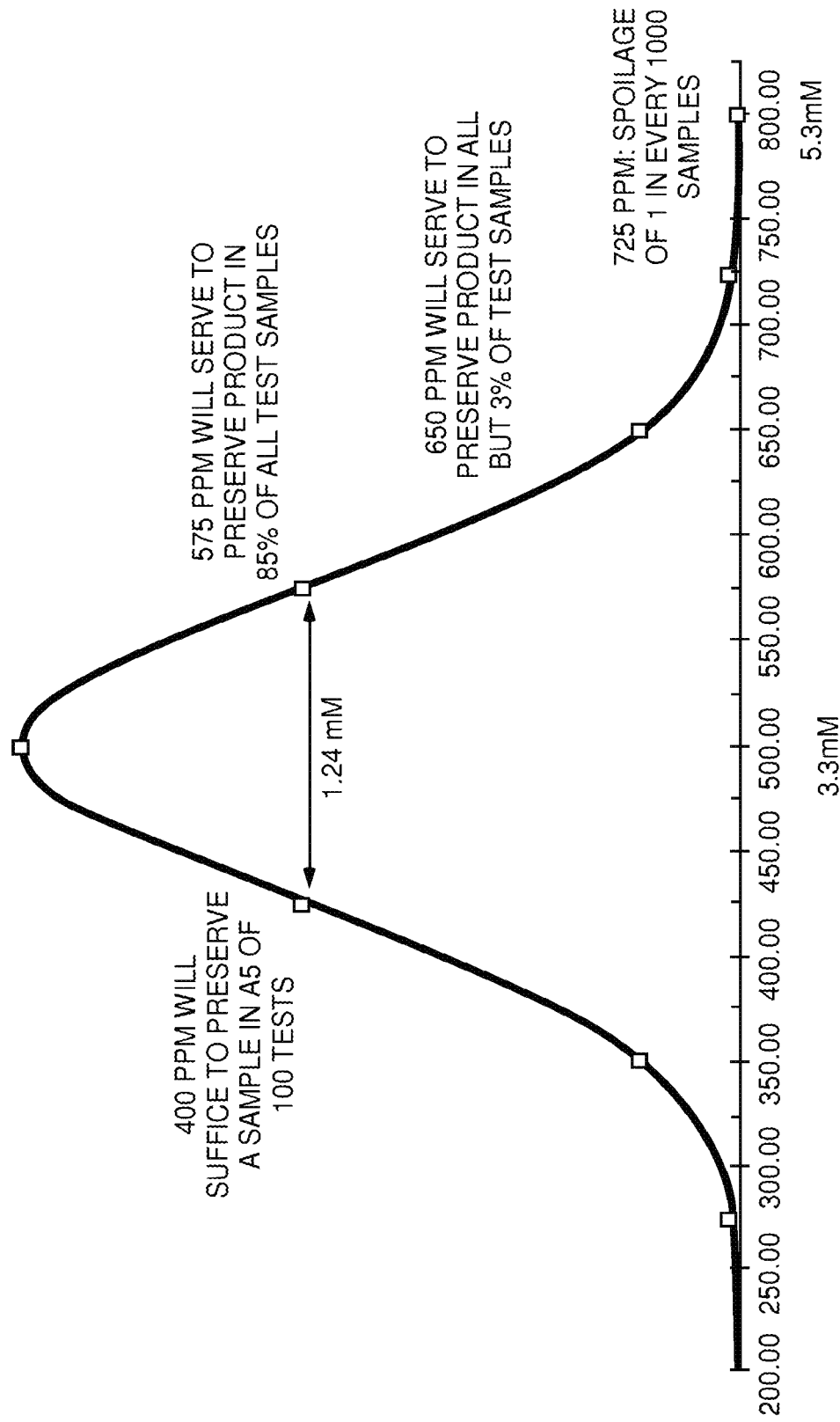
FIG. 3B is a graph to facilitate interpretation of FIG. 3*a*.

The test design established the minimum inhibitory concentration of potassium sorbate to preserve a product of pH 3.4 against different classes of spoilage organisms in the absence of a physical agent such as heat or irradiation. Additionally, the small increment of potassium sorbate concentration in the test series allowed some estimate of the variability of tolerance to potassium sorbate among the bio-indicator strains. A sequestrant such as EDTA or EDDS can complement potassium sorbate additively or synergistically by either inhibiting a cell function separate of that from sorbate or by working in concert with potassium sorbate through some function that reduces variability of tolerance within a population. The results of the test are found in FIG. 3A. FIG. 3B serves to facilitate interpretation of FIG. 3A.

FIG. 3A demonstrates that the range of tolerance to potassium sorbate is quite large across the group of bio-indicators but that the majority of the variability in the group is driven by strain Y3, a *Zygosaccharomyces bailii* strain. The data, serves to emphasize the generally recognized fact that some strains of *Zygosaccharomyces bailli* are measurably tolerant to weak acid preservatives such as potassium sorbate. Strain Y3, an isolate of spoiled commercial beverage, was the most tolerant strains of weak acid preservative from among nearly 100 yeast strains tested. In the absence of Y3, the amount of potassium sorbate required to preserve product might be as low as 220 to 250 ppm. Although 220-250 ppm potassium sorbate is a preferable concentration over the 550-600 concentration required to inhibit Y3 or similar strains, it is measurably high with regard to its implications to the sensory profile of a beverage. Further, at least one regulatory agency in Asia has established an upper limit for the use of potassium sorbate at 50 ppm. If other regulatory agencies follow suite, it will be necessary to broadly apply a complement to potassium sorbate. Finally, potassium sorbate is not particularly soluble at acid pH and it has a measurably low rate of dissolution. Beverages are generally produced from concentrates and a 4 fold beverage concentrate should contain 1200-1500 ppm potassium sorbate to yield a finished beverage concentration of 240-300 ppm. This often proves problematic during the batching of beverage and it is clear that a final beverage formulation containing 50-150 ppm potassium sorbate would be favored.

FIG. 3A also possesses data that draws attention to the variance among individual members within the population of organisms introduced into the test samples (inoculum). Between the ranges of potassium sorbate concentrations of 460-660 ppm some test samples into which strain Y3 was inoculated were free of growth only for the beverage containing consecutively greater concentrations of sorbate to be supportive of growth. This observation is most easily explained by the likelihood that the standard deviation for tolerance to sorbic acid is measurably greater for this strain of Z. bailii than is commonly observed for other spoilage organisms, such as those strains other than Y3 that are used as bio-indicators in this study.

It should be noted that the although ppm is often an appropriate term to quantify the amount of substance added to food or beverage that the biochemistry of preservation is driven by the number of preservative molecules present which is most correctly expressed in terms of molarity. The difference between 500 ppm potassium sorbate and 800 ppm in terms of molarity is less than 2 mM (5.3 mM-3.3 mM). A standard deviation of 75 pm equates to 0.49 mM (or 0.00049M). As suggested by FIG. 3B, the expectation is to find instances where growth occurs in a sample that contains an incrementally higher concentration of preservative to a sample in which no growth occurred. The analysis of FIG. 3B is not a statistical summary of data from FIG. 3A and merely serves to identify the most likely explanation for the observed pattern of growth and no growth demonstrated in FIG. 3A and other such studies.

Example 27

The following example provided an illustration of the preservative capacity of beverage product of the present invention when EDDS is combined with a single weak acid preservative (potassium sorbate). A preparation of beverage was divided into three aliquots; one was supplemented with EDTA (30 ppm) and the remaining two aliquots were supplemented with either 15 or 30 ppm EDDS.

A 2% fruit juice based non-carbonated beverage of pH 3.4 and about 12Brix was formed by combining the following ingredients.

| | |
|---|---|
| Added Water | Approximately 84% water |
| Apple Juice Concentrate | About .3.72% to provide single strength concentration of about 2% |
| Sucrose | 6.8% |
| Glucose | 5.2% |
| Fructose | 0.2% |
| Potassium Sorbate | 0-0.15% |
| Malic acid | 0.0674% |
| Sodium Malate | 0.013% (approximately, adjusting pH to 3.4) |
| Ethylene diamine tetraacetic acid (EDTA) | 30 ppm in test sample (adjusted for M++ present in salt) if EDDS not present |
| Ethylene diamine disuccinic acid (EDDS) | 15 or 30 ppm in test sample (adjusted for M++ present in salt) if EDTA is not present |

The beverage aliquots were identical with the exception of the presence or concentration of either EDTA or EDDS. Each aliquot was divided further into smaller volume test samples wherein the concentration of potassium sorbate varies from 0-1500 ppm (0-0.15%). The concentration of EDTA or EDDS is held constant. Under these circumstances, it is possible to establish whether either EDTA or EDDS permitted the use of lowered concentrations of potassium sorbate to preserve a product of pH 3.4. If the minimum inhibitory concentration of potassium sorbate differed significantly in one preparation over the other, then it was presumed that EDTA or EDDS provided different complement to potassium sorbate with regard to inhibition of outgrowth of spoilage organisms. If the two substances proved equivalent complement to potassium sorbate, EDDS was the favored substance for use in beverage formulation because it is a more environmentally sound application. The beverage is formulated to contain 50 ppm hardness. Consequently, the amount of calcium and magnesium measurably exceed the binding capacity of either EDTA or EDDS for these molecules. However, either EDTA or EDDS were able to bind other cations such as copper and zinc.

Data revealed in FIGS. 4A-4C suggest that EDDS is equivalent to EDTA as a preservative when combined with a single weak acid preservative. FIG. 4A is data for the combination of EDTA and potassium sorbate wherein the concentration of EDTA was constant at 30 ppm and the concentration of potassium sorbate is varied from 0-940 ppm. FIG. 4B is data for the combination of EDDS (30 ppm) and potassium sorbate. As in FIG. 4A, the concentration of EDDS was held constant while the concentration of potassium sorbate was varied from 0-920 ppm. The data set for FIG. 4C represents the interaction between 15 ppm EDDS and potassium sorbate. The data in the three sets of experiments was collected in parallel with example 24. Comparing the two examples (3a & 4a-c) reveals that the presence of EDDS or EDTA complemented potassium sorbate with regard to mold, but offered some relief to the concentration of potassium sorbate required for inhibition of growth by yeast fungi. Mold (M1 & M6) proved to be inhibited by a combination of potassium sorbate (140-160 ppm) and either EDTA or EDDS (30 ppm) wherein the required concentration of potassium sorbate was lower than if potassium sorbate was employed alone (180-200 ppm).

The small, but clear advantage offered by the addition of EDDS or EDTA is fully expected given the chemistry of EDTA and EDDS. Further, it was expected that both substances would perform similarly. Both substances sequester Fe+++, Cu++, Zn++, Mn++ in exactly the same order of preference. Although EDDS exhibited slightly lower binding constants, it was still measurably in excess of what is required given the concentration of such trace elements typically present in beverage. Although EDDS and EDTA were chemically equivalent in regard to their function as sequestrants, EDDS was preferred because it is less of an affront to the environment. In fact, there is published evidence that EDDS is itself a natural substance.

Example 28

The following example provides an illustration of the preservative capacity of beverage product of the present invention. The biodegradable sequestrant ethylene diamine disuccinic acid was admixed with a sodium hexametaphosphate and cinnamic acid in the beverage as shown in the formula for the beverage.

A 2% fruit juice based non-carbonated beverage of pH 3.4 and about 12 Brix was formed by combining the following ingredients.

| Added Water | Approximately 84% water |
|---|---|
| Apple Juice Concentrate | About 0.372% to provide single strength concentration of about 2% |
| Sucrose | 6.8% |
| Glucose | 5.2% |
| Fructose | 0.2% |
| Potassium Cinnamate | 0 to 0.06% (0 to 600 ppm) |
| Malic acid | 0.067% |
| Sodium Malate | 0.013% (approximately, adjusting pH to 3.4) |
| Ethylene diamine tetraacetic acid (EDTA) | 30 ppm, if present in test sample |
| Ethylene diamine disuccinic acid (EDDS) | 30 ppm, if present in test sample |
| Sodium hexametaphosphate (SHMP) | 0.075% (750 ppm) |
| Hardness | 50 ppm total |

FIG. 5A data demonstrates that 30 ppm EDTA can combine with 750 ppm SHMP and as little as 75 ppm K+cinnamate and to prohibit outgrowth of all 7 bio-indicator strains. An identical beverage formulation in which EDDS is substituted for EDTA (FIG. 5B) yielded similar result wherein 30 ppm EDDS combined with 750 ppm SHMP and no more than 50 ppm K+cinnamate to prohibit the outgrowth of all 7 bio-indicator strains.

Combining EDDS and SHMP apparently serves to limit the availability of one or more divalent cations critical to the outgrowth to spoilage microorganisms and weakens them toward the effect of weak acids. For example, it is known that ethylene diamine disuccinic acid served to bind iron, copper and other trace elements whereas sodium hexametaphosphate binds Calcium and Magnesium. The preservative system is, apparently, dependent on the combined activity of ethylene diamine disuccinic acid, Sodium Hexametaphosphate and a weak acid.

Example 29

The following example provides an illustration of the preservative capacity of beverage product of the present invention. The biodegradable sequestrant ethylene diamine disuccinic acid was admixed with a bis-phosphonate (Etidronate) wherein the two sequestrants combined to limit the availability of divalent cations to spoilage microorganisms. The beverage was also supplemented with potassium sorbate. The combined action of sequestrants served to reduce the concentration of potassium sorbate required to prohibit outgrowth of spoilage organisms. There is little difference in the capacity of mixtures of EDDS and Etidronate relative to traditional mixtures of Ethylene diamine tetra acetic acid (EDTA) and sodium hexametaphosphate (SHMP) to complement Potassium sorbate.

A 2% fruit juice based non-carbonated beverage of pH 3.4 and about 12Brix was formed by combining the following ingredients.

| Added Water | Approximately 84% water |
|---|---|
| Apple Juice | About 0.372% to provide single |
| Concentrate | strength concentration of about 2% |
| Sucrose | 6.8% |
| Glucose | 5.2% |
| Fructose | 0.2% |
| Potassium Sorbate | 0.015% |
| Malic acid | 0.0674% |
| Sodium Malate | 0.013% (approximately, adjusting pH to 3.4) |
| Ethylene diamine tetraacetic acid (EDTA) | 30 ppm in test sample, if EDDS not present |
| Ethylene diamine disuccinic acid (EDDS) | 30 ppm in test sample, if EDTA not present |
| Sodium hexametaphosphate (SHMP) | 0-1500 ppm |
| Bis-phosphonate, Etidronate | 0-1500 ppm |

Data in FIG. 6A demonstrates that 30 ppm EDDS combined with as little as 280 ppm SHMP to prohibit outgrowth of all 7 bio-indicator strains. An identical beverage formulation in which EDTA was substituted for EDDS (FIG. 6B) yielded a comparable result wherein 30 ppm EDTA combined with 250 ppm SHMP to prohibit the outgrowth of all 7 bio-indicator strains.

The combination of 30 ppm EDDS and <425 ppm of the bis-phosphonate, Etridonate complemented a concentration of 150 ppm potassium sorbate to prohibit the outgrowth of all seven bio-indicator strains (FIG. 6C). The combination of 30 ppm EDDS and 250 ppm Etridonate served to complement 150 ppm potassium sorbate in the prevention of outgrowth of all seven spoilage organisms (FIG. 6D).

The combination of 30 ppm EDDS and <450 ppm of the bis-phosphonate, Etridonate can complement a concentration of 150 ppm potassium sorbate to prohibit the outgrowth of all seven bio-indicator strains. The choice of slightly elevated concentrations of Etridonate in the presence of EDDS offered the option of employing the bio-degradable sequestrant EDDS.

Furthermore, the problem of pH drift that accompanies the use of SHMP is avoided if Etidronate is substituted for SHMP. Substitution of EDDS for EDTA avoids the concerns associated with employing a substance that is not environmentally sound Example 30

The following example provides an illustration of the projected preservative capacity of beverage product of the present invention. The biodegradable sequestrant ethylene diamine disuccinic acid (50 ppm) is admixed with 150 ppm potassium sorbate and 30 ppm Cinnamic acid into a 2% juice beverage that is carbonated (2.5-3.5 volumes of $CO_2$). In commercial operations, carbonation of a product occurs immediately prior to its packaging into either a glass, plastic or aluminum container or other such vessel that is generally impervious to oxygen ingress. In the absence of EDDS, the beverage formulated containing 500 ppm potassium sorbate will yield to spoilage before the end of targeted shelf life (16 weeks). The combination of 50 ppm EDDS and 500 ppm potassium sorbate will permit the 2% juice beverage initially containing 2.5-3.5 volumes of $CO_2$ to remain stable against spoilage for a period of at least 16 weeks.

A 2% fruit juice based non-carbonated beverage of pH 3.4 and about 12 Brix is formed by combining the following ingredients.

| | |
|---|---|
| Added Water | Approximately 84% water |
| Apple Juice Concentrate | About 0.372% to provide single strength concentration of about 2% |
| Sucrose | 6.8% |
| Glucose | 5.2% |
| Fructose | 0.2% |
| Potassium Sorbate | 0.015% |
| Cinnamic acid | 0.003% |
| Malic acid | 0.0674% |
| Sodium Malate | 0.013% (approximately, adjusting pH to 3.4) |
| EDDS | 50 ppm |
| Carbon Dioxide | 2.5 to 3.5 volumes (1 volume = 1.96 g $CO_2$ per liter) |

Example 31

Beverages processed by standard "hot-fill" are typically filled into a heat-set PET container that can accommodate product temperatures of about 85° C. The heat contained in the product filled in the container serves to kill omnipresent fungal spores that either associated with beverage contact surfaces of the package material or settled into product in the period between filling and closure application. Commercial and environmental considerations favor the development of a formulation or process that would allow the use of light weight plastic containers to fill thermally processed beverage by standard "hot-fill" process design. However containers made from light weight non-crystalline PET rapidly deforms if the temperature of the plastic exceeds 71.3° C., the glass transition temperature of PET.

Figures 7A, 7B:
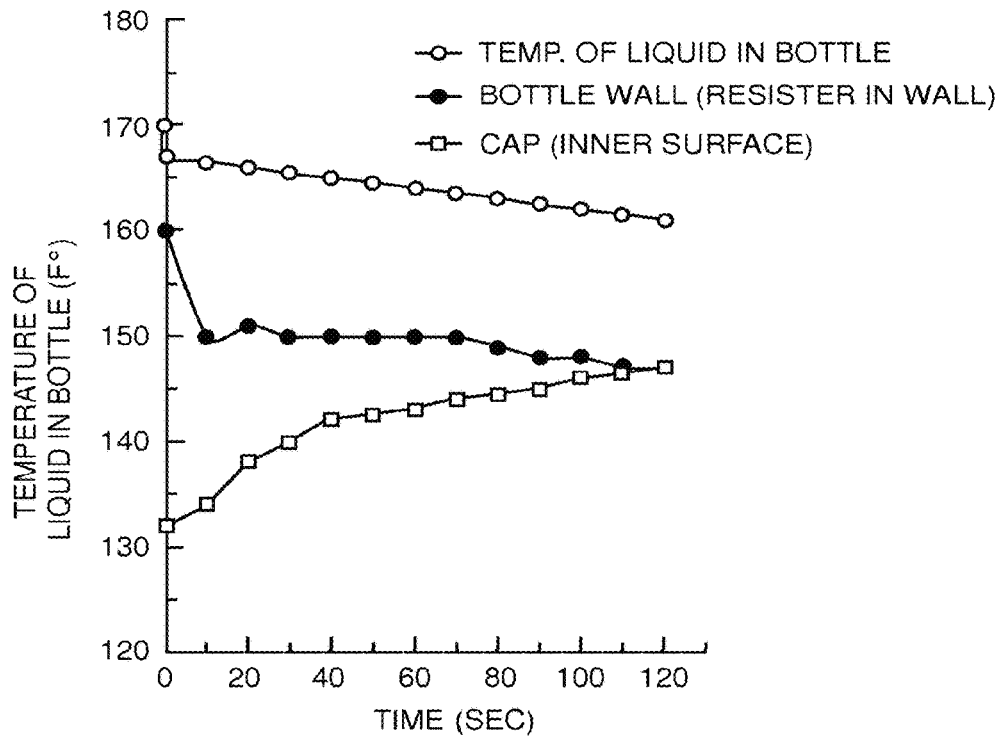

As evidenced by data summarized in FIGS. 7A, 7B, and 7C, the temperature of product immediately before filling into a standard PET container cannot exceed 76.6° C. (170° F.) if the bottle wall temperature is not to exceed 71.1° C. (160° F.). Under such conditions, the highest temperature to which organisms are exposed is 73-74° C. (168° F.) and it is possible that many organisms adhering to wall of container may experience temperatures no greater than 150-160° F. (65.5-71.1 C). It is also apparent that the temperature profile drops quickly in the 2 minutes before product in container enters the cooling tunnel.

FIG. 7B indicates that many common mold spores can withstand exposure of 71° C. for a period of at least 4 to 6 minutes. As indicated in FIG. 6A, the amount of time that product is actually at 71° C. is less than 15-30 seconds. It is standard practice in hot-fill operations to begin cooling of product 2 minutes after cooling in preparation for the loading of package into case packs. It is not practical or economically feasible to alter the time period between fill and cooling operations. In FIG. 7C data is shown which demonstrates that many types of common mold spore survive a process that mimics a hot-fill of 71° C. product. Herein, heated product was filled into container into which mold spores had been inoculated. After 2 minutes, the test vessels were immersed into ambient water to mimic passage through cooling tunnel. Nearly all the types of mold spores tested germinated and evolved into mycelium (+).

The dilemma of the restriction of heat content in product relative to survival of mold spores is circumvented by employing the invention in an application that can be termed "hybrid". Hybrid is the combination of physical and chemical agents to preserve product. In this instance, heat contained in the beverage is employed to rid the package material of vegetative forms of yeast, bacteria and the invention is employed to prohibit the outgrowth of mold spores that are present in the container at the time of closure application and that are able to survive the exposure to product filled into the container at temperature of 71° C.±3° C. The temperature of product in this hybrid "hot-fill" allows the use of standard light weight PET. Further, the invention is heat stable and there is no loss of activity of the invention when exposed to pasteurization and fill temperatures. Polyphosphates, if present, will hydrolyze causing changes to pH and sensory attributes of the product. This fact is not widely understood among experts in the field of beverage formulation or microbiology. Less appreciated still is the heat stability of the di-phosphonates.

The example for hybrid process that incorporates the invention employs the beverage formulation shown below. The biodegradable sequestrant Ethylene Diamine Disuccinic acid (30 ppm) is admixed into 2% juice beverage with 500 ppm of Etridonate. The 2% juice product is also made to contain a combination of weak organic acid (cinnamic acid and potassium sorbate at a combined concentration of 100 to 150 ppm. The product is then heat pasteurized and then filled into a container such that neither the in package temperature of product or body of the container exceeds 71.3° C. It has been demonstrated that combination heat contained in product filled into container at 71.3° C. in combination with just weak acids totaling 100 ppm is insufficient to prohibit the outgrowth of mold spores from many type of fungi. (FIG. 7C).

The maximum temperature of product in container of 71.3° C. permits the use of standard PET containers as opposed to the environmentally less-sound heat-set PET containers typically employed in hot fill operations. The combination of weak acid preservative, 30 ppm EDDS (or EDTA) and 500-1500 ppm bis-phosphonate (Etridonate) serve to prevent the outgrowth of spores of spoilage fungi that either were associated with the product contact surface of the package vessel prior to filling or that settled into the beverage in the short time frame between the filling and sealing of containers. A formulation containing SHMP in place of bis-phosphonate will fail because of the degradation of SHMP that occurs during thermal processing.

To date, there are no regulatory agency stated limits for the use of cinnamic acid, but cinnamic acid has a taste threshold of about 30-35 ppm and so the lower the concentration of cinnamic acid, the better the product will be received by the consumer. One or more countries have recently set restrictions on the upper limit of potassium sorbate to no more than 50 ppm.

A 2% fruit juice based non-carbonated beverage of pH 3.4 and about 12Brix is formed by combining the following ingredients.

| | |
|---|---|
| Added Water | Approximately 84% water |
| Apple Juice Concentrate | About 0.372% to provide single strength concentration of about 2% |
| Sucrose | 6.8% |
| Glucose | 5.2% |
| Fructose | 0.2% |
| Potassium Sorbate | 0.015% |
| Malic acid | 0.0674% |
| Sodium Malate | 0.013% (approximately, adjusting pH to 3.4) |
| Ethylene diamine tetraacetic acid (EDTA) | 30 ppm in test sample, unless EDDS present |
| Ethylene diamine disuccinic acid (EDDS) | 30 ppm in test sample, unless EDTA present |
| Sodium hexametaphosphate (SHMP) | 500-1500 ppm, unless Etridonate present |
| Bis-phosphonate, Etridonate | 500-1500 ppm, unless SHMP is present |

Etidronate, as a substitute for SHMP, allows for the use of thermal processing of beverage in that Etidronate will not acid hydrolyze as is the case for SHMP. Furthermore, the problem of pH drift that accompanies the use of SHMP is avoided. Substituting EDDS for EDTA avoids the concerns associated with employing a substance that is not environmentally sound.

Example 32

The invention is particularly suited to beverage formulations that are within the category of nutraceuticals. Such products include energy drinks, flavored water and tea beverages. Healthy and good-for-you formulations of beverages often require that ingredients are either natural or provide function as nutraceuticals. It is already understood that bis-phosphonates, such as Etidronate, can function to prevent tartar build-up on teeth (a nutraceutical function). It was largely unexpected that these same compounds proved effective as complements to weak acid preservatives in the prevention growth of spoilage bacteria or fungi. The finding that EDDS serves to complement the activity of bis-phosphonates when combined with weak acid preservatives is also unexpected and fortuitous given the fact that EDDS is both bio-degradable and a naturally formed substance. Note that natural sources of sorbic acid and cinnamic acid exist and that the synthetic forms employed in test are natural identical.

Prior to initial tests with bis-phosphonates, it was not immediately apparent that these substances were capable of sequestering sufficient quantities of divalent cations to a degree that would impact the observed tolerance (lowering) to weak acid preservatives. The initial studies with Etidronate proved that bis-phosphonates had the potential for use in some if not most beverage formulations. The similarity of structure among the bis-phosphonates dictates very similar chemistry for these substances in regard to their ability to bind di-valent cations (M++) and to do so across a range of pH. Consequently, most, if not all, bis-phosphonate can readily substitute for another bis-phosphonate in a beverage formulation and the choice of bis-phosphonate would be based largely on issues such as solubility, sensory threshold or cost of ingredient. The beverage formulation that is the basis of this example is employed to demonstrate the interchangeable nature of the bis-phosphonates wherein the substitution of one bis-phosphonates for another does not serve to alter the observed stability of product given a set amount of either cinnamic acid or potassium sorbate (examples of weak acid and salts of weak acids).

| Water | 94.44 g |
| Sugars, total | 4.5 g |
| Minerals | |
| Calcium, Ca | 17 mg |
| Iron, Fe | <3 µg |
| Magnesium, | 3.0 mg |
| Sodium, Na | 8 |
| Zinc, Zn | 0.32 |
| Copper, Cu | 0.007 mg |
| Vitamins | |
| Vitamin C, total ascorbic acid | 12.7 mg |
| Niacin | 0.844 mg |
| Vitamin B-6 | 0.084 mg |
| Folate, total mcg 8 0 | 8 µg |
| Vitamin B-12 | 0.25 µg |

-continued

| Vitamin A | International unit of 106 |
| Retinol mcg 32 0 | 32 µg |
| Vitamin E (alpha-tocopherol) mg 1.90 0 | 1.9 mg |
| Vitamin B-12, added mcg 0.25 0 | Vitamin A, RAE mcg_RAE 32 0 |
| Preservative Substances | |
| Sorbic acid | 50-200 mg |
| Cinnamic acid | 50-200 mg |
| Etidronate | 500 ppm or 0 ppm if other bis-phosphonate is present |
| Ibandronic acid | 500 ppm or 0 ppm if other bis-phosphonate is present |
| Medronic acid | 500 ppm or 0 ppm if other bis-phosphonate is present |
| Clodronic acid | 500 ppm or 0 ppm if other bis-phosphonate is present |
| Alendronic acid | 500 ppm or 0 ppm if other bis-phosphonate is present |
| Pamidronic acid | 500 ppm or 0 ppm if other bis-phosphonate is present |
| EDDS | 45 ppm |

Bis-phosphonates, as a substitute for SHMP, allows for the use of thermal processing of beverage in that all bis-phosphonates are stable against heat or acid induced hydrolysis. Such is not the case for polyphosphates such as SHMP. Furthermore, the problem of pH drift that accompanies the use of SHMP at ambient temperatures is avoided. Substituting EDDS for EDTA avoids the concerns associated with employing a substance that is not environmentally sound.

All example formulations used to establish efficacy of the preservative system are identical except for variation about the type of di-phosphonate that is present. Positive control samples are identical in formulation except for the presence preservatives. Positive controls include formulation with no weak acid preservative, a formulation with just sorbic acid (varying concentrations) with just cinnamic acid (varying concentrations) a formulation with 45 ppm EDDS and varying concentrations of sorbic acid and formulation with 45 ppm EDDS and varying concentrations of Cinnamic acid and a formulation with no weak acid preservative and only 45 ppm EDDS.

The presence of each of the bis-phosphonates will reduce the concentration of weak acid preservative that is required to prohibit spoilage by any of the following bio-indicator organisms.

Example 33

A N' bis-phosphonate is the sequestrant of choice for a beverage to be consumed by adults and distributed and sold in equatorial regions of the world. Phosphonates are temperature stable and their use is favored over polyphosphates in instances where product is either subject to thermal processing or is exposed to rather harsh temperatures (excess of 25° C.) for excessive periods (days or weeks) during distribution and display. For example, N' bis-phosphonate is the preferred sequestrant for non-alcoholic malt beverages that are extremely popular among adult populations in equatorial regions of the world where refrigerated distribution and display are lacking. In such regions, it is not out of the ordinary for product to be subjected temperatures in the range of 33-35° C. (91-95° F.) for extended periods of time. In the instance of this example, it can be demonstrated that Malt beverage product exposed to temperatures of 33° C. for even a period of 4 weeks is more stable when formulated with N' bis-phosphonate than polyphosphate. N' bis-phosphonate offer the added benefit of functioning as a nutraceutical or a "good for you" ingredient in this particular formulation that is most likely to be consumed by adults. N-bis phosphonates are particularly adept at preventing bone re-adsorption, the cause of osteoporosis.

Finally, an unexpected discovery is that N' bis-phosphonates will retard growth of spoilage organisms in and of themselves when added to a beverage formulation wherein the pH is between 2.8 and 5.5. When present at a concentration of about 300 ppm in a beverage acidified to pH 3.6 with malic acid, Ibandronate will impair the growth of *Saccharomyces cerevisae*. When present at 0.3% concentration in the same beverage formulation, Alendronate retards the growth rate of *Saccharomyces cerevisae*. It is speculated, not to be bound by theory, that N-bis phosphonates are themselves antifungal in the range of acid pH and, to a degree and may function by interfering with certain metabolic pathways found in fungi or eukaryotic organisms in general.

Concentrations of N bis-phosphonate below 100 ppm will complement the activity of traditional weak acid preservatives to completely inhibit the outgrowth of spoilage organisms. The combination of N-bisphosphonate and weak acid preservative can be balanced for taste such that the concentration of N-bis phosphonate does not need to exceed 100 ppm and that lowest concentration of weak acid or weak acid salt is present. The finding that EDDS further serves to complement the activity of different N-bis-phosphonates in combination with weak acids allows the formulation of beverages that will remain stable against spoilage from microorganisms for a period of at least 16 weeks, even when held at temperature extremes of 35° C. for the entire shelf life. In many parts of Middle East and Africa where refrigerated display is lacking, a shelf stable product must be able to tolerate such temperatures for extended periods.

The beverage formulation that is the basis of this example can be employed to demonstrate the interchangeable nature of the N bis-phosphonates wherein the substitution of N-bis-phosphonates for another does not serve to alter the observed stability of product given a set amount of either cinnamic acid or potassium sorbate (examples of weak acid and salts of weak acids). The beverage is generally, speaking, targeted to adults in the population and so there is a possible "health and wellness" attribute to because of the presence of N'bis-phosphonates. The benefit from consuming such a product must be established (absorbed dose from gut).

| Water, | 91.15 g |
|---|---|
| Malt (est by FAN) | 0.21 g |
| Fiber, total dietary g | 0.02 g |
| Sugars, total | 8.05 g |
| Minerals | |
| Calcium, Ca | 7 mg |
| Iron, Fe | 0.06 mg |
| Magnesium, Mg | 7 mg |
| Phosphorus, P | 16 mg |
| Potassium, K | 8 mg |
| Sodium, Na | 13 mg |
| Zinc, Zn mg | 0.02 mg |
| Copper, Cu | 0.008 mg |
| Manganese, | 0.013 mg |
| Selenium, | 1.2 µg |
| Vitamins | |
| Vitamin C, total ascorbic acid | 0.5 mg |
| Thiamin | 0.016 mg |
| Riboflavin | 0.048 mg |

-continued

| Niacin mg | 1.113 mg |
|---|---|
| Pantothenic acid | 0.037 mg |
| Vitamin B-6 | 0.027 mg |
| Folate | 14 µg |
| Choline, total mg 10.1 0 | 10 µg |
| Vitamin B-12 mcg 0.02 0 | 0.02 µg |
| Lipids | |
| Fatty acids, total saturated g | 0.024 g |
| 16:0 | 0.021 g |
| 18:0 | 0.001 g |
| Fatty acids, total polyunsaturated | 0.056 g |
| Alcohol, ethyl | 0.3 g |
| Icadronate | 0-500 ppm, 0 if other N'bis-phosphonate is present |
| Alendronate | 0-500 ppm, 0 if other N'bis-phosphonate is present |
| Pamidronate | 0-500 ppm, 0 if other N'bis-phosphonate is present |
| Neirdronate | 0-500 ppm, 0 if other N'bis-phosphonate is present |
| EDTA | 30 ppm |
| Potassium Sorbate | 125 ppm |

N' Bis-phosphonates, as a substitute for SHMP, allows for the use of thermal processing of beverage in that all N'bis-phosphonates are stable against heat or acid induced hydrolysis. Such is not the case for polyphosphates such as SHMP. Furthermore, the problem of pH drift that accompanies the use of SHMP at ambient temperatures is avoided. Substituting EDDS for EDTA avoids the concerns associated with employing a substance that is not environmentally sound.

All example formulations used to establish efficacy of the preservative system are identical except for variation about the type of N' bis-phosphonate that is present. Positive control samples are identical in formulation except for the presence preservatives. Positive controls include formulation with no weak acid preservative, a formulation with just sorbic acid (varying concentrations) with just cinnamic acid (varying concentrations) a formulation with 45 ppm EDDS and varying concentrations of sorbic acid and formulation with 45 ppm EDDS and varying concentrations of cinnamic acid and a formulation with no weak acid preservative and only 45 ppm EDDS.

The presence of each of the N'bis-phosphonates will reduce the concentration of weak acid preservative that is required to prohibit spoilage.

Example 34

A bis-phosphonate is employed as a sequestrant for a tea beverage. Although N' bis-phosphonates are generally stronger sequestrants than are bis-phosphonates, there are formulations wherein bis-phosphonates prove a more appropriate sequestrant. For instance, it was unexpectedly discovered that some N' bis-phosphonates, but not bis-phosphonates, result in the formation of a precipitate and haze when added to tea beverage. Although not wanting to be bound by theory, it appears that the positive charge associated with N' bis-phosphonates is responsible for this phenomenon. Given the weaker sequestrant activity of bis-phosphonates relative to N' bis-phosphonates the ability of bis-phosphonate to complement weak acid preservatives in tea was a favorable and not fully expected result.

Although bis-phosphonates, such as Etidronate, do not function to prevent bone re-adsorption to the same degree as N'bis-phosphonates, they do function to prevent tartar build-up on teeth. Consequently, the use of bis-phosphonates still offers the option of a nutraceutical function in instances where this single function is most appropriate.

The example shown here builds on the earlier cited examples wherein microbiological evidence is provided that Etidronate, a bis-phosphonate, serves to function as a complement to potassium sorbate in the preservation of a juice based product formulation. As is the case with N' bis-phosphonate, a similarity of structure among the different bis-phosphonates allows a certain amount of interchangeability among bis-phosphonates allowing product developers a choice of sequestrant based on sensory or cost attributes. The beverage formulation that is the basis of this example is employed to demonstrate the interchangeable nature of the bis-phosphonates wherein the substitution of one bis-phosphonates for another does not serve to alter the observed stability of product given a set amount of either cinnamic acid or potassium sorbate (examples of weak acid and salts of weak acids).

The finding that EDDS serves to complement the activity of bis-phosphonates when combined with weak acid preservatives in an acidic medium is measurably unexpected and fortuitous given the fact that EDDS is both bio-degradable and a naturally formed substance. Its similarity in structure to a peptide may have resulted in some measure of acid hydrolysis. Note that natural sources of Sorbic acid and Cinnamic acid exist and that the synthetic forms employed in test are natural identical.

| | |
|---|---|
| Water | 91.06 g |
| Tea solid | 0.22 g |
| Carbohydrate | 8.81 g |
| Fructose | 0.5 g |
| Pectin | 0.165 g |
| Rebaudioside A | .2 g |
| Lemon Flavor | 2.0 g |
| Citric acid | .5 g |
| Na + Citrate | 0.1 g |
| Calcium, Ca | 1 mg |
| Iron, Fe | .001 |
| Magnesium, Mg | 0 mg |
| Phosphorus, P | 26 mg |
| Potassium, K | 19 mg |
| Sodium, Na | 21 mg |
| Zinc, Zn | .01 mg |
| Copper, Cu | .005 mg |
| Manganese, Mn | 0.146 mg |
| Fluoride, F | 72.2 mcg |
| Caffeine | 2 mg |
| Sorbic acid | 50-200 mg |
| Cinnamic acid | 50-200 mg |
| Etidronate | 500 ppm or 0 ppm if other bis-phosphonate is present |
| Ibandronic acid | 500 ppm or 0 ppm if other bis-phosphonate is present |
| Medronic acid | 500 ppm or 0 ppm if other bis-phosphonate is present |
| Clodronic acid | 500 ppm or 0 ppm if other bis-phosphonate is present |
| Alendronic acid | 500 ppm or 0 ppm if other bis-phosphonate is present |
| Pamidronic acid | 500 ppm or 0 ppm if other bis-phosphonate is present |
| EDDS | 45 ppm |

Bis-phosphonates, in place of SHMP, allows for the use of thermal processing of beverage in that all bis-phosphonates are stable against heat or acid induced hydrolysis. Such is not the case for polyphosphates such as SHMP. Furthermore, the problem of pH drift that accompanies the use of SHMP at ambient temperatures is avoided. Substituting EDDS for EDTA avoids the concerns associated with employing a substance that is not environmentally sound.

All example formulations to establish efficacy of the preservative system are identical except for variation about the type of di-phosphonate that is present. Positive control samples are identical in formulation except for the presence preservatives. Positive controls include formulation with no weak acid preservative, a formulation with just sorbic acid (varying concentrations) with just cinnamic acid (varying concentrations) a formulation with 45 ppm EDDS and varying concentrations of sorbic acid and formulation with 45 ppm EDDS and varying concentrations of cinnamic acid and a formulation with no weak acid preservative and only 45 ppm EDDS.

The presence of each of the N' bis-phosphonates will reduce the concentration of weak acid preservative that is required to prohibit spoilage.

Example 35

Phosphonic acid is used as a sequestrant preservative for sports beverages and other formulations that make "good for you" claims. The invention is particularly in keeping with the concept of a beverage nutraceutical wherein the claim is a replenishment of electrolytes lost during exertion.

The formulation of energy drinks, flavored water and tea beverages is often an exercise in optimization wherein the beverage must deliver against label claims, possess an acceptable taste, and also maintain stability against microbial induced spoilage for over the period of the product shelf life. As a rule of thumb, sequestrants typically do not bind measurable amounts of mono-valent cations such as sodium and potassium, but the stronger the sequestrant the more likely is an interaction will occur. For instance, EDTA binds sodium in a manner that the ratio of bound to unbound is over 10:1 in mildly acid medium (log K 25 C is 1.7). Polyphosphates can bind both sodium and potassium in measurable amounts at higher pH values as evidenced by availability of commercial products that are composed polyphosphate bound to both Sodium and Potassium in various ratios.

The phosphonates and amino-phosphonates are not nearly as potent sequestrants as are di-phosphonates or bis-phosphonates or polyphosphate. As such, the phosphonates can be combined with low concentrations of EDTA or EDDS in a manner that avoids measurably binding of either Sodium or Potassium. This fact is so broadly appreciated by those practiced in the art that a claim about electrolyte availability would not necessitate proof by way of human or animal studies. In combination with EDDS (principally binding trace metal ions required by organism for growth such as Iron and copper), the phosphonates function quite well in combination with weak acid preservatives, such as Cinnamic acid to preserve a sports beverage. Both phosphonate and amino-phosphonate are stable at elevated temperatures and can be employed in hybrid hot fill processes as described in example 30.

As is the case for the bis-phosphonates, different Phosphonates (or amino Phosphonates) can be used interchangeably depending on ingredient cost, solubility issues or sensory preferences. Phosphonates, as a substitute for SHMP, allows for the use of thermal processing of beverage in that all bis-phosphonates are stable against heat or acid induced hydrolysis. Such is not the case for polyphosphates such as SHMP. Furthermore, the problem of pH drift that accompanies the use of SHMP at ambient temperatures is avoided. Substituting EDDS for EDTA avoids the concerns associated with employing a substance that is not environmentally sound and allows for the possibility of natural substance claim.

All example formulations used to establish efficacy of the preservative system are identical except for variation about the type of phosphonate (or amino-phosphonate) that is present. Positive control samples are identical in formulation except for the presence preservatives. Positive controls include formulation with no weak acid preservative, a formulation with just sorbic acid (varying concentrations) with just Cinnamic acid (varying concentrations) a formulation with 45 ppm EDDS and varying concentrations of sorbic acid and formulation with 45 ppm EDDS and varying concentrations of Cinnamic acid and a formulation with no weak acid preservative and only 45 ppm EDDS.

| Water | 91.91 | |
|---|---|---|
| Ash | 0.2 | |
| Sucrose | 0.2 | g |
| Glucose (dextrose) | 2.20 | g |
| Fructose | 3.22 | g |
| Lactose | 0.2 | g |
| Maltose | 0.2 | g |
| Minerals | | |
| Calcium, Ca | 1 | |
| Iron, Fe | 0.09 | mg |
| Magnesium, Mg | <0.02 | mg |
| Phosphorus, P | 1 | mg |
| Potassium, K | 18 | mg |
| Sodium, Na | 22 | mg |
| Zinc, Zn | 0.01 | mg |
| Copper, Cu | <0.01 | mg |
| Manganese, Mn | <0.001 | mg |
| Fluoride, F | 62 | mg |
| Vitamins | | |
| Thiamin | 0.011 | mg |
| Niacin | 1.56 | mg |
| Vitamin B-6 | 0.153 | mg |
| Vitamin B-12 | 1.37 | mg |
| PRESERVATIVE | | |
| Cinnamic acid | 0-200 ppm | |
| EDDS | 45 ppm | |
| 2 hydroxy phosphonoacetic acid (HPAA) | 600 ppm or 0 ppm if other phosphonate present | |
| phenylphosphonic acid (PPA) | 600 ppm or 0 ppm if other phosphonate present | |
| Aminotri methylene phosphonic acid | 600 ppm or 0 ppm if other phosphonate present | |
| N-phosphonacetyl-:L-aspartate (PALA) | 600 ppm or 0 ppm if other phosphonate present | |

The presence of each of the bis-phosphonates will reduce the concentration of weak acid preservative that is required to prohibit spoilage by the bio-indicator organisms Y3, C-7Up, Spore, Y22, M1, Y107, and M2.

Example 35

A lipid soluble sequestrant (reverse sequestrant) is used in combination with a bis-phosphonate and weak acid organic acid to preserve either a flavor or cloud emulsion. It is the nature of emulsions to exist as spherical droplet like structures when in aqueous suspension wherein the core of the droplet is hydrophobic and is able to solubilize lipid soluble (aqueous insoluble) components such as flavors, colors, nutrients, and cloud components. Typically, emulsion droplets are on the order of 1-3 micron diameter. The stability of emulsions against spoilage requires the presence of preservative in a measurable amount in the aqueous phase. However, weak organic acids tend to concentrate into the non-aqueous phase of the emulsion. The difference in concentration between aqueous phase and emulsion may be as much as lo fold as established from log P (or log D) estimates.

It has recently come to our attention that sorbic acid and cinnamic acid are prone to oxidative degradation and that the rate of degradation can be slowed by the addition of appropriate amounts of sequestrants to mixtures containing the weak acids. EDTA, when present in the aqueous phase, suffices to protect against oxidation. However, in an emulsion, the weak acid preservatives concentrate into the non-aqueous phase and EDTA is not measurably soluble in the non-aqueous phase. The problem can be addressed by employing lipid soluble (reverse sequestrants) as a component of the emulsion. Herein, a $Ca^{++}$ specific reverse sequestrant such as BAPTA (1,2-Bis(2-Aminophenoxy)ethane-N,N,N,'N'-tetraacetic acid, or BAPTA-AM (1,2-Bis(2-aminophenoxy)ethane-N,N,N',N'-tetraacetic acid tetrakis (acetoxymethyl ester) is deployed in conjunction with the Iron specific reverse sequestrant known as Exochelin to stabilize an emulsion against spoilage. EDTA and either a bis-phosphonate or N'bis-phosphonate are also incorporated into the formula for the emulsion in order to allow some protection in the aqueous phase.

Not to be bound by theory, it appears that the reverse phase sequestrants serve to prohibit attack by spoilage organisms toward smaller emulsion particles (possibly by a endocytotic mechanisms) and also serve to protect weak acids from oxidation. The double bond of sorbic acid is as prone to oxidation as are double bonds in fatty acids, a factor that leads to rancidity. Because the weak acids concentrate about 10 fold into the non-aqueous phase, there is less of a requirement for the sequestrants to complement weak acid preservative antimicrobial activity in this portion of the emulsion. Complement to the antimicrobial activity is forthcoming via the $Ca^{++}$ sequestrant. The iron binding Exochelin actually serves to protect against oxidation of weak organic acid preservatives.

The aqueous phase is protected by a lower concentration of weak acid preservative in the presence of a sizeable amount of Ca+ sequestering activity via EDTA in combination with either a bis-phosphonate or N'bis-phosphonate. The concentration of components in the emulsion reflects the fact that emulsions are prepared as concentrates and the final concentration of emulsion components in beverage is rather low. It is not the intent to preserve the finished beverage with just the preservative components added to the emulsion.

A cloud emulsion containing bis-phosphonate and the reverse sequestrants BAPTA-AM and Exochelin.

| RO treated Water | 84.9% |
|---|---|
| Modified Starch (Octenyl Succinate) | 7.5 g/L |
| Cottonseed oil | 6.5 g/L |
| Ascorbic acid | 0.05 g/L |
| Natural Color | 0.05 g/L |
| Citric acid | 0.75 g/L |
| Potassium Sorbate | 0.25 g/L |
| Reverse Sequestrant BAPTAM-AM (1,2-Bis(2-aminophenoxy)ethane-N,N,N',N'-tetraacetic acid tetrakis (acetoxymethyl ester) | 2.3 g (50 mM) |
| Exochelin (natural from mycobacterium) | 150 ppm |
| EDTA | 150 ppm |
| 1-hydroxyethane-1,1-diphosphonic acid (HEDP) | 750 ppm |

An orange flavor emulsion containing bis-phosphonate and BAPTA-AM reserve sequestrant.

| RO treated Water | 85.8% |
|---|---|
| Ethyl alcohol | 0.313 g/L |

-continued

| | |
|---|---|
| Acetylaldehyde | 0.384 g/L |
| Ascorbic acid | .575 g/L |
| Sodium Citrate | 0.74 g/L |
| Sodium Benzoate | 1.02/L |
| Citric acid | 1.57 g/L |
| Glycerol Ester of Wood Rosin | 32.3 g/L |
| Flavor | 36 g/L |
| Food Starch | 110 g//L |
| Reverse Sequestrant PCIH (2-pyridylcarboxaldehyde isonicotinoyl hydrazone) | 2.3 g (50 mM) |
| Exochelin | 150 ppm |
| EDDS | 150 ppm |
| Alendronate (N'bis-phosphonate) | 750 ppm |

Example 37

The following example is a projected embodiment of the invention and demonstrates the use of reverse sequestrants, EDDS, and either N'bis-phosphonate or bis-phosphonate in the generation of a beverage that contains a flavor, cloud or flavor/cloud emulsion.

U.S. Pat. No. 5,641,532 discloses that the presence of polyphosphates, especially sodium hexametaphosphate, can be destabilizing to a flavor/cloud emulsion used in various beverages. According to U.S. Pat. No. 5,641,532, the destabilizing effect likely reflects an interaction between polyphosphate and the emulsion particle that causes exclusion of the emulsion from the aqueous phase and results in enhanced aggregation and flocculation of the emulsion pa. U.S. Pat. No. 5,641,532 also teaches a solution to this problem, wherein the solution permits (1) the generation of a stable emulsion (2) the generation of beverage containing a stable emulsion containing polyphosphate (3) a beverage with acceptable mouth feel and (4) a beverage with no undesirable flavor effects. The solution for the problem is outlined by way of examples (1 and 2).

Example 1 of U.S. Pat. No. 5,641,532 requires the heating of 1.69 g SHMP suspension in water to a temperature of 37.8° C. (100° F.) to force dissolution of SHMP. This SHMP solution is mixed with gellan gum to produce a SHMP/gellan gum suspension referred to as a "SHMP/thickener suspension". The "SHMP/thickener suspension" is then blended into a solution of juice concentrate and flavor/cloud emulsion. In this manner, a finished beverage is finally derived containing approximately 1000 ppm SHMP. A second embodiment of the invention outlines the generation of a flavor or cloud emulsion, the preparation of a "thickener" composed of a specified mixture of SHMP and carboxymethylcellulose, and the blending of the SHMP/thickener and the base beverage into single strength beverage that requires pasteurization at 186.0° F. It is not indicated whether the flavor or cloud emulsion is added before or after the thermal processing step, but in that the HTST step is typically employed as a "terminal" process, it can be assumed that the emulsion is added prior to HTST.

The following provides a process and formulation for the generation of a beverage containing a flavor or cloud emulsion and that is preserved by a combination of weak organic acids (or salts or weak organic acids) in combination with EDDS or EDTA and a bis-phosphonate or N' bis phosphonate in accordance with at least one aspect of the invention.

A cloud emulsion is prepared containing bis-phosphonate and the reverse sequestrants BAPTA-AM and Exochelin.

| Ingredient | Amt |
|---|---|
| RO treated Water | 84.9% |
| Octenyl Succinate modified starch (emulsifier) | 7.5 g/L |
| Canola (clouding agent) | 6.5 g/L |
| Ascorbic acid | 0.05 g/L |
| Natural Color | 0.05 g/L |
| Citric acid | 0.75 g/L |
| Potassium Sorbate | 0.25 g/L |
| Reverse Sequestrant BAPTAM-AM (1,2-Bis(2-aminophenoxy) ethane-N,N,N',N'-tetraacetic acid tetrakis (acetoxymethyl ester) | 0.23 g (5 mM) |
| Exochelin (natural from mycobacterium) | 300 ppm |
| EDTA | 300 ppm |
| 1-hydroxyethane-1,1-diphosphonic acid (HEDP) | 300 ppm |

The above ingredients are then homogenized. The emulsion can be stored at ambient for a period of months or can be immediately batched with a concentrate that has been prepared as follows. Note that the concentrate is itself quite stable against spoilage because it contains over 500 ppm Potassium Sorbate, >150 ppm sequestrant.

| Ingredient | % |
|---|---|
| RO treated Water | 56.64 |
| Citric Acid | 7.75 |
| Sodium Citrate | 1.4 |
| Vitamin B1 | 0.002 |
| Juice Concentrate | 13.0 |
| Cloud Emulsion | 21.0 |
| Flavor | 0.2 |

Assuming that the concentrate is blended into final beverage at or about 8% (standard practice) It is important to note that the preservatives contained in the concentrate carried over to finish beverage at concentrations that need not be declared on the label of the product.

| Ingredient | Quantity |
|---|---|
| RO treated Water | 78.91% |
| Vitamin C supplement | 0.04% |
| Sweetener | 13% |
| Beverage concentrate | 8% |
| K + sorbate | 4.2 ppm |
| HEDP | 5.0 ppm |
| EDTA | 5.0 ppm |
| BAPTAM-AM | 3.8 ppm |
| Exochelin | 5.0 ppm |

The final beverage formulation after the blending of emulsion with beverage concentrate can be tailored to contain various preservatives at concentrations that are consistent with the threat from various classes of spoilage organisms. A beverage that is to be carbonated will not be inclined to spoil from mold fungi but is at risk of spoilage from various yeast and bacteria such as *Lactobacillus*, *Brettanomyces* and *Saccharomyces*. A batched product that is to be thermally processed and filled into container vessel at temperatures that will ensure the destruction of vegetative yeast and bacteria might still be at some risk of spoilage from germinating mold spores if the fill temperature is less than 85° C. (standard for hot-fill). Per way of example, the final beverage formulation is prepared. Prior to the adjustment of preservatives that would reflect the nature of the terminal step in processing, the concentration of substances in batched product are as follows"

This example offers a solution toward the prevention of spoilage of the emulsion. Emulsions are prone to spoilage and are routinely made to contain preservatives to allow for a prescribed shelf life. According to U.S. Pat. No. 5,641,532, it is not possible to enhance the activity of weak organic acids in flavor/cloud emulsions with polyphosphates because of the propensity of polymeric structures such as polyphosphates to compromise the dispersion of emulsions. N'bis-phosphonates and bis-phosphonates are not polymeric and the complexes formed between Phosphonates and cations are measurably non-polymeric in structure (2-3 phosphonates serve to "encage" a divalent cation). The presence of N' bis-phosphonate or bis-phosphonates in the emulsion in combination with the weak organic acids serves to extend the shelf-life of an emulsion beyond what is possible employing no preservative (U.S. Pat. No. 5,641,532) or employing weak acid preservatives alone. Often, flavor and cloud emulsions are prepared, stored and shipped from locations that are quite remote from the location of the blending and bottling of the finished product. Given the costly ingredients present in flavor or cloud emulsions, it is imperative that emulsion stability be extended as long as possible.

Another advantage of the present invention is that a "thickener" is not a required component of the final beverage formulation. U.S. Pat. No. 5,641,532 teaches that an absolute requirement for the "thickener" a beverage formulation that also contains polyphosphate and either a cloud or flavor emulsion. Further, there is an order of addition for substances that requires at least 3 separate steps. U.S. Pat. No. 5,641,532 teaches that the thickener (per way of example, Gellan gum, gelatin, or carboxymethylcellulose) serves to stabilize the emulsion against the tendency to coalesce when in the presence of polyphosphate. Although the reason for the ordered addition of ingredients is not provided, it is likely that a three step process is dictated by the concern that the emulsion can "shock out" if brought into contact with localized high concentrations of polyphosphates (as would occur when blending ingredients).

The invention described herein provides the option of whether to add a "thickener" and also serves to simplify the batching operation. A flavor or cloud emulsion containing a preservative system composed of either EDDS or EDTA in combination with either a bis-phosphonate or N' bis-phosphonate is simply added to the beverage "base" wherein the base is principally composed of sweetener, acidulant, other preservatives and water. The product developer has the option to add a "thickener". This is a more cost effective process, requiring less equipment, time and human resource.

The processes cited in examples of U.S. Pat. No. 5,641,532 require exposure of polyphosphates to a thermal process. In example 1, the blend of thickener and polyphosphate is exposed to a temperature of 100° F. for an unspecified period of time. In example 2, the now dilute blend of polyphosphate/polyphosphate is thermally processed by HTST at a temperature of 190° F. for unspecified number of seconds before cooling to 60° F. over an unspecified period of time. In both instances, an amount of polyphosphate will be hydrolyzed and this will result in changes to both pH and mouth-feel. The rather excessive concentration of 1000-3000 ppm SHMP employed in the beverage formulations likely reflect the loss of polyphosphate concentration during processing.

In accordance with the present invention, because N' bis-phosphonate and bis-phosphonates are stable to thermal processing these substances need not be "over dosed" into product in order to ensure their presence at targeted concentrations.

Given the benefit of the above disclosure and description of exemplary embodiments, it will be apparent to those skilled in the art that numerous alternative and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

Example 38

The invention is particularly suited to beverage formulations that are within the category of nutraceuticals and for which an all natural claim is to be made. Such products include energy drinks, flavored water and tea beverages. Healthy and good-for-you formulations of beverages often require that ingredients are either natural or provide function as nutraceuticals. From a previous example, it is already understood that Phosphonates and N-phosphonates, such as 2-aminoethylphosphonic acid or N-(phosphonoacetyl)-L-aspartame can be employed as complements to weak organic acids and EDDS or EDTA in order to preserve certain classes of products.

Further, it is understood that N-phosphonates and Phosphonates serve to inhibit tartar build-up on teeth (a nutraceutical function). It was largely unexpected that these same compounds proved effective as complements to weak acid preservatives in the prevention growth of spoilage bacteria or fungi. The finding that EDDS serves to complement the activity of phosphonates and N-phosphonates when combined with weak acid preservatives is also unexpected and fortuitous given the fact that EDDS is both bio-degradable and a naturally formed substance. Note that natural sources of sorbic acid and cinnamic acid exist and that the synthetic forms employed in test are natural identical.

Further, natural Phosphonates and amino-phosphonates exist and these substances function similar to the synthetic forms of these compounds.

Thus, it is possible to formulate a chemically preserved beverage in which all components of the preservative system are naturally derived or are naturally identical substances The similarity of structure among the phosphonates and among amino-phosphonates dictates very similar chemistry for these substances in regard to their ability to bind di-valent cations (M++) and to do so across a range of pH. Consequently, most, if not all, Phosphonates and amino-phosphonates can readily substitute for another in a beverage formulation and the choice of phosphonate or amino-phosphonate would be based largely on issues such as availability as a naturally derived substance, sensory threshold or cost of ingredient. The beverage formulation that is the basis of this example is employed to demonstrate the interchangeable nature of the bis-phosphonates wherein the substitution of one bis-phosphonates for another does not serve to alter the observed stability of product given a set amount of either cinnamic acid or potassium sorbate (examples of weak acid and salts of weak acids).

| | |
|---|---|
| Water | 94.44 g |
| Sugars, total | 4.5 g |
| Minerals | |
| Calcium, Ca | 17 mg |
| Iron, Fe | <3 µg |
| Magnesium, | 3.0 mg |
| Sodium, Na | 8 |
| Zinc, Zn | 0.32 |
| Copper, Cu | 0.007 mg |
| Vitamins | |
| Vitamin C, total ascorbic acid | 12.7 mg |
| Niacin | 0.844 mg |
| Vitamin B-6 | 0.084 mg |
| Folate, total mcg 8 0 | 8 µg |
| Vitamin B-12 | 0.25 µg |
| Vitamin A | International unit of 106 |
| Retinol mcg 32 0 | 32 µg |
| Vitamin E (alpha-tocopherol) mg 1.90 0 | 1.9 mg |
| Vitamin B-12, added mcg 0.25 0 | Vitamin A, RAE mcg_RAE 32 0 |
| Preservative Substances | |
| Sorbic acid | 50-200 ppm, unless other weak acid or salt present |
| Cinnamic acid | 50-200 ppm, unless other weak acid or salt present |
| K + sorbate | 75-250 ppm, unless other weak acid or salt present |
| K + Cinnamate | 75-250 ppm unless other weak acid or salt present |
| Sorbic acid, Cinnamic acid, K + cinnamic acid or K + sorbate | Combined concentration not to exceed 250 ppm |
| 2-aminoethylphosphonic acid (AEP) | Singularly or in combination with other N-phosphonate totaling ≤750 ppm |
| Fosfomycin | Singularly or in combination with other N-phosphonate totaling ≤750 ppm |
| Phosphinothricin | Singularly or in combination with other N-phosphonate totaling ≤750 ppm |
| 2-methylaminoehtylophosphonic acid (N,N dimethyl AEP) | Singularly or in combination with other N-phosphonate totaling ≤750 ppm |
| 2-trimethylaminoethylphosphonic acid | Singularly or in combination with other N-phosphonate totaling ≤750 ppm |
| 2 amino-3-phosphonopropionic acid | Singularly or in combination with other N-phosphonate totaling ≤750 ppm |
| EDDS | 45 ppm |

Phosphonates or N-phosphonates, as a substitute for SHMP, allows for the use of thermal processing of beverage in that all phosphonates are stable against heat or acid induced hydrolysis. Such is not the case for polyphosphates such as SHMP. Furthermore, the problem of pH drift that accompanies the use of SHMP at ambient temperatures is avoided. Substituting EDDS for EDTA avoids the concerns associated with employing a substance that is not environmentally sound.

All example formulations used to establish efficacy of the preservative system are identical except for variation about the type of N-phosphonate that is present. Positive control samples are identical in formulation except for the presence preservatives. Positive controls include formulation with no weak acid preservative, a formulation with just sorbic acid (varying concentrations) with just cinnamic acid (varying concentrations) a formulation with 45 ppm EDDS and varying concentrations of sorbic acid and formulation with 45 ppm EDDS and varying concentrations of Cinnamic acid and a formulation with no weak acid preservative and only 45 ppm EDDS.

The presence of each of the N-phosphonates will reduce the concentration of weak acid preservative that is required to prohibit spoilage by any of the following bio-indicator organisms.

What is claimed is:

1. A beverage comprising:
   a beverage component; and
   a beverage preservative system comprising:
   an N-bis-phosphonic acid or alkali metal salt thereof;
   a biodegradable sequestrant, wherein the biodegradable sequestrant is selected from the group consisting of ethylenediamine-N,N'-disuccinic acid (EDDS), ethylenediamine-N,N'-dimalonic acid (EDDM), ethylenediamine-N,N'-diglutaric acid (EDDG) and mixtures of any of; and
   a weak acid selected from the group consisting of cinnamic acid, sorbic acid, their alkali metal salts, and mixtures of any of them; and
   a reverse sequestrant selected from the group consisting of:
   1,2-bis(o-aminophenoxy)ethane-N,N,N',N'-tetraacetic acid (BAPTA),
   1,2-bis(o-aminophenoxy)ethane-N,N,N',N'-tetraacetic acid tetraacetoxymethyl ester (MAPTAM),
   N,N,N',N'-tetrakis-(2-pyridylmethyl)ethylenediamine (TPEN),
   exochelin,
   pyridoxal isonicotinoyl hydrazone (PIE),
   2-pyridylcarboxaldehyde isonicotinoyl hydrazone (PCIH),
   di-2-pyridylketone isonicotinoyl hydrazone (PKIH),
   2-quinolinecarboxaldehyde isonicotinoyl hydrazone (QCIH),
   2-pyridylcarboxaldehyde 2-thiophenecarboxyl hydrazone (PCTH),
   di-2-pyridylketone 2-thiophenecarboxyl hydrazone (PKTH),
   2-quinolinecarboxaldehyde 2-thiophenecarboxyl hydrazone (QCTH),
   2-pyridylcarboxaldehyde m-bromobenzoyl hydrazone (PCBBH),
   2-pyridylcarboxaldehyde benzoyl hydrazone (PCBH),
   di-2-pyridylketone benzoyl hydrazone (PKBH),
   2-quinolinecarboxaldehyde benzoyl hydrazone (QCBH),
   2-pyridylcarboxaldehyde p-aminobenzoyl hydrazone (PCAH),
   di-2-pyridylketone p-aminobenzoyl hydrazone (PKAH),
   2-quinolinecarboxaldehyde p-aminobenzoyl hydrazone (QCAH),
   2-pyridylcarboxaldehyde p-hydroxylbenzoyl hydrazone (PCHH),
   di-2-pyridylketone p-hydroxylbenzoyl hydrazone (PKHH),
   2-quinolinecarboxaldehyde p-hydroxylbenzoyl hydrazone (QCHH),
   2-furoylcarboxaldehyde isonicotinoyl hydrazone (FIH),
   and combinations thereof;
   wherein the beverage has a pH of 5.8 or less;
   wherein the biodegradable sequestrants is present in the beverage at a concentration in a range of 10 ppm to 120 ppm;
   wherein the reverse sequestrant is present in the beverage at an effective concentration not exceeding 150 ppm; and
   wherein the beverage when placed within a sealed container is substantially not spoiled by microorganisms for a period of at least 16 weeks.

2. The beverage of claim 1, wherein the beverage component is selected from the group consisting of added water, a juice, a flavorant, a sweetener, an acidulant, a colorant, a vitamin, a buffering agent, a thickener, an emulsifier, an anti-foaming agent, and mixtures of any of them.

3. The beverage of claim 1, wherein the beverage is selected from the group consisting of a carbonated beverage, a non-carbonated beverage, a soft drink, a fruit juice, a fruit juice flavored drink, a fruit-flavored drink, an energy drink, a hydration drink, a sport drink, a health and wellness drink, a fountain beverage, a frozen ready-to-drink beverage, a frozen carbonated beverage, a liquid concentrate, a coffee beverage, a tea beverage, a dairy beverage, a soy beverage, a vegetable drink, a flavored water, an enhanced water, and an alcoholic beverage.

4. The beverage of claim 1, wherein the N-bis-phosphonic acid is selected from the group consisting of: pamidronate, neridronate, olpadronate, risedronate, alendronate, zoledronate, ibandronate, incadronate, minodronate, piperidin-1-yl-methane-1,1-diphosphonic acid and derivatives thereof having at least one methyl or ethyl substituent on the piperidinyl ring, and mixtures of any of them.

5. The beverage of claim 1, wherein the beverage preservative system further comprises a polyphosphate selected from the group consisting of sodium hexametaphosphate (SHMP), sodium acid metaphosphate (SAMP), and mixtures thereof.

6. The beverage of claim 1, wherein the beverage has a pH of 4.4 or less.

7. The beverage of claim 1, wherein the beverage has a pH in a range of 2.6 to 3.8.

8. The beverage of claim 1, wherein the beverage preservative system comprises the biodegradable sequestrant at a concentration of 10 ppm to 75 ppm.

9. The beverage of claim 1, wherein the beverage preservative system further comprises EDTA at a concentration of 75 ppm or less.

10. The beverage of claim 1, wherein the beverage preservative system comprises the N-bis-phosphonic acid or alkali metal salt thereof at two to three times a combined molar concentration of magnesium and calcium cations present in the beverage preservative system.

11. The beverage of claim 1, wherein the beverage preservative system comprises the N-bis-phosphonic acid or alkali metal salt thereof at a concentration of 1800 ppm or less.

12. The beverage of claim 1, wherein the beverage preservative system comprises the weak acid at a concentration in the range of 10 ppm to 850 ppm.

13. The beverage of claim 1, wherein the beverage preservative system further comprises added water that has been treated by reverse osmosis, electro-deionization or both to decrease a total concentration of metal cations of chromium, aluminum, nickel, zinc, copper, manganese, cobalt, calcium, magnesium, and iron to 1.0 mM or less.

14. The beverage of claim 1, wherein metal cations of chromium, aluminum, nickel, zinc, copper, manganese, cobalt, calcium, magnesium, and iron are present in the beverage preservative system at a total concentration of 1.0 mM or less.

* * * * *